United States Patent
Kang et al.

(10) Patent No.: US 10,025,127 B2
(45) Date of Patent: Jul. 17, 2018

(54) DISPLAY DEVICE

(71) Applicant: LG ELECTRONICS INC., Seoul (KR)

(72) Inventors: Seunggyu Kang, Seoul (KR); Jein Lee, Seoul (KR); Kwangho Choi, Seoul (KR); Jonggil Pyo, Seoul (KR); Hyunho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/113,567

(22) PCT Filed: Jan. 15, 2015

(86) PCT No.: PCT/KR2015/000417
§ 371 (c)(1),
(2) Date: Jul. 22, 2016

(87) PCT Pub. No.: WO2015/111874
PCT Pub. Date: Jul. 30, 2015

(65) Prior Publication Data
US 2017/0010499 A1    Jan. 12, 2017

(30) Foreign Application Priority Data

Jan. 22, 2014 (KR) .......... 10-2014-0008002
May 26, 2014 (KR) .......... 10-2014-0063184
Dec. 12, 2014 (KR) .......... 10-2014-0179495

(51) Int. Cl.
*G06F 1/16*      (2006.01)
*G02F 1/1333*    (2006.01)
*G09F 9/00*      (2006.01)

(52) U.S. Cl.
CPC .......... *G02F 1/133308* (2013.01); *G09F 9/00* (2013.01); *G02F 2001/13332* (2013.01);
(Continued)

(58) Field of Classification Search
CPC ................................................. G02F 1/133308
(Continued)

(56) References Cited

U.S. PATENT DOCUMENTS 6,593,979 B1 *  7/2003  Ha .................. G02F 1/133308
                                                    349/187
8,488,078 B2 *  7/2013  Kim ................ G02F 1/133308
                                                    349/56
(Continued)

FOREIGN PATENT DOCUMENTS

EP   2 453 301       5/2012
KR   10-2000-0014933 3/2000
KR   10-2006-0125098 12/2006

OTHER PUBLICATIONS

International Search Report (with English Translation) and Written Opinion dated Apr. 7, 2015 issued in Application No. PCT/KR2015/000417.
(Continued)

*Primary Examiner* — Nidhi Thaker
(74) *Attorney, Agent, or Firm* — KED & Associates, LLP

(57) ABSTRACT

The present invention is related to a display device. A display device according to the present invention comprises a display panel including a front substrate and a rear substrate; guide panel being attached to the rear surface of the display panel and including a protruding part extending in a vertical direction; a rear cabinet being disposed in the rear of the display panel and including at least one groove into which the protruding part is inserted; and a back cover being disposed between the display panel and the rear cabinet and including an opening through which at least one of the protruding part and the groove passes.

10 Claims, 61 Drawing Sheets

(52) U.S. Cl.
CPC ............ *G02F 2001/133314* (2013.01); *G02F 2001/133325* (2013.01); *G02F 2201/465* (2013.01)

(58) Field of Classification Search
USPC .................................. 361/679.24; 349/58–60
See application file for complete search history.

(56) References Cited

U.S. PATENT DOCUMENTS

| | | | | |
|---|---|---|---|---|
| 8,633,405 | B2* | 1/2014 | Shin | G02F 1/133308 174/535 |
| 2003/0043310 | A1* | 3/2003 | Cho | G02B 6/0086 349/58 |
| 2003/0058380 | A1* | 3/2003 | Kim | G02F 1/133308 349/58 |
| 2005/0094053 | A1 | 5/2005 | Byun | |
| 2006/0290836 | A1* | 12/2006 | Chang | G02B 6/0088 349/58 |
| 2007/0064378 | A1* | 3/2007 | Lo | G02F 1/133308 361/679.22 |
| 2007/0120878 | A1 | 5/2007 | Hsiao et al. | |
| 2009/0237586 | A1* | 9/2009 | Han | G02F 1/133308 349/58 |
| 2010/0147582 | A1* | 6/2010 | Shin | G02F 1/133308 174/535 |
| 2010/0188597 | A1* | 7/2010 | Koike | G02F 1/133308 349/58 |
| 2011/0085107 | A1 | 4/2011 | Noh et al. | |
| 2012/0314155 | A1 | 12/2012 | Lo | |
| 2014/0002969 | A1 | 1/2014 | Hwang | |

OTHER PUBLICATIONS

European Search Report dated Nov. 29, 2017 issued in Application No. 15740103.5 (Full English Text).

* cited by examiner

FIG. 1
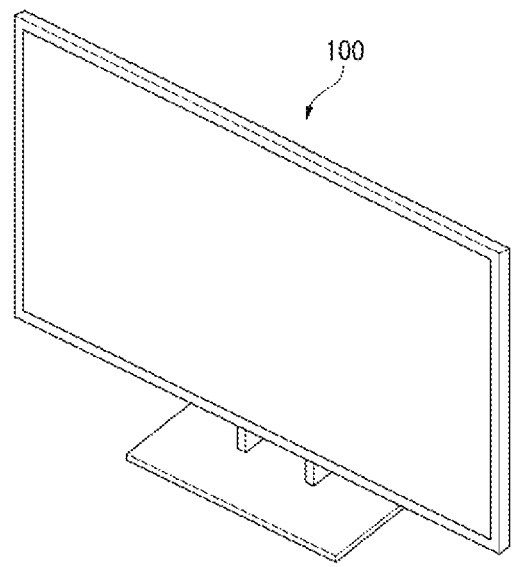
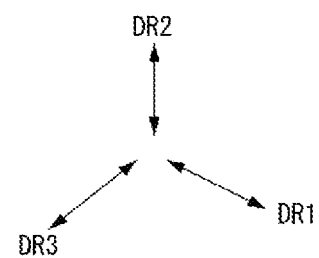

FIG. 20
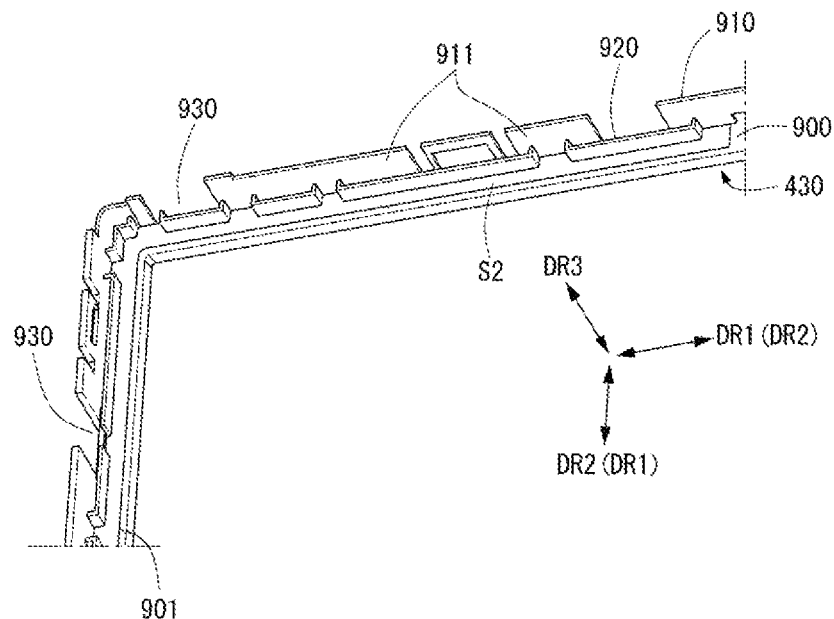
FIG. 21
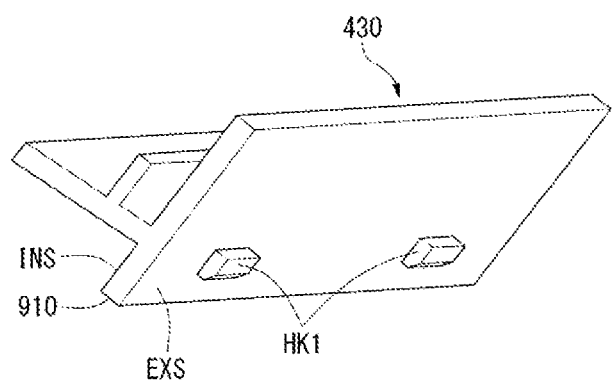
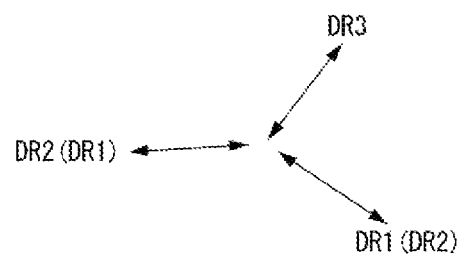

DISPLAY DEVICE

CROSS-REFERENCE TO RELATED PATENT APPLICATIONS

This application is a U.S. National Stage Application under 35 U.S.C. § 371 of PCT Application No. PCT/KR2015/000417, filed Jan. 15, 2015, which claims priority to Korean Patent Application No. 10-2014-0008002, filed Jan. 22, 2014, Korean Patent Application No. 10-2014-0063184, filed May 26, 2014 and Korean Patent Application No. 10-2014-0179495, filed Dec. 12, 2014, whose entire disclosures are hereby incorporated by reference.

TECHNICAL FIELD

The present invention is related to a display device.

BACKGROUND ART

Demands for display devices are growing in various forms as the information society is advanced, and in response to the demands, various display devices such as LCD (Liquid Crystal Display Device), PDP (Plasma Display Panel), ELD (Electro Luminescent Display), VFD (Vacuum Fluorescent Display) have been developed and are in wide use. Among the display devices, an LCD panel comprises a liquid crystal layer, TFT substrates facing each other having the liquid crystal layer between them; and a color filter substrate; and can display an image by using light provided by a backlight unit.

SUMMARY OF INVENTION

Technical Problem

The present invention has been made in an effort to provide a display device for reducing unnecessarily wasted materials.

Technical Solution

A display device according to the present invention can comprise a display panel including a front substrate and a rear substrate; guide panel being attached to the rear surface of the display panel and including a protruding part extending in a vertical direction; a rear cabinet being disposed in the rear of the display panel and including at least one groove into which the protruding part is inserted; and a back cover being disposed between the display panel and the rear cabinet and including an opening through which at least one of the protruding part and the groove passes.

Also, the display device can further comprise a top case including a front part which covers the boundary of the front surface of the display panel and a side part which covers at least part of the side surface of the guide panel.

Also, the top case includes a rim extending from the side part in a horizontal direction, and the end of the rear cabinet can correspond to the rim.

Also, the guide panel can further comprise a base part extending in a horizontal direction and a plurality of side walls extending from the base part in the vertical direction; and the protruding part can extend from the base part and be disposed between the side walls.

Also, thickness of the protruding part can be thicker than that of the side wall.

Also, the protruding part can include a part which stretches out further than the side part.

Also, the groove can comprise a first latch and a second latch protruding from the body of the rear cabinet in the vertical direction, and the protruding part can be inserted between the first and the second latch.

Also, the groove can further comprise a coupling member which connects a lower part of the first latch and a lower part of the second latch to each other.

Also, the guide panel can further comprise a base part to which an adhesive layer is applied; the protruding part can extend from the base part and include a head portion and a leg portion disposed between the head portion and the base part; and width of the leg portion can be smaller than the maximum width of the head portion.

Also, while the protruding part is inserted into the groove, the first and the second latch can enclose the head portion.

Also, the top case can comprise a horizontal top case which covers the boundary of a front surface in a first side area of the display panel and a vertical top case which covers the boundary of the front surface in a second side area neighboring the first side area of the display panel, wherein the horizontal top case and the vertical top case are connected to each other at the corner of the display panel, and materials of which the horizontal top case and the vertical top case are made can be different from each other.

Also, the horizontal top case can include a metallic material while the vertical top case can include a plastic material.

Also, the display device can further comprise an optical layer between the display panel and the back cover.

Advantageous Effects

A display device according to the present invention can reduce unnecessarily wasted materials, thereby reducing manufacturing costs.

DESCRIPTION OF DRAWINGS

FIGS. 1 and 2 illustrate the structure of a display device according to the present invention;

FIGS. 17 to 22 illustrate a guide panel;

BEST MODE

Mode for Invention

Figure 2:
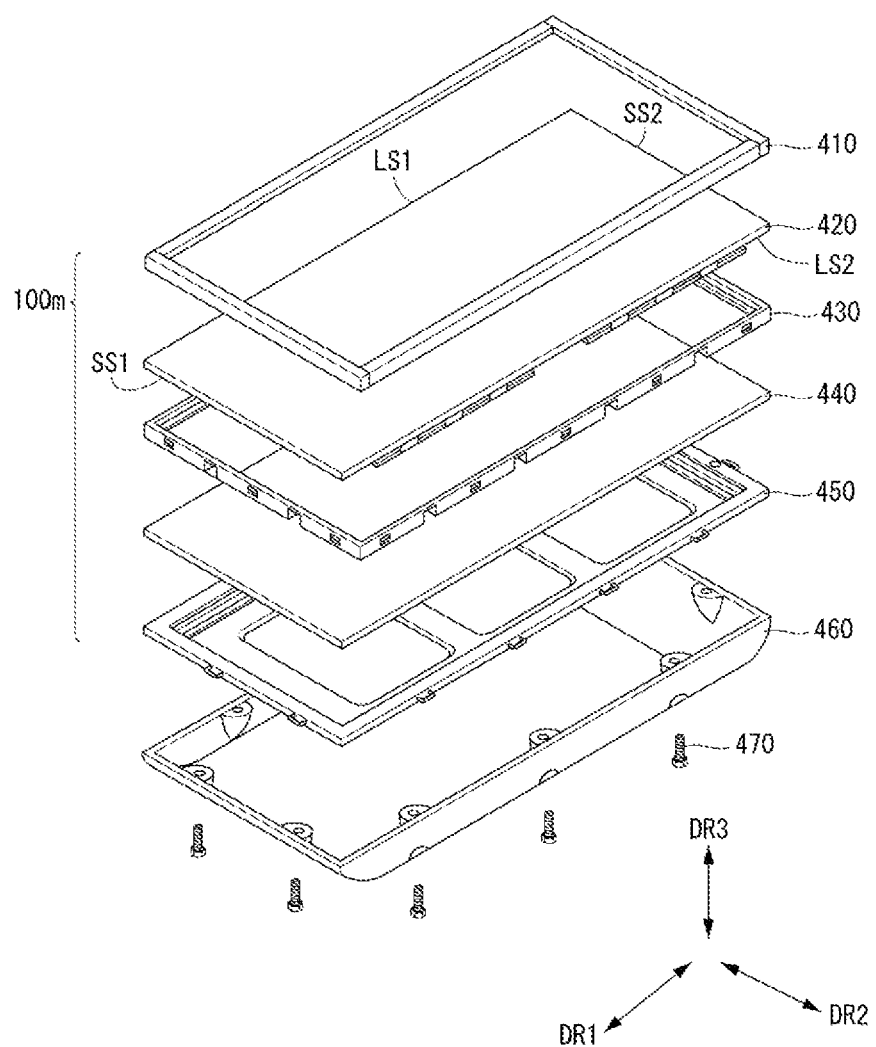

In what follows, a display device according to the present invention will be described in detail with reference to appended drawings.

Since the present invention can be modified in various ways and can have a plurality of embodiments, specific embodiments will be described in detail with related drawings. However, the present invention is not limited to those specific embodiments, and it should be understood that the specific embodiments include all the possible modifications, equivalents, or substitutes belonging to the technical principles and scope.

In describing the present invention, terms such as first or second can be used to describe various constituting elements, but implications of the constituting elements are not limited by the terms. The terms can be used only for distinguishing one from the other constituting elements. For example, while not departing from the technical scope of the present invention, the first constituting element can be named as the second constituting element, and similarly, vice versa.

The term 'and/or' can refer to a combination of a plurality of related specific items or any one of a plurality of related specific items.

It will be understood that when an element is referred to as being "connected with" another element, the element can be connected with the other element or intervening elements may also be present. In contrast, when an element is referred to as being "directly connected with" another element, there are no intervening elements present.

The terms introduced in this document have been used merely to describe specific embodiments and are not intended to restrict the technical scope of the present invention. A singular representation may include a plural representation unless it represents a definitely different meaning from the context.

Terms such as "include" or "has" are used herein and should be understood that they are intended to indicate existence of features, numbers, steps, operations, constituting elements, components disclosed in the specification, or a combination thereof, and it should also be understood that they are not meant to preclude possibility of existence or addition of one or more other features, numbers, steps, operations, constituting elements, components, or a combination thereof.

Unless defined otherwise, all of the terms used in this document, including technical or scientific terms, can have the same meaning as commonly understood by those skilled in the art to which the present invention belongs. Those terms such as defined in a general-use dictionary can be interpreted to convey the same meaning as they are interpreted contextually in a related technical field. Unless explicitly defined in the specification, those terms may not be interpreted ideally or in an excessively formal manner.

The embodiments given below are intended to describe the present invention more completely for those with average level of knowledge in the related art, and shapes and sizes of the elements used in the appended drawings can be exaggerated for the purpose of more clear description.

In what follows, it is assumed that a display panel is made of Liquid Crystal Display Device (LCD). However, a display panel according to the present invention is not limited to the LCD but also can be implemented by using Plasma Display Panel (PDP), Field Emission Display (FED), or Organic Light Emitting Display (OLED).

In what follows, it is assumed that a first direction (DR1) is parallel to the long side LS1, LS2 of the display panel 100 while a second direction (DR2) is parallel to the short side SS1, SS2 of the display panel 100.

A third direction (DR3) can be orthogonal to the first direction (DR1) and/or the second direction (DR2).

The first direction (DR1) and the second direction (DR2) can be called collectively a horizontal direction.

Besides, the third direction (DR3) can be called a vertical direction.

FIGS. 1 and 2 illustrate the structure of a display device according to the present invention.

With reference to FIGS. 1 and 2, a display device 100 according to the present invention can comprise a display panel 420, top case 410, and rear cabinet 460.

Though not shown, the display panel 100 displaying an image can include a front substrate and a rear substrate being disposed to face each other.

The top case 410 can cover the boundary of the front surface of the display panel 420.

More specifically, the display panel 420 can include a first long side (LS1); second long side (LS2) facing the first long side (LS1); first short side (SS1) adjacent to the first long side (LS1) and the second long side (LS2); and second short side (SS2) facing the first short side (SS1).

At this time, the first and the second long side (LS1, LS2) can be called a first side area while the first and the second short side (SS1, SS2) can be called a second side area neighboring the first side area.

Meanwhile, for the convenience of description, it has been assumed that the lengths of the first and the second long side (LS1, LS2) are longer than the lengths of the first and the second short side (SS1, SS2); however, it is equally possible that the lengths of the first and the second long side (LS1, LS2) are approximately the same as the lengths of the first and the second short side (SS1, SS2).

At this time, the top case 410 can cover the boundary of the front surface of the display panel 420 in the first and the second long side (LS1, LS2) area and in the first and the second short side (SS1, SS2) area respectively.

Also, the top case 410 can include a side part which covers at least part of the side surface of the guide panel 430. This structure will be described in more detail below.

The top case 410 can be divided into a plurality of parts, which will be described in detail below.

The rear cabinet 460, being disposed in the back of the display panel 420, can protect various components located between the display panel 420 and the rear cabinet 460.

A back cover 450 can be disposed between the display panel 420 and the rear cabinet 460. Thought not shown, various components such as PCB and a light source can be disposed in the back cover 450.

A light guide panel 440 can be disposed between the back cover 450 and the display panel 420. The light guide panel 440 can be disposed when a light source not shown in the figure corresponds to an edge-type back light unit located on the side surface of the light guide panel 440.

In case the light guide panel 440 is omitted, it can correspond to a case when a light source not shown in the figure is a direct-type back light unit located in the lower part of the display panel 420.

Also, though not shown in the figure, an optical layer can be additionally disposed between the light guide panel 440 and the display panel 420.

Also, a guide panel 430 can be disposed in the back of the display panel 420.

A coupling member 470 can connect the back cover 450 and the rear cabinet 460 to each other.

The top case 410, display panel 420, guide panel 430, light guide panel 440, and back cover 450 can be called collectively a display module 100M. Also, though not shown in the figure, the display module 100M can include an optical layer and a light source.

FIGS. 3 to 16 illustrate a top case. In what follows, those already described above will be omitted from the description of the top case.

Figure 3:
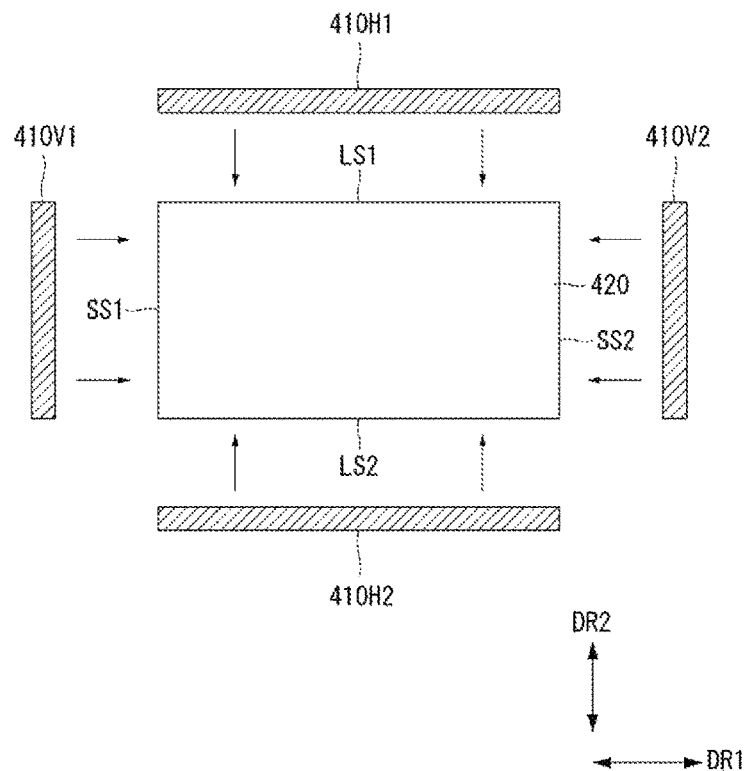
FIGS. 3 to 16 illustrate a top case.

With reference to FIG. 3, the top case 410 can comprise a horizontal top case 410H1, 410H2 which covers the edges of the front surface of the display panel 420 in the long side area (LS1, LS2) of the display panel 420 and a vertical top case 410V1, 410V2 which covers the edges of the front surface of the display panel 420 in the short side area (SS1, SS2) of the display panel 420.

The horizontal top case 410H1, 410H2 can include a first horizontal top case 410H1 corresponding to a first long side LS1 of the display panel 420 and a second horizontal top case 410H2 corresponding to a second long side LS2 of the display panel 420.

The vertical top case 410V1, 410V2 can include a first vertical top case 410V1 corresponding to a first short side SS1 of the display panel 420 and a second vertical top case 410V2 corresponding to a second short side SS2 of the display panel 420.

The horizontal top case 410H1, 410H2 and the vertical top case 420V1, 420V2 can be connected to each other at the corner areas of the display panel 420. In other words, first horizontal top case 410H1 and the first vertical top case 410V1 are connected to each other at the corner formed by the first long side LS1 and the first short side SS1, the first horizontal top case 410H1 and the second vertical top case 410V2 are connected to each other at the corner formed by the first long side LS1 and the second short side SS2, the second horizontal top case 410H2 and the first vertical top case 410V1 are connected to each other at the corner formed by the second long side LS2 and the first short side SS1, and the second horizontal top case 410H2 and the second vertical top case 410V2 are connected to each other at the corner formed by the second long side LS2 and the second short side SS2.

Figure 4:
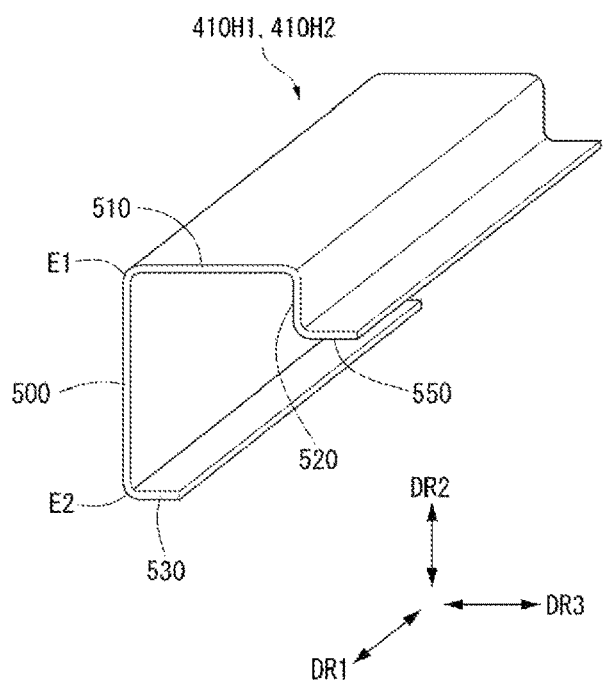

With reference to FIG. 4, the horizontal top case 410H1, 410H2 can include a first part 500, second part 510 connected to the first part 500, and third part 520 connected to the second part 510.

As can be seen from the cross section of the horizontal top case 410H1, 410H2, the first part 500 can extend in a second direction DR2 between horizontal directions (first direction DR1 and/or second direction DR2) and include a part covering the edges of the front surface of the display panel 420 in the long side area (LS1, LS2).

The second part, being stretched out from the first end E1 of the first part 500, can include a part disposed on the side surface of the display panel 420 in the long side area LS1, LS2 of the display panel 420.

The third part 520 can be extended from the end of the second part 510 in a second direction DR2 between the horizontal directions (first direction DR1 and/or second direction DR2).

At this time, the third part 520 can form a rim of the display module 100M. The end of the rear cabinet 460 can correspond to the third part 520, namely, the rim, which will be described later.

Also, the horizontal top case 410H1, 410H2 can include a fourth part 530 connected to the first part 500 and a sixth part 550 connected to the third part 520.

The fourth part 530 can be extended from the second end E2 opposing the first end E1 of the first part 500 in a vertical direction (a third direction (DR3)) and can be disposed on upper part of the display panel 420 in the long side area LS1, LS2 of the display panel 420.

The sixth part 550 can be extended from the third part 520 in a vertical direction (in the third direction (DR3)).

The aforementioned sixth part 550 can be regarded as a side part which covers at least part of the side surface of the guide panel 430.

Figure 5:
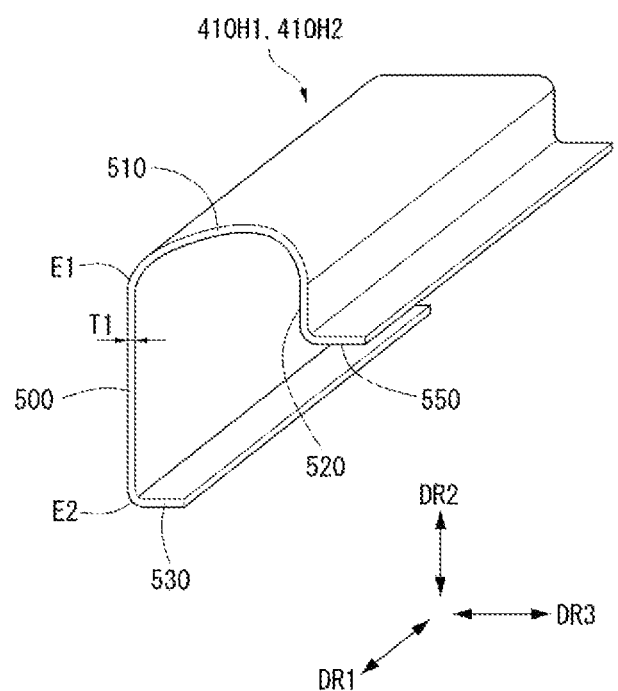

As shown in FIG. 5, the second part 510 can include a curved surface in a slanted direction.

In this case, the second part 510 is extended in a slanted direction from the first part 500 and includes a convexly curved surface.

The wall thickness of the horizontal top case 410H1, 410H2 can be measured to be first wall thickness T1.

Figure 6:
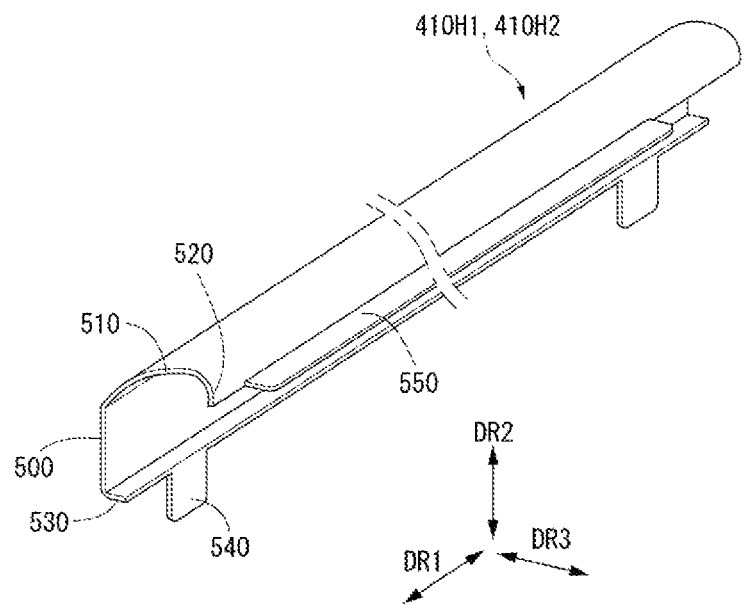

With reference to FIG. 6, the horizontal top case 410H1, 410H2 can further include a fifth part 540.

The fifth part 540 can be extended from the fourth part 530 in a horizontal direction (in the second direction (DR2) between the first direction (DR2) and/or the second direction (DR2)). The fifth part 540 can be used to connect the horizontal top case 410H1, 410H2 to the vertical top case 410V1, 410V2.

Figure 7:
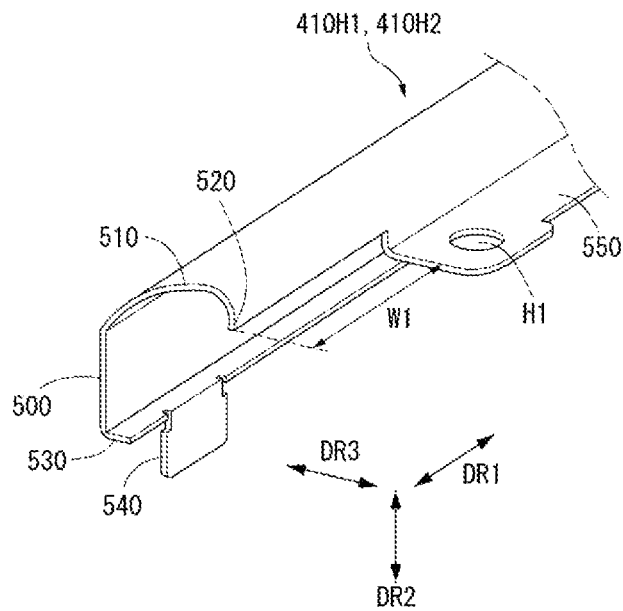

With reference to FIG. 7, a first hole H1 through which a coupling member passes can be formed in the sixth part 550 of the horizontal top case 410H1, 410H2. The first hole H1 can be used to connect the horizontal top case 410H1, 410H2 to another structure, for example, vertical top case 410V1, 410V2 and/or guide panel 430.

The sixth part 550 can be omitted in both of the ends W1 of the horizontal top case 410H1, 410 H2. In this way, if the sixth part 550 is omitted in both of the ends of the horizontal top case 410H1, 410H2, connecting the horizontal top case 410H1, 410H2 to the vertical top case 410V1, 410V2 can be carried out in a simple manner at the corner areas of the display panel 420.

Figure 8:
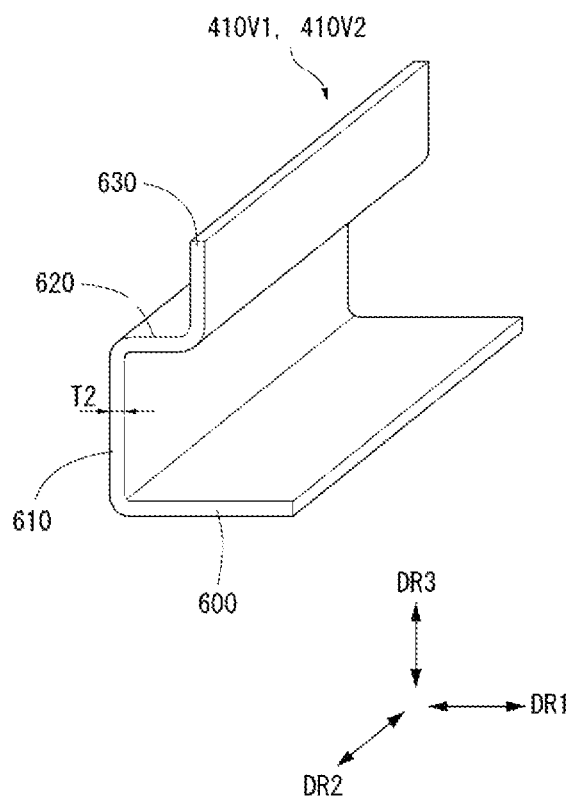

With reference to FIG. 8, the vertical top case 410V1, 410V2 can include a vertical part 610 which is connected to both of the horizontal part 600 and a first auxiliary part 620.

The horizontal part 600 is extended in the first direction DR1 between horizontal directions (first direction (DR1) and/or second direction (DR2)) and includes a part covering the edges of the front surface of the display panel 420 in the short side area (SS1, SS2) of the display panel 420.

The vertical part 610, being stretched out from the horizontal part 600, can include a part disposed on the side surface of the display panel 420 in the short side area SS1, SS2 of the display panel 420.

Also, the vertical top case 410V1, 410V2 can further include a first auxiliary part 620 being stretched out from the vertical part 610 in a first direction (DR1) between horizontal directions (first direction (DR1) and/or second direction (DR2)) and a second auxiliary part 630 being stretched out from the first auxiliary part 620 in a vertical direction (third direction (DR3)).

The wall thickness of the vertical top case 410V1, 410V2 can be measured to be second wall thickness T2.

Figure 9:
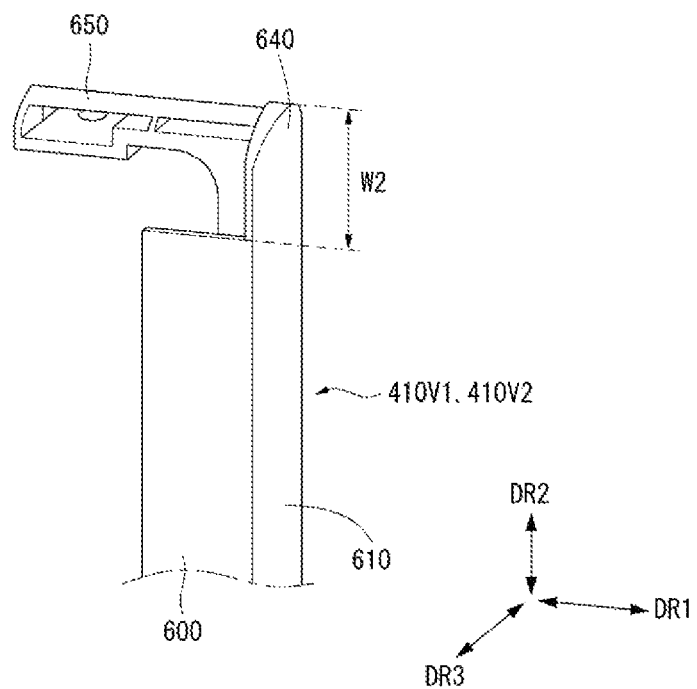

With reference to FIG. 9, the vertical part 610 of the vertical top case 410V1, 410V2 can include an extension part 640 being stretched out further by a predetermined height W2 from the horizontal part 600 in the second direction (DR2) between horizontal directions (first direction (DR1) and/or second direction (DR2)).

Also, the vertical top case 410V1, 410V2 can further include an overlap part 650 being stretched out from the extension part 640 in the first direction (DR1) between horizontal directions (first direction (DR1) and/or second direction (DR2)).

Figure 10:
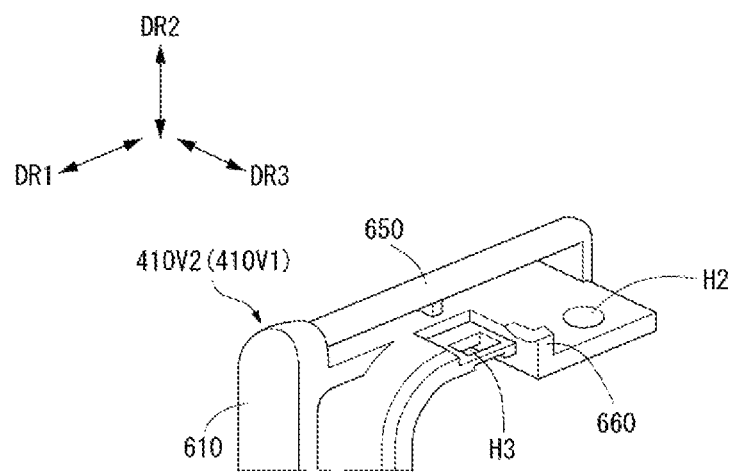

With reference to FIG. 10, the overlap part 650 is extended in a vertical direction (third direction (DR3)) and includes a connection part 660 in which a second hole H2 is formed. The second hole H2 can correspond to the first hole H1.

Figure 11:
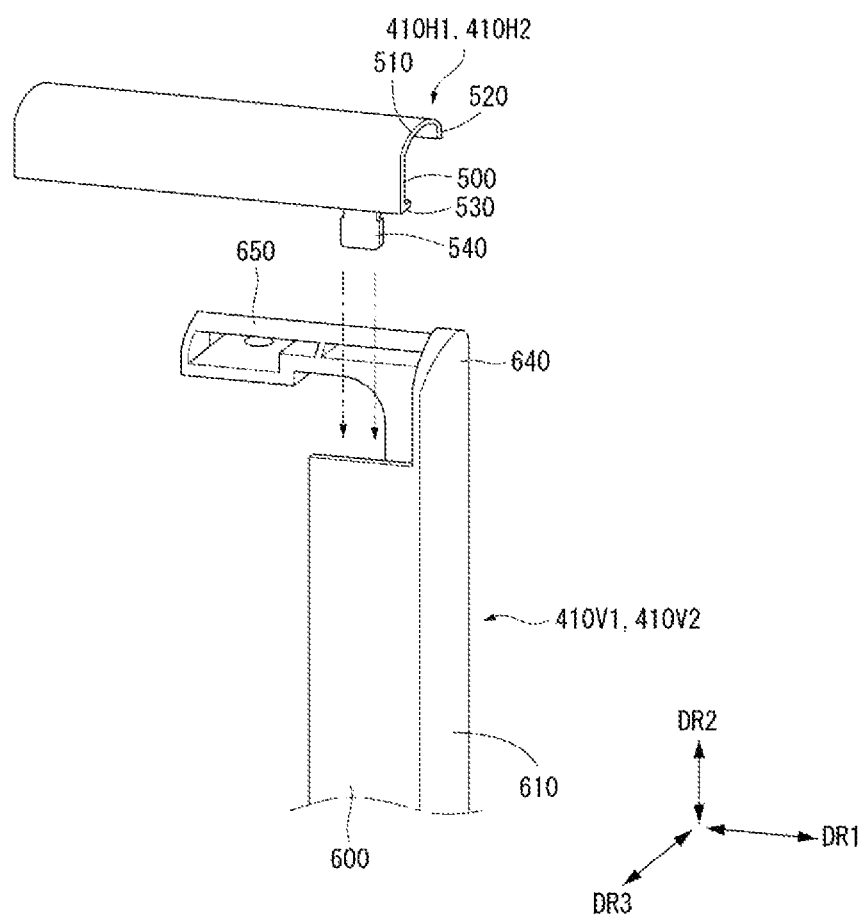

With reference to FIG. 11, the horizontal top case 410H1, 410H2 can be connected to the vertical top case 410V1, 410V2 in the corner area of the display panel 420.

At this time, the fifth part 540 of the horizontal top case 410H1, 410H2 can be inserted into the lower part below the horizontal part 600 of the vertical top case 410V1, 410V2.

Figure 12:
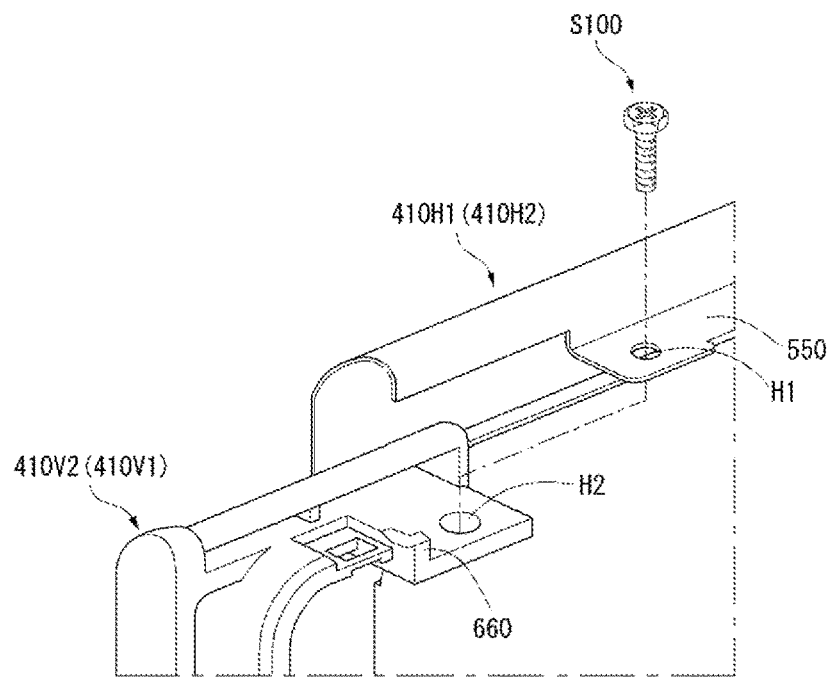

Also, as shown in FIG. 12, a first coupling member S100 such as a screw can connect the horizontal top case 410H1, 410H2 to the vertical top case 410V1, 410V2 by passing through the first H1 and the second hole H2.

Figure 13:
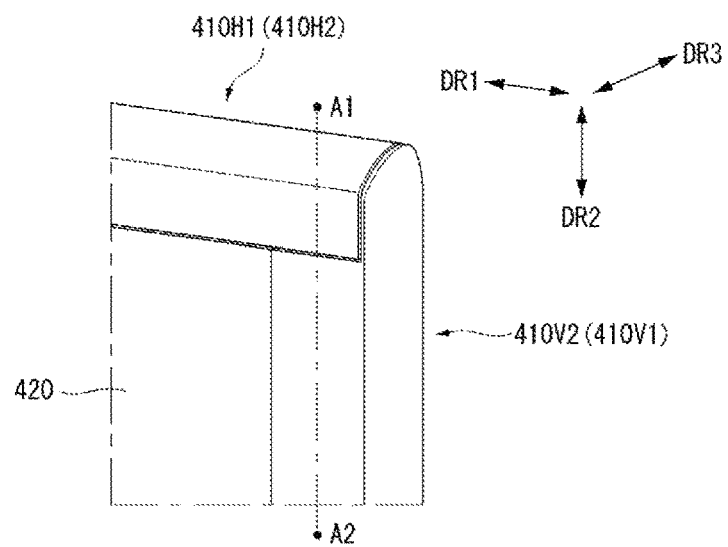

As shown in FIG. 13, once the horizontal top case 410H1, 410H2 is connected to the vertical top case 410V1, 410V2, the fifth part 540 of the horizontal top case 410H1, 410H2 can be occluded by the horizontal part 600 of the vertical top case 410V1, 410V2.

Also, the overlap part 650 of the vertical top case 410V1, 410V2 can be occluded by the horizontal top case 410H1, 410H2.

Figure 14:
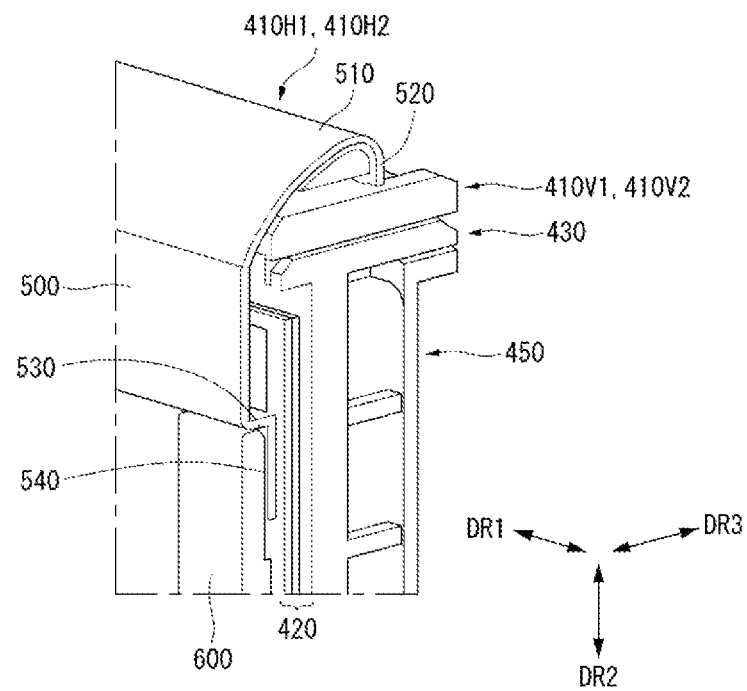

With reference to FIG. 14, the fifth part 540 of the horizontal top case 410H1, 410H2 is inserted into the lower part of the horizontal part 600 of the vertical top case 410V1, 410V2.

Also, with reference to FIG. 14, the horizontal top case 410H1, 410H2 occludes the edges of the front surface in the long side area (LS1, LS2) of the display panel 420, and the vertical top case 410V1, 410V2 occludes the edges of the front surface in the short side area (SS1, SS2) of the display panel 420.

Due to the fifth part 540 of the horizontal top case 410H1, 410H2 and the overlap part 650 of the vertical top case 410V1, 410V2, the horizontal top case 410H1, 410H2 and the vertical top case 410V1, 410V2 can be aligned without being spaced from each other.

Meanwhile, the first wall thickness T1 of the horizontal top case 410H1, 410H2 can be thinner than the second wall thickness T2 of the vertical top case 410V1, 410V2.

Also, materials used to make the horizontal top case 410H1, 410H2 and the vertical top case 410V1, 410V2 can differ from each other. Preferably, the horizontal top case 410H1, 410H2 can contain a metallic material while the vertical top case 410V1, 410V2 can contain a plastic material.

In what follows, the reason why the top case 410 is composed of the horizontal top case 410H1, 410H2 and the vertical top case 410V1, 410V2 with different materials will be given.

Figure 15:
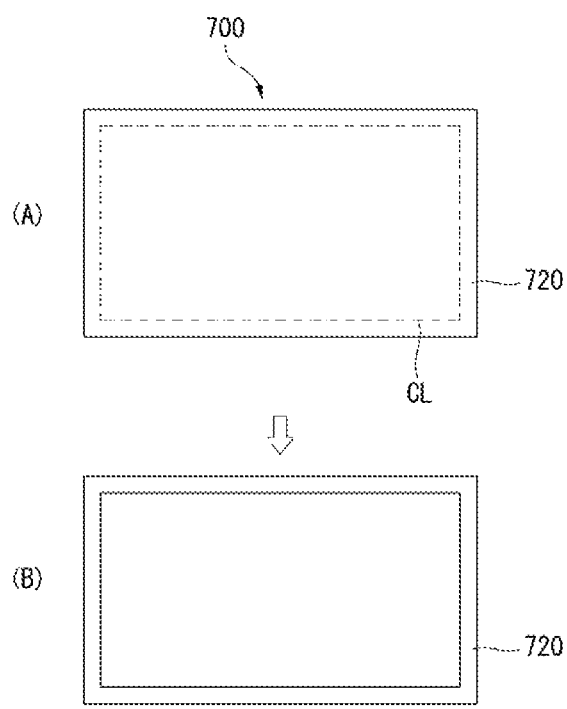

In case the top case 410 is made only of metallic materials, as shown in FIG. 15, a mother metal sheet 700 can be processed by a press forming method to manufacture the top case.

In this case, as shown in FIG. 15(A), a central part 710 of the mother metal sheet 700 can be removed along a predetermined cutting line (CL) while being processed by a press forming method.

Afterwards, as shown in FIG. 15(B), the outer part 720 located in the peripheral area of the central part 710 of the mother metal sheet 700 can be used as the top case.

In this case, since the central part 710 of the mother metal sheet 700 is merely wasted, manufacturing costs can be increased due to the waste of unnecessary raw materials.

On the other hand, in case the horizontal top case 410H1, 410H2 is made of a metallic material and the vertical top case 410V1, 410V2 is made of a plastic material according to the present invention, the first horizontal top case 410H1, the second horizontal top case 410H2, the first vertical top case 410V1, and the second vertical top case 410V2 can be manufactured separately, by which unnecessarily wasted raw materials can be reduced. Therefore, manufacturing costs can be reduced.

In order to make the horizontal top case 410H1, 410H2 match the surface color of the vertical top case, at least one surface of the vertical part 610 and the horizontal part 600 of the vertical top case 410V1, 410V2 can be painted, or a tape can be attached thereon.

For example, silver paint can be painted on at least one surface of the vertical part 610 and the horizontal part 600 of the vertical top case 410V1, 410V2, or a silver tape can be attached thereon to give an impression of metallic surface.

Figure 16:
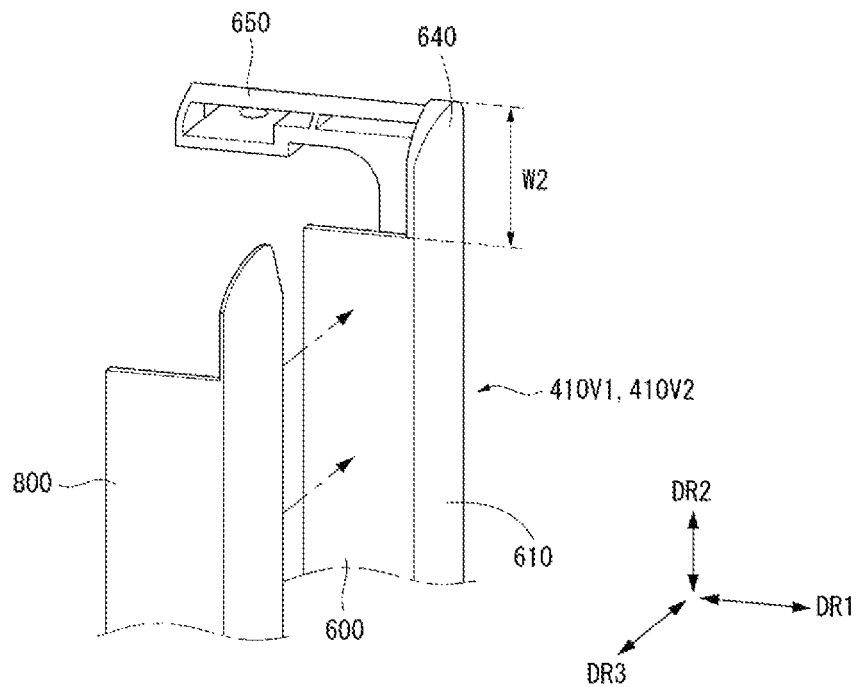

Or, as shown in FIG. 16, it is possible to dispose a cover made of a metallic material on at least one of the surfaces of the vertical part 610 and the horizontal part 600 of the vertical top case 410V1, 410V2.

FIGS. 17 to 22 illustrate a guide panel. In what follows, those descriptions already given above will be omitted.

Figure 17:
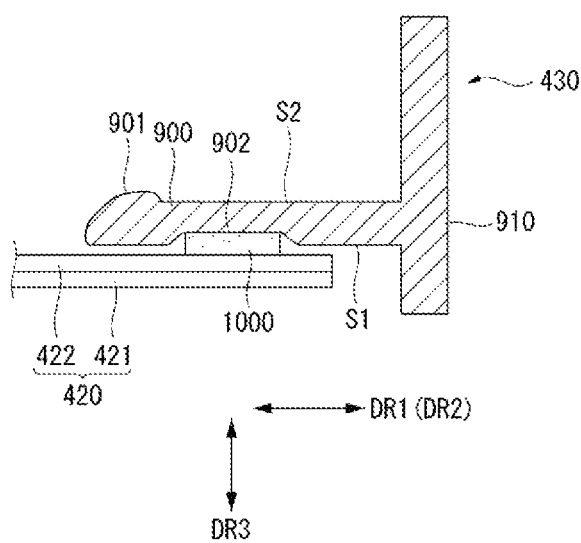

With reference to FIG. 17, the guide panel 430 can comprise a base part 900 and a side wall 910 connected to the base part 900.

The base part 900 can be extended in a horizontal direction (first direction (DR1) and/or second direction (DR2)).

Also, the base part 900 can be attached to the rear surface of the display panel 420 by an adhesive layer 1000.

A groove 902 through which the adhesive layer 1000 is applied can be formed on the bottom surface (first surface (S1)) of the base part 900.

Also, on the upper surface (second surface (S2)) corresponding to the bottom surface S1 of the base part 900, a convex part 901 which stretches out in a vertical direction (third direction (DR3)).

Figure 18:
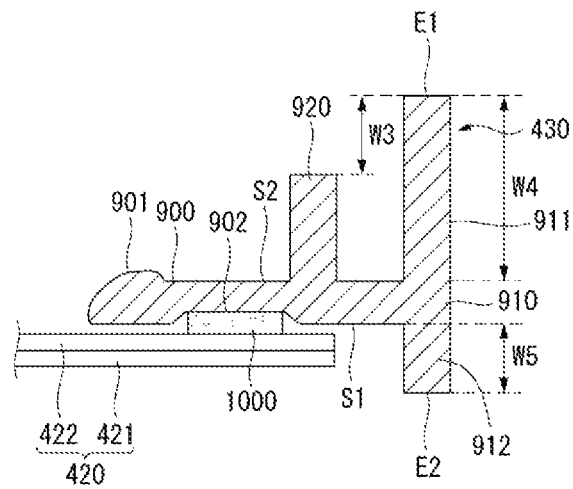

With reference to FIG. 18, the guide panel 430 can further include an inner wall 920. The inner wall 920 can be positioned between the side wall 910 and the convex part 901.

The inner wall 920 can be extended from the upper surface S2 of the base part 900 in a vertical direction (third direction (DR3)).

The inner wall 920 can include a front part 912 which extends to the front in a vertical direction (third direction (DR3)) from the base part 900 and a rear part 911 which extends to the back in a vertical direction (third direction (DR3)) from the base part 900.

At this time, the length W4 of the rear part 911 can be longer than the length W5 of the front part 912.

Also, the length W4 of the rear part 911 of the side wall 910 can be longer than that of the inner wall 920 by a predetermined length W3.

A first end E1 of the side wall 910 corresponds to the end of one side of the rear part 911 while a second end E2 corresponds to the end of one side of the front part 912. Also, the end of the other side of the rear part 911 of the side wall 910 can be connected to the end of the other side of the front part 912.

Figure 19:
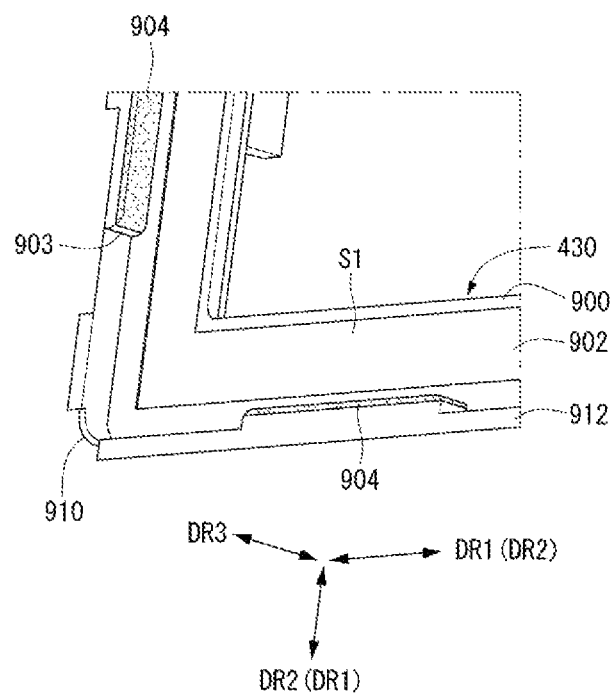

With reference to FIG. 19, a groove 902 is formed on the bottom surface S1 of the guide panel 430.

Also, the front part 912 of the side wall 910 of the guide panel 430 can include a guide part 903 which extends in a horizontal direction (first direction (DR1) and/or second direction (DR2)).

The guide part 903 can prevent the side surface of the display panel 420 from colliding with the front part 912.

Also, a damping part 904 providing elasticity between the guide part 903 and the side surface of the display panel 420. For example, the damping part 904 can contain a resin material providing elasticity.

With reference to FIG. 20, the guide panel 430 can include a plurality of inner walls 920 disposed being separated from each other in a horizontal direction (first direction (DR1) and/or second direction (DR2)).

Also, the side wall 910 can be composed of a plurality of side walls. In other words, a plurality of side walls 910 can be disposed being separated from each other in a horizontal direction (first direction (DR1) and/or second direction (DR2)).

The space between neighboring inner walls in a horizontal direction (first direction (DR1) and/or second direction (DR2)) can be called a path 930.

At least one path 930 can overlap with the inner wall 920.

With reference to FIG. 21, the guide panel 430 can further include a first hook HK1 which stretches out in a horizontal direction (first direction (DR1) and/or second direction (DR2)) from an external surface EXS of the side wall 910.

Figure 22:
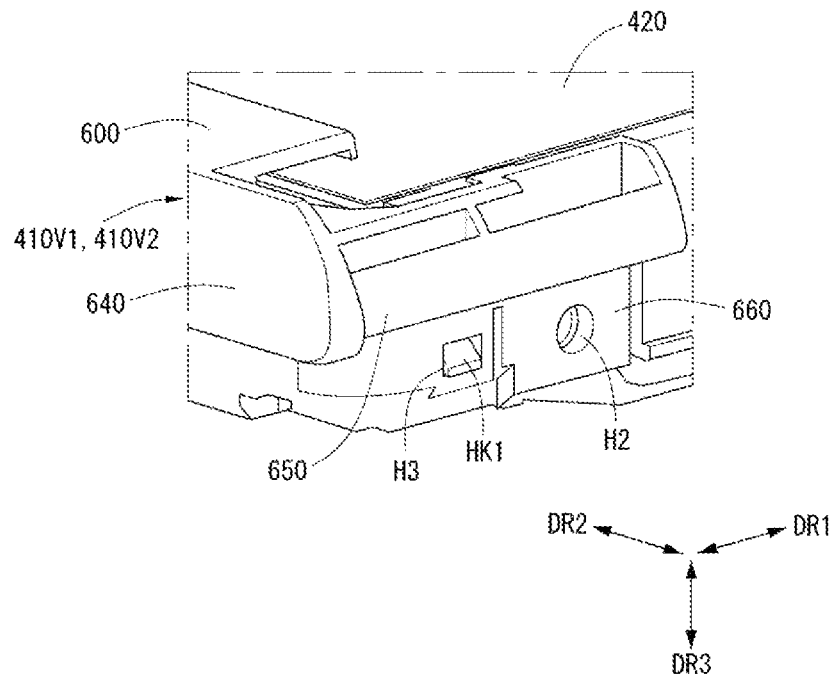

The first hook HK1 can correspond to a predetermined hole formed in the top case 410. For example, as shown in FIG. 22, a third hole H3 corresponding to the first hook HK1 can be formed in the vertical top case 410V1, 410V2.

FIGS. 23 to 46 illustrate the detailed structure of a display device according to the present invention. In what follows, those descriptions already given above will be omitted.

Figure 23:
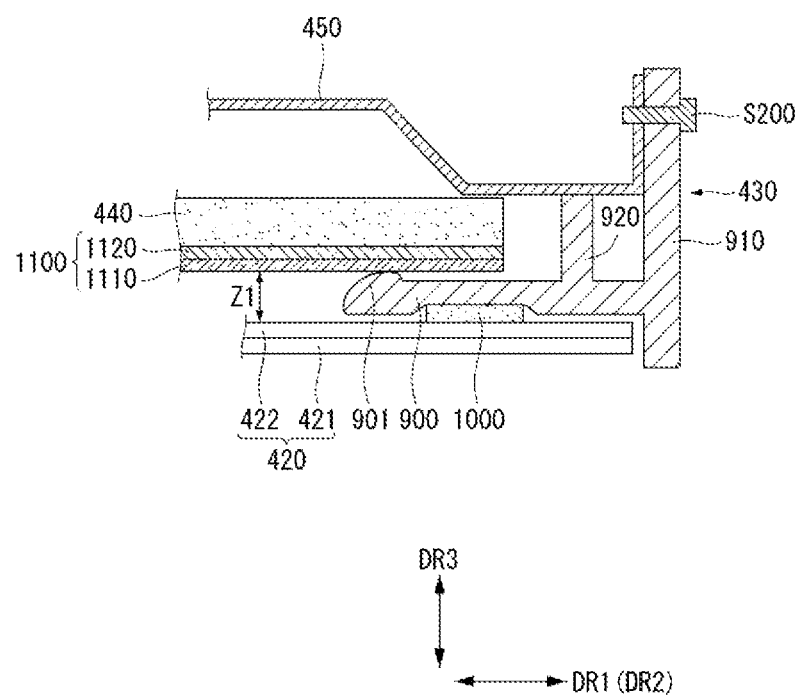
FIGS. 23 to 46 illustrate the detailed structure of a display device according to the present invention.

With reference to FIG. 23, a display device 100 according to the present invention can include an optical layer 1100 and a light guide panel 440.

The optical layer 110 can comprise a plurality of sheets. For example, the optical layer 1100 can include a diffusion sheet 1110 and a prism sheet 1120.

The optical layer 1100 can be disposed in the base part 900 of the guide panel 430. More specifically, the optical layer 1100 can be disposed over the convex part 901 of the base part 900 of the guide panel 430.

The convex part 901 can reduce the area of a contacting surface where the optical layer 1100 and the guide panel 430 contact to each other.

An air gap with a predetermined width can be formed between the optical layer 1100 and the display panel 420 in a vertical direction (third direction (DR3)).

A back cover 450 can be disposed in the back of the optical layer 1100.

The back cover 450 can be laid over the inner wall 920 of the guide panel 430.

Also, the back cover 450 can be connected to the side wall 910 of the guide panel 430 by a predetermined second coupling member S200. A method for connecting the back cover 450 to the guide panel 430 according to the present invention is not limited to the description above.

Figure 24:
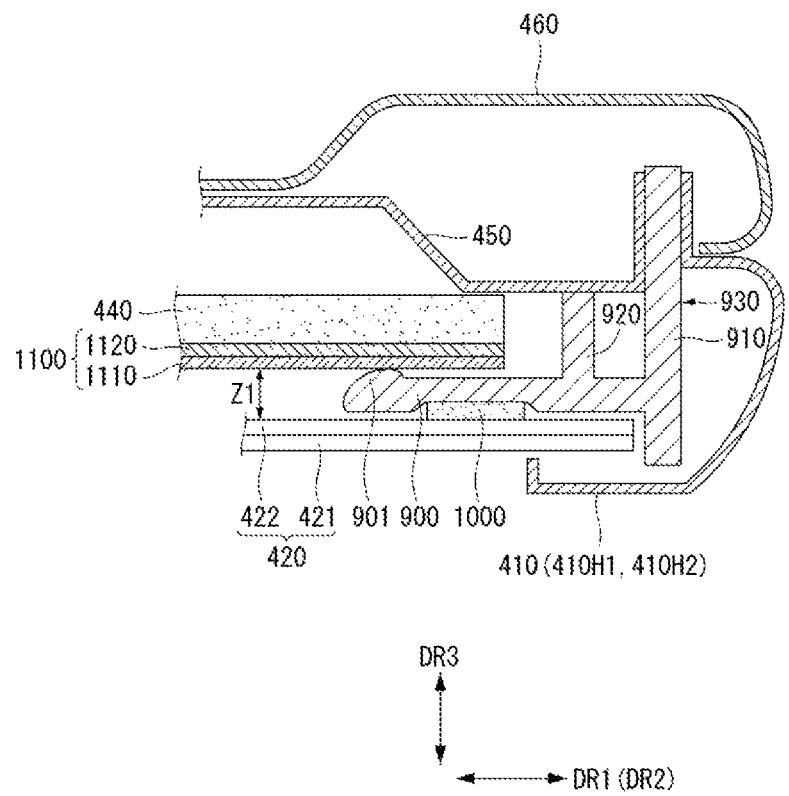

With reference to FIG. 24, a rear cabinet 460 is disposed in the back of the back cover 450, and a top case 410 occluding the edges of the front surface of the display panel 420 can be disposed.

The top case 410 can occlude the side wall 910 of the guide panel 430 from the side surface of the display device.

Figure 25:
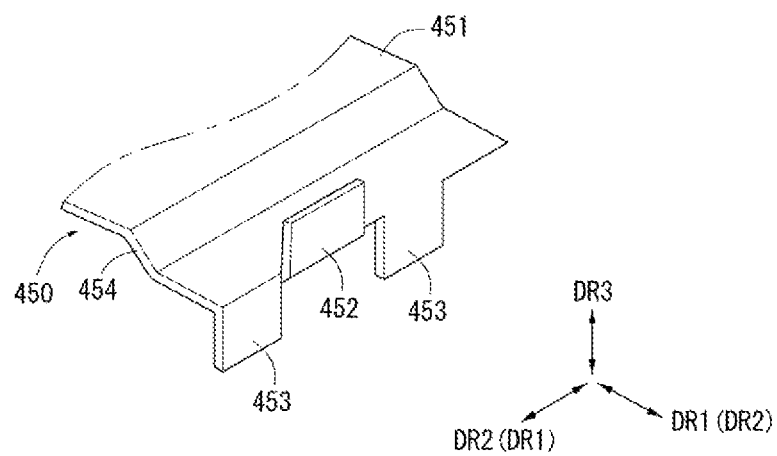

With reference to FIG. 25, the back cover 450 is extended from a horizontal frame part 451 stretching out in a horizontal direction (first direction (DR1) and/or second direction (DR2)) and includes a slanted part 454 stretching out in a slanted direction.

Also, the end part of the back cover 450 can include an up part 452 protruding toward the back in a vertical direction (third direction (DR3)) and a down part 453 protruding toward the front in the vertical direction (third direction (DR3)).

Figure 26:
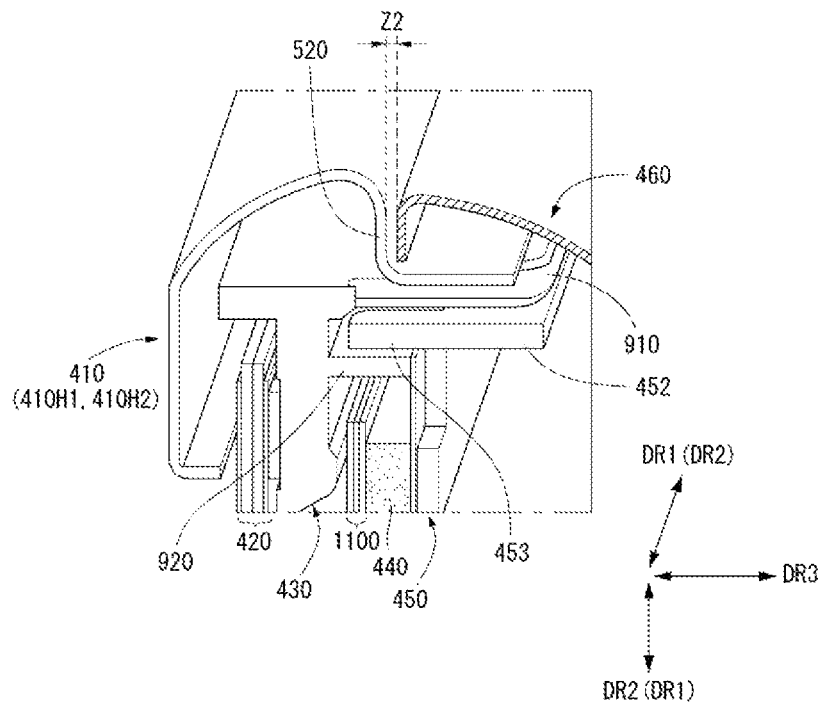

As shown in FIG. 26, the down part 453 can be disposed between the inner wall 920 and the side wall 910 of the guide panel 430.

With reference to FIG. 26, the third part 520 of the top case 410 can be the boundary to which the end part of the rear cabinet 460 corresponds.

While the top case 410 and the rear cabinet 460 are installed, the top case 410 and the end part of the rear cabinet 460 can be separated by a predetermined distance Z2 in a vertical direction (third direction (DR3)).

For example, the third part 520 of the horizontal top case 410H1, 410H2 and the rear cabinet 460 can be separated from each other by a predetermined distance Z2 in a vertical direction (third direction (DR3)).

Figure 27:
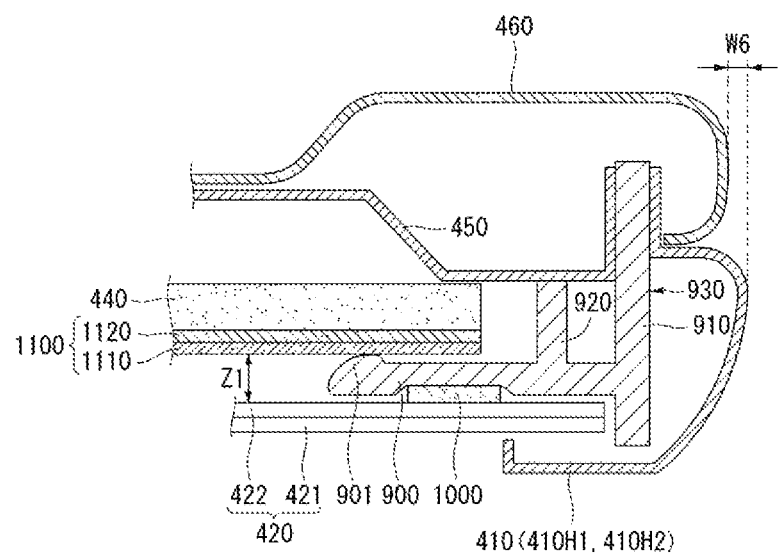

With reference to FIG. 27, at least one of the horizontal top case 410H1, 410H2 and the vertical top case 410V1, 410V2 can be stretched out further by a predetermined distance W6 from the rear cabinet 460 in a horizontal direction (first direction (DR1) and/or second direction (DR2)).

Meanwhile, the rear cabinet 460 can be connected to the back cover 450.

Figure 28:
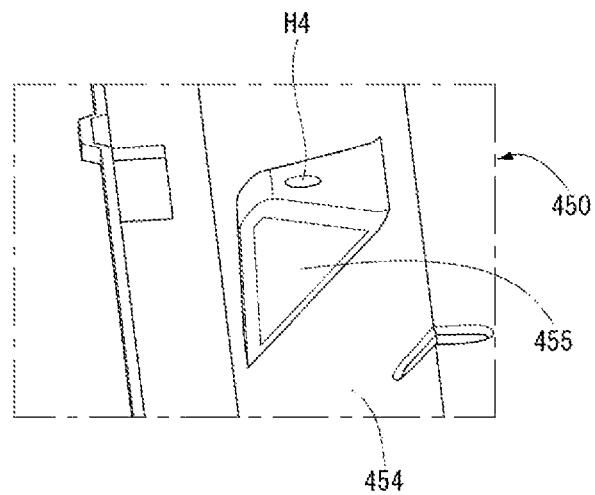

To this end, as shown in FIG. 28, a supporting part 455 which protrudes toward the rear cabinet 460 can be formed in the back cover 450.

A fourth hole H4 can be formed in the supporting part 455.

The supporting part 455 can be formed in the slanted part 454 of the back cover 450.

Figure 29:
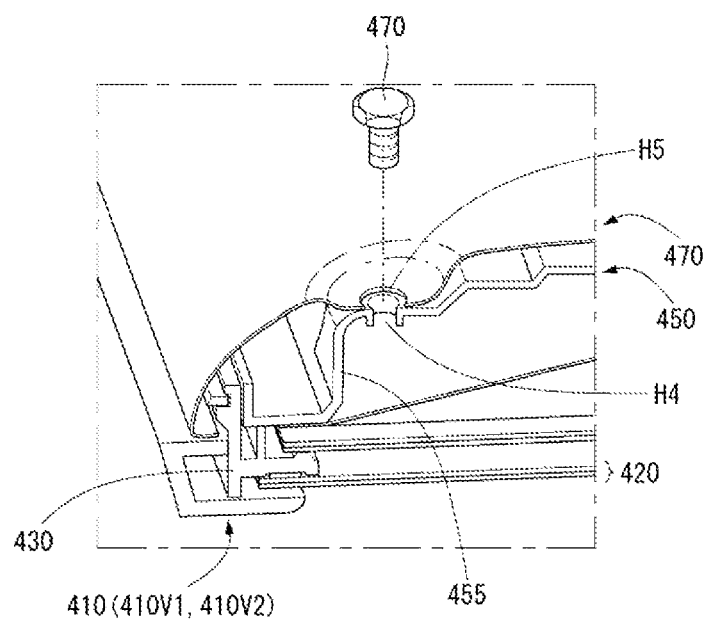

Also, as shown in FIG. 29, a fifth hole H5 corresponding to the fourth hole H4 can be formed in the rear cabinet 460.

A coupling member 470 such as a screw, passing through the fifth hole H5 and the fourth hole H4, can couple the rear cabinet 460 and the back cover 450 together.

In this way, if the supporting part 455 protruding toward the rear cabinet 460 is formed in the back cover 450 and is used to couple the rear cabinet 460 and the back cover 450 together, the coupling position for the rear cabinet 460 and the back cover 450 can be made to be close to the outer rim of the display device. Accordingly, while the rear cabinet 460 and the back cover 450 can be coupled with each other more rigidly, thickness of the display device due to the coupling of the rear cabinet 460 and the back cover 450 can be prevented from being increased.

Figure 30:
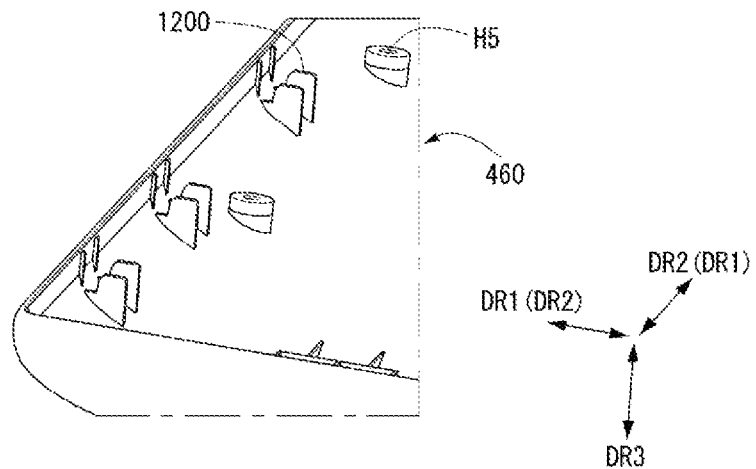

With reference to FIG. 30, a protruding part 1200 for maintaining a gap between the end part of the rear cabinet 460 and the end part of the back cover 450 can be formed in the boundary of the rear cabinet 460.

The protruding part 1200 of the rear cabinet 460 can stretch out toward the back cover 450 from the inner-side surface of the rear cabinet 460 in a vertical direction (third direction (DR3)).

Figure 31:
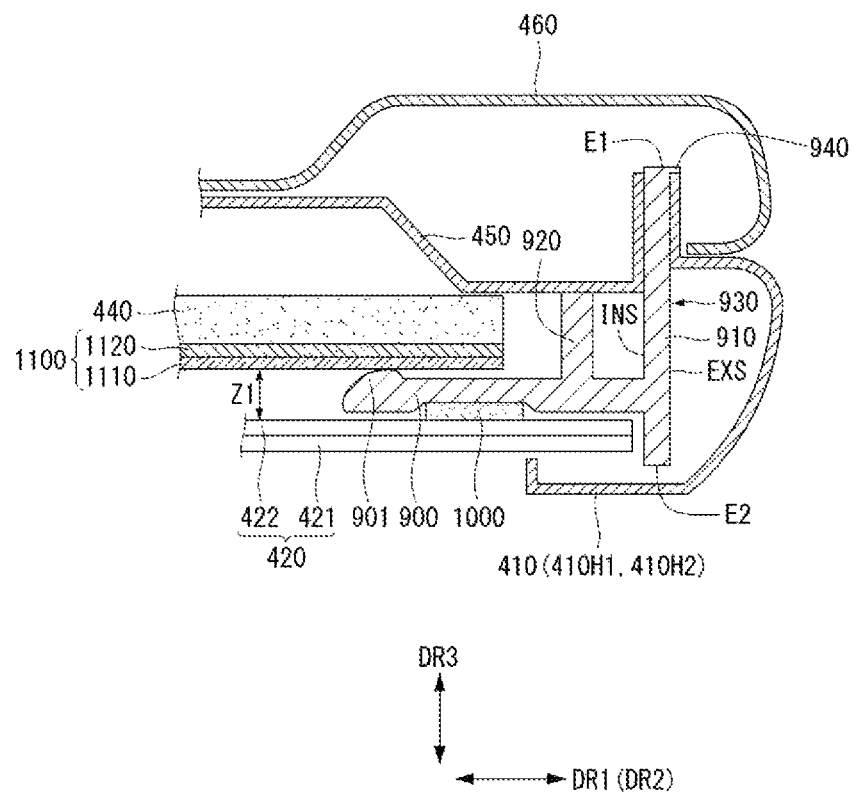

With reference to FIG. 31, the guide panel 430 can include a shoulder part 940 protruding in a horizontal direction (first direction (DR1) and/or second direction (DR2)) from an external-side surface (EXS) of the first end part (E1) of the side wall 910.

The end part of the top case 410 can be hooked at the shoulder part 940 of the guide panel 430.

Figure 32:
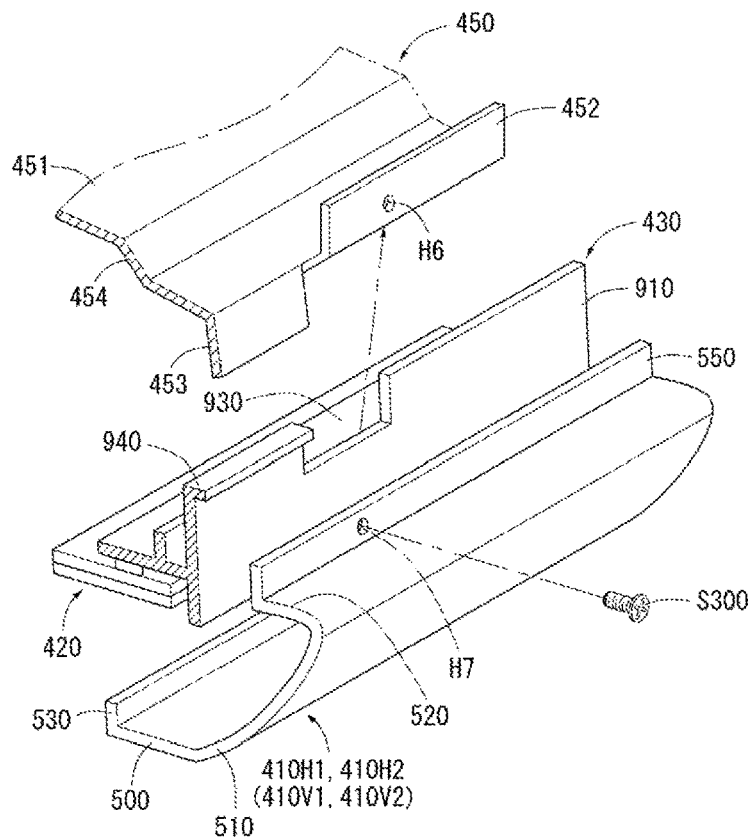

With reference to FIG. 32, the top case 410 and the back cover 450 can be connected to each other.

To this end, a seventh hole H7 can be formed in the sixth part 550 of the horizontal top case 410H1, 410H2 among the top case 410, and a sixth hole H6 corresponding to the seventh hole H7 can be formed in the back cover 450. For example, the sixth hole H6 can be formed in the up part 452 of the back cover 450.

Figure 33:
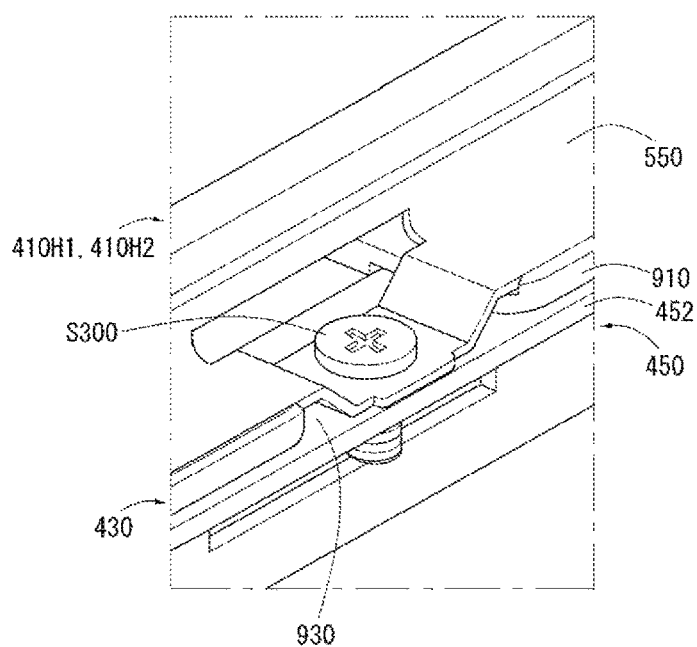

A predetermined third coupling member S300 penetrating the seventh hold H7 and the sixth hole H6 can couple the horizontal top case 410H1, 410H2 and the back cover 450. At this time, as shown in FIG. 33, the third coupling member S300 can couple the horizontal top case 410H1, 410H2 and the back cover 450 together though the path 930 of the side wall 910 of the guide panel 430.

Meanwhile, the horizontal top case 410H1, 410H2, vertical top case 410V1, 410V2, and the back cover 450 can be connected to each other.

Figure 34:
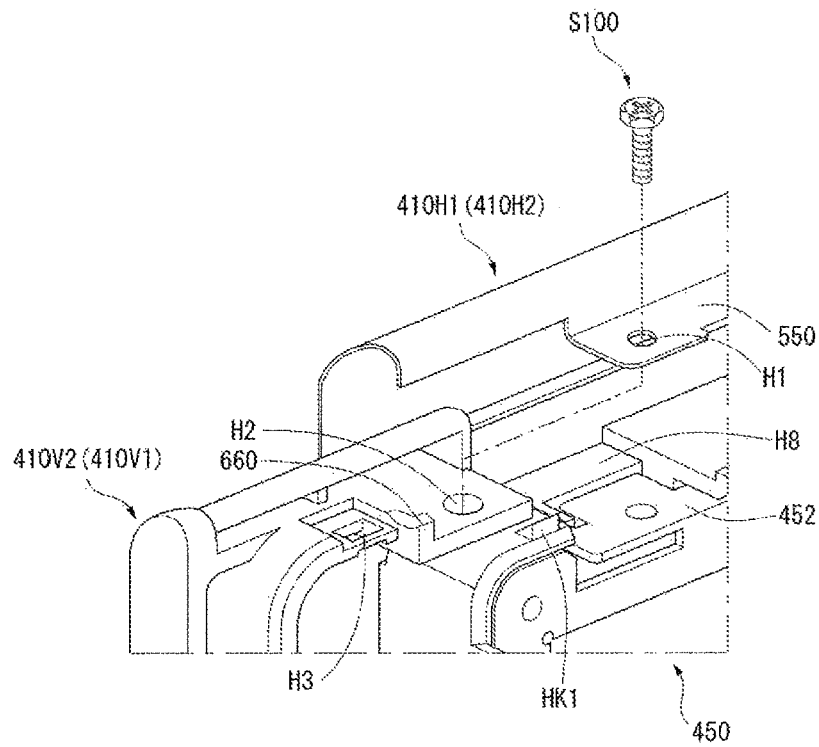

To this end, as shown in FIG. 34, an eighth hole H8 can be formed in the back cover 450. For example, the eighth hole H8 can be formed in the up part 452 of the back cover 450.

The first coupling member S100, penetrating the first hole H1 of the horizontal top case 410H1, 410H2, the second hole H2 of the vertical top case 410V1, 410V2, and the eighth hole H8 of the back cover 450, can couple the horizontal top case 410H1, 410H2, the vertical top case 410V1, 410V2, and the back cover 450.

Figure 35:
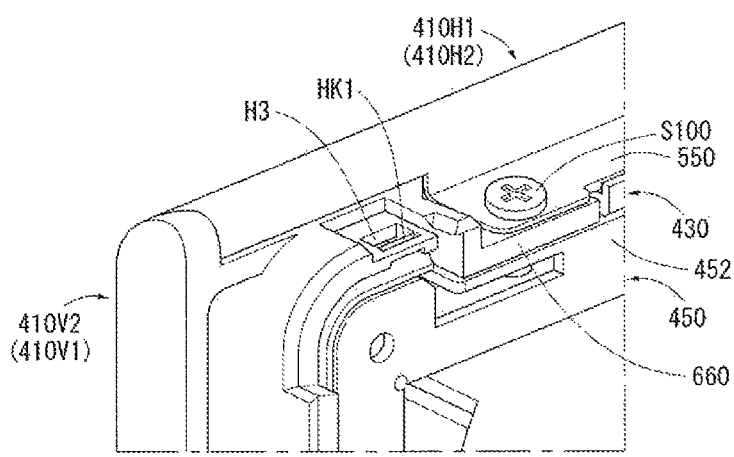

FIG. 35 illustrates an arrangement in which the horizontal top case 410H1, 410H2, the vertical top case 410V1, 410V2, and the back cover 450 are coupled together by the first coupling member S100.

Figure 36:
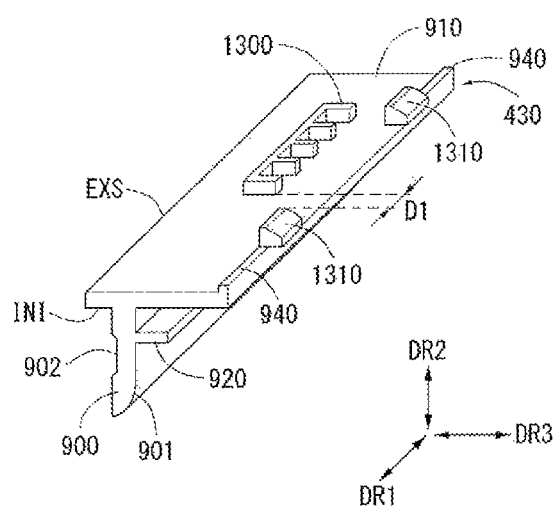

With reference to FIG. 36, the guide panel 430 can include a protruding part 1300, 1310 which extends from the side wall 910 in a horizontal direction (first direction (DR1) and/or second direction (DR2)).

More specifically, the protruding part 1300, 1310 can be stretched out in a horizontal direction (first direction (DR1) and/or second direction (DR2)) from the external-side surface (EXS) of the side wall 910 of the guide panel 430.

The protruding part 1300, 1310 can include a first protruding part 1300 and a second protruding part 1310 being separated from each other by a predetermined distance D1 in a direction parallel to the long side (LS) of the display panel 420, namely, in the first direction (DR1) between horizontal directions (first direction (DR1) and/or second direction (DR2)).

Figure 37:
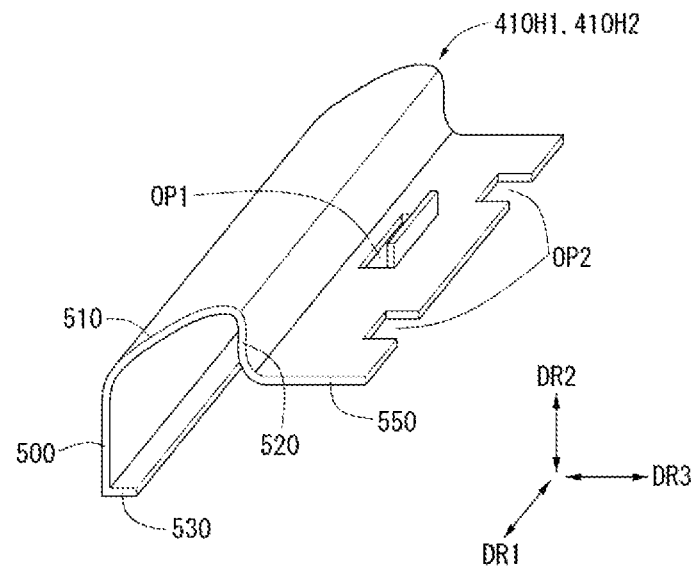

With reference to FIG. 37, a first opening OP1 corresponding to the first protruding part 1300 and a second opening OP2 corresponding to the second protruding part 1310 can be formed in the sixth part 550 of the horizontal top case 410H1, 410H2.

Figure 38:
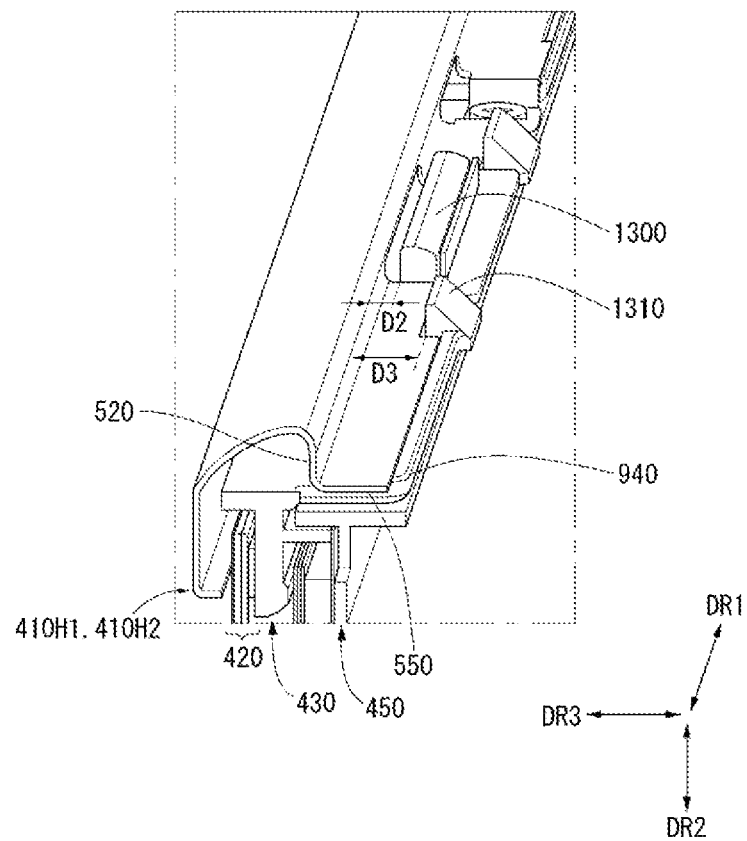

With reference to FIG. 38, the first protruding part 1300 of the guide panel 430 can be inserted into the first opening OP1 of the horizontal top case 410H1, 410H2, and the second protruding part 1310 can be inserted into the second opening OP2.

At this time, the gap D2 between the third part 520 of the horizontal top case 410H1, 410H2 and the first protruding part 1300 in a vertical direction (third direction (DR3)) can be different from the gap D3 between the third part 520 and the second protruding part 1310. Preferably, the gap D2 between the third part 520 of the horizontal top case 410H1, 410H2 and the first protruding part 1300 in a vertical direction (third direction (DR3)) can be smaller than the gap D3 between the third part 520 and the second protruding part 1310.

The end part of the rear cabinet 460 can be disposed between the third part 520 and the first protruding part 1300 or between the third part 520 and the second protruding part 1310.

Figure 39:
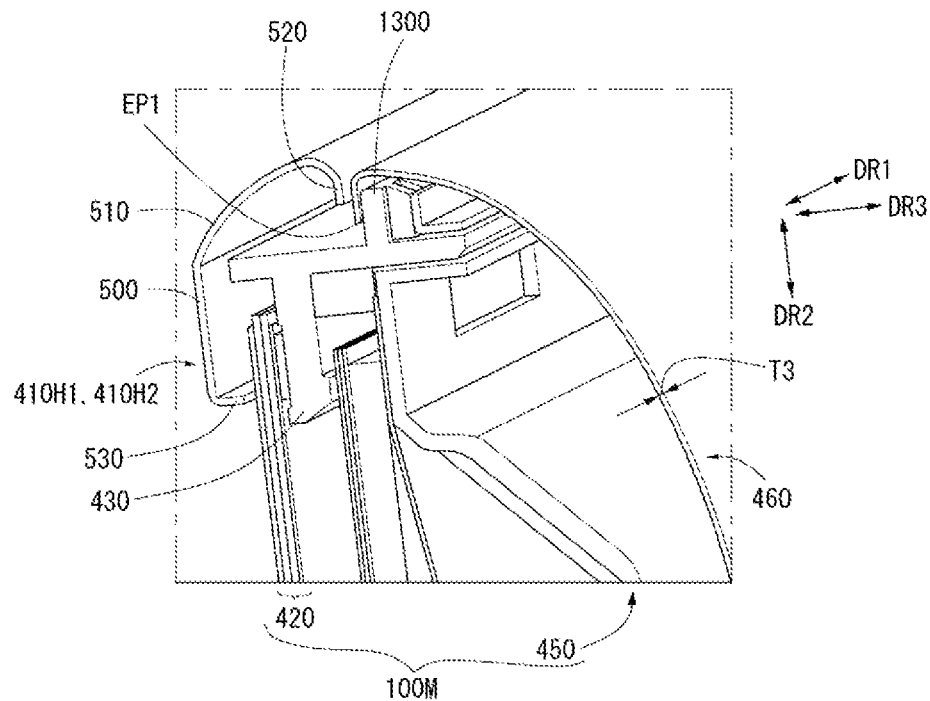

For example, as in the case of FIG. 39, the end part EP1 of the rear cabinet 460 can be disposed between the third part 520 and the first protruding part 1300.

In this case, wall thickness of the rear cabinet 460 can be a relatively small, third wall thickness T3. To this end, at least the end part of the rear cabinet 460 can contain a metallic material.

In case the rear cabinet 460 is made of a metallic material, it can be manufactured by using a press forming method. Accordingly, the wall thickness T3 of the rear cabinet 460 can be made to be relatively small.

To put differently, the end part EP1 of the rear cabinet 460 disposed in the back of the display module 100M is hooked at the shoulder part which extends in a horizontal direction (first direction (DR1) and/or second direction (DR2)) from the side surface of the display module 100M.

Figure 40:
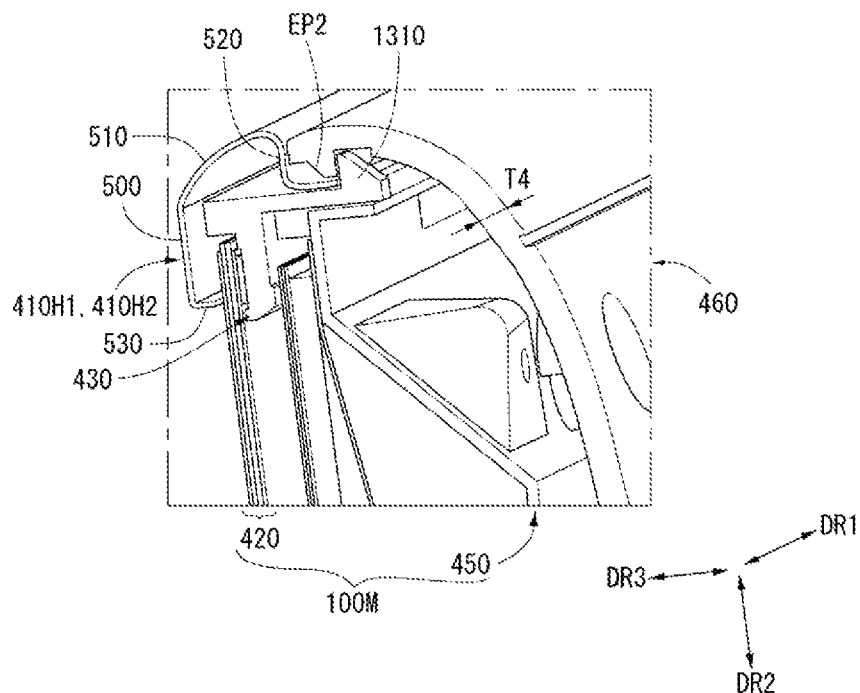

Or, as shown in FIG. 40, the end part EP2 of the rear cabinet 460 can be disposed between the third part 520 and the second protruding part 1310.

In this case, wall thickness of the rear cabinet 460 can be a fourth wall thickness T4 larger than the third wall thickness T3. In this case, at least the end part of the rear cabinet 460 can contain a plastic material.

In case the rear cabinet 460 is made of a plastic material, it can be manufactured by employing a molding process. Accordingly, the wall thickness T4 of the rear cabinet 460 can be made to be relatively large.

Figure 41:
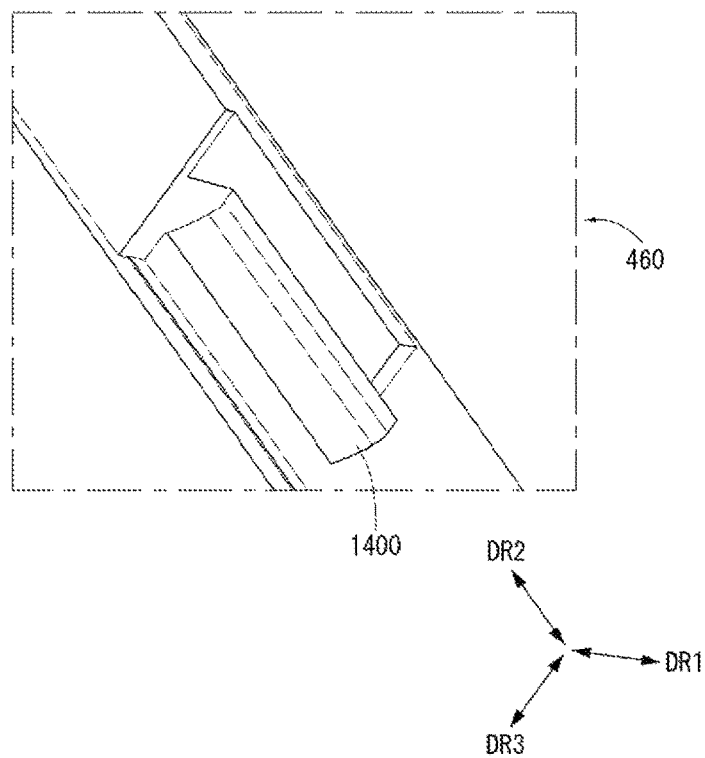

As described above, in order to insert the rear cabinet 460 of which the wall thickness is relatively thick between the third part 520 and the second protruding part 1310, as shown in FIG. 41, it may be preferable to form another protruding part 1400 in the end part of the rear cabinet 460.

Another protruding part 1400 can extend from the end part of the rear cabinet 460 in the first direction (DR1).

Figure 42:
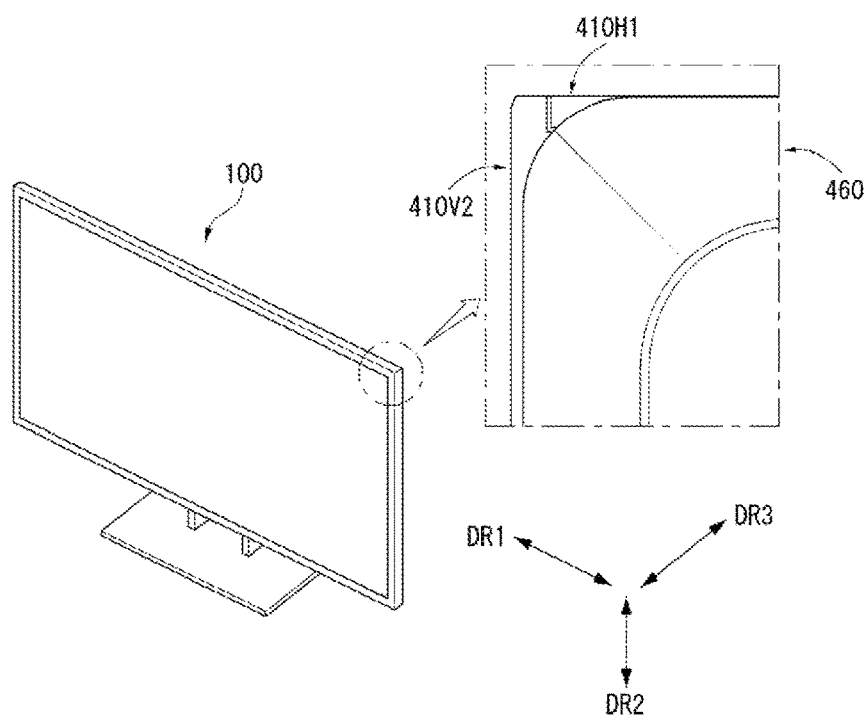
Figure 43:
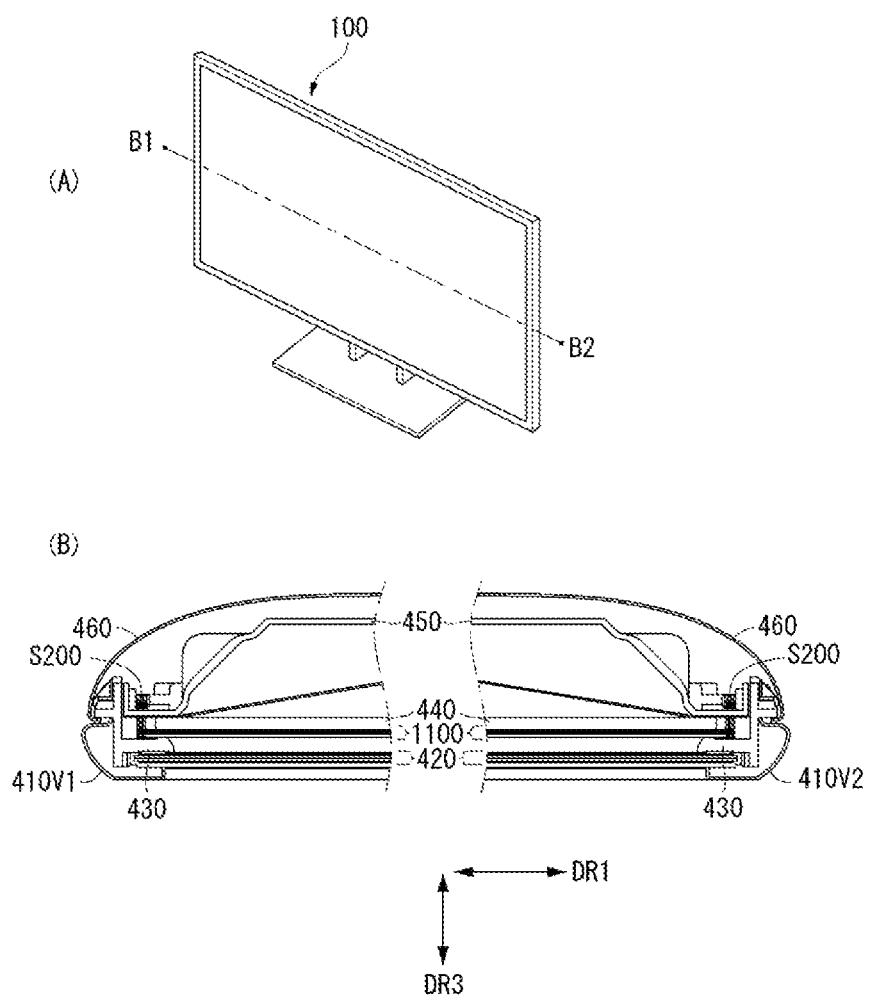

As shown in FIG. 42, while the rear cabinet 460 and the top case 410 are coupled together, part of at least one of the horizontal top case 410H1, 410H2 and the vertical top case 410V1, 410V2 can be exposed in the corner area of the display device 100 when viewed from the back of the display device 100.

As shown in FIG. 43(A), a cross-sectional view of the display device 100 cut along a B1-B2 line can be as shown in FIG. 43(B).

Descriptions of FIG. 43(B) have already been given in detail.

As shown in FIG. 44(B), a cross-sectional view of the display device 100 along a B3-B4 line can be as shown in FIG. 44(A) for a first long side area (LS1) of the display device 100.

Descriptions of FIG. 44(A) have already been given in detail.

Figure 44:
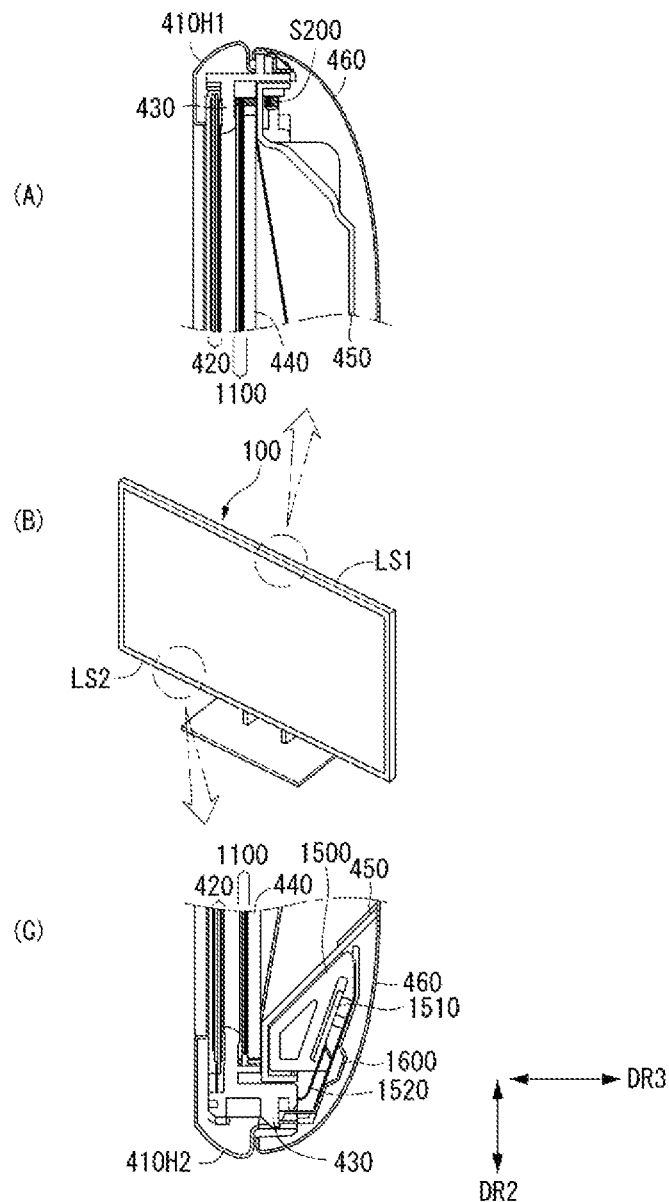
Figure 45:
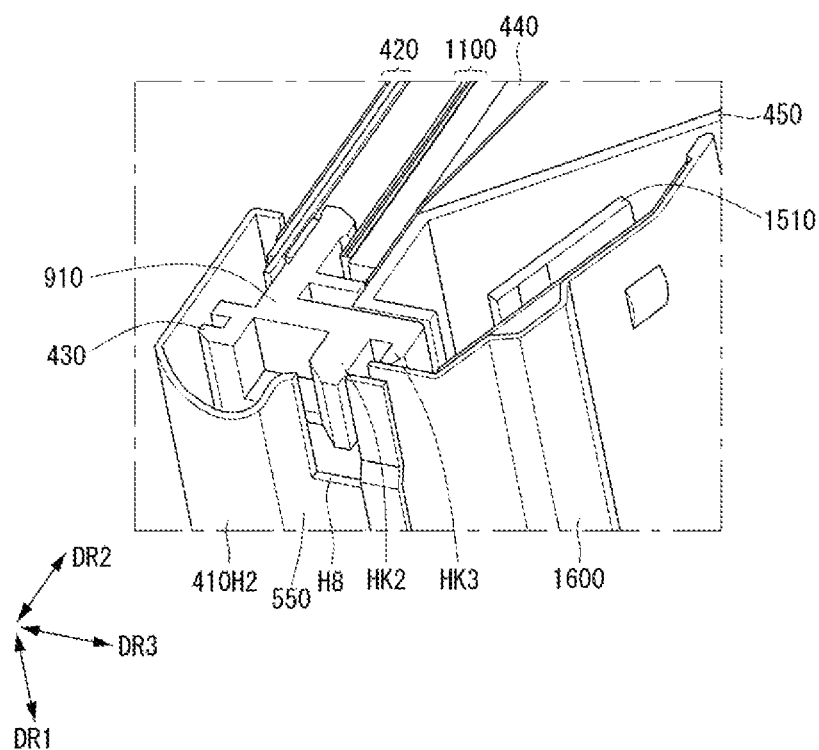

FIG. 44(C) to FIG. 45 show the second long side area (LS2) of the display device 100.

With reference to FIG. 44(C), a supporting structure 1500 can be disposed between the back cover 450 and the rear cabinet 460 in the second long side area (LS2) of the display device 100.

Also, a driving board (PCB) 1510 and a flexible PCB 1520 can be disposed between the back cover 450 and the rear cabinet 460 in the second long side area (LS2) of the display device 100.

The flexible PCB 1520 can deliver a driving signal that the driving board 1510 provides to the display panel 420.

Also, a lower cover 1600 can be disposed between the back cover 450 and the rear cabinet 460 in the second long side area (LS2) of the display device 100.

As shown in FIG. 45, the end part of one side of the lower cover 1600 can be disposed between a second horizontal top case 410H2 and the guide panel 430.

An eighth hole H8 can be formed in the sixth part 550 of the second horizontal top case 410H2.

Also, a second hook HK2 which is inserted into the eighth hole H8 can be formed in the guide panel 430.

Also, a third hook HK3 for blocking the lower cover 1600 can be formed in the end part of the side wall 910 of the guide panel 430.

Figure 46:
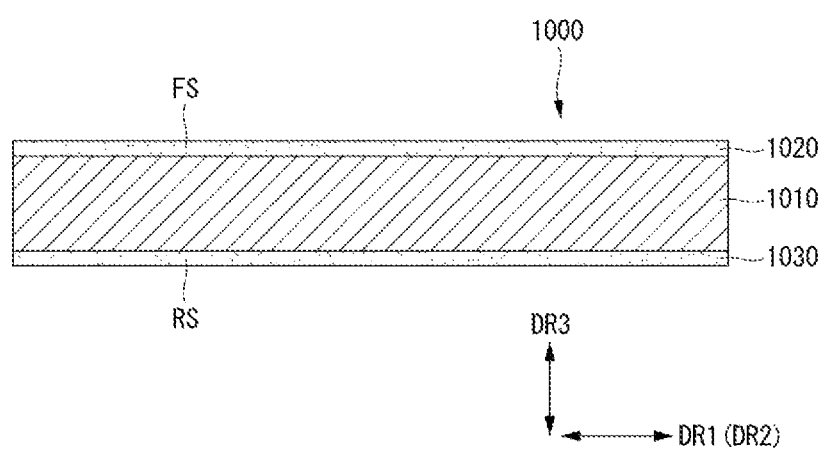

With reference to FIG. 46, an adhesive layer 1000 which attaches the guide panel 430 to the rear surface of the display panel 420 can comprise a base layer 1010, first layer 1020 being formed on a first surface (FS) of the base layer 1010 and having an adhesive property, and second layer 1030 being formed on a second surface (RS) of the base layer 1010 and having an adhesive property.

At this time, it is preferable that the base layer 1010 is made of an elastic material. For example, the base layer 1010 can be made of urethane foam.

The adhesive layer 1000 built on the aforementioned structure can have not only the adhesive property but also elasticity and flexibility. Accordingly, an external force applied to the guide panel 430 is blocked by the adhesive layer 1000, thereby being prevented from being applied to the display panel 420.

The adhesive layer 1000 constructed upon the structure described above can be called a foam pad.

FIGS. 47 to 59 illustrate the detailed structure of another display device according to the present invention. In what follows, those descriptions already given above will be omitted.

Figure 47A:
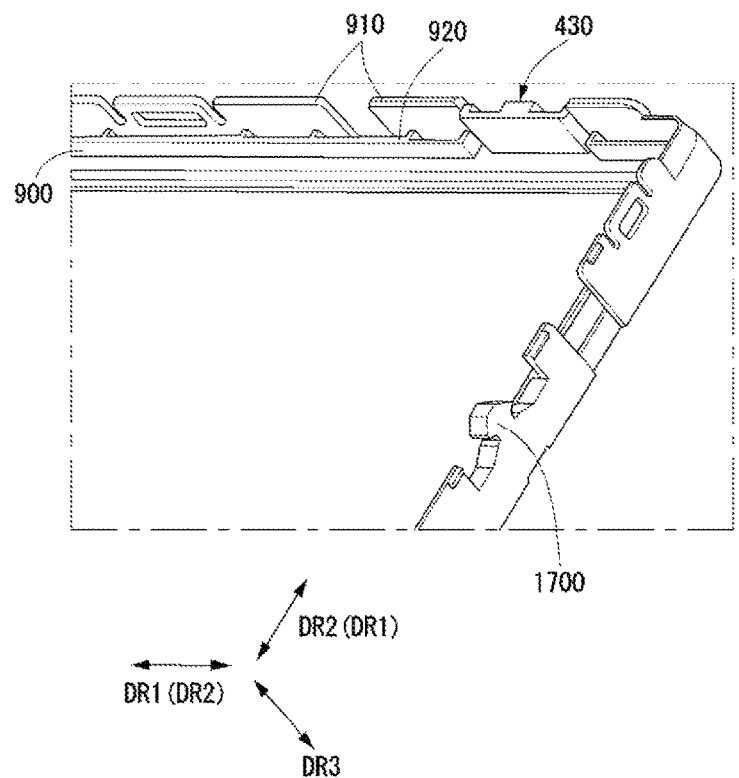
FIGS. 47*a* to 59 illustrate the detailed structure of another display device according to the present invention.
Figure 47B:
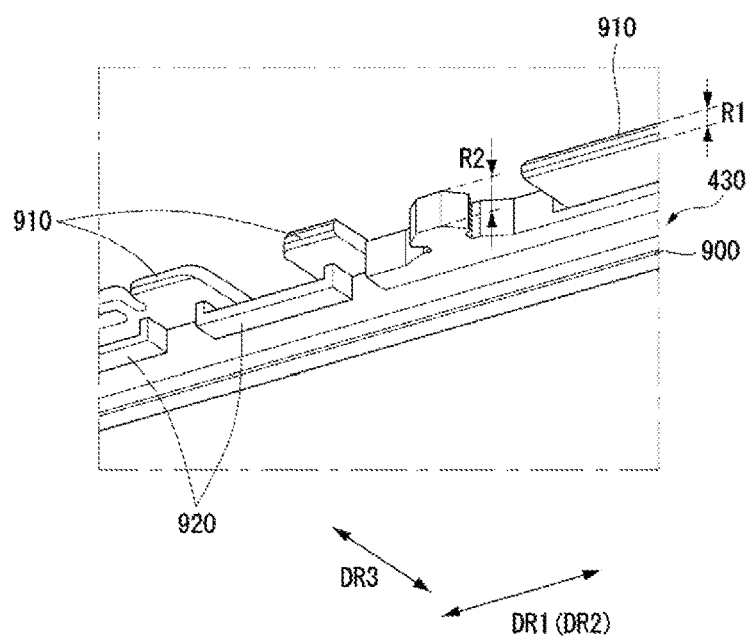

With reference to FIGS. 47a and 47b, the guide panel 430 can further comprise a protruding part 1700 which extends in a vertical direction (third direction (DR3)).

The protruding pat 1700 can be extended from the base part 900 of the guide panel 430 in a vertical direction (third direction (DR3)).

Also, the protruding part 1700 can be disposed between side walls 910 extending in a vertical direction from the base part 900.

Though not shown, the protruding part 1700 can be inserted into a groove (not shown in the figure) formed in the rear cabinet 460. In this case, even if the number of coupling members such as screws is reduced, a structural stability of a display device according to the present invention can be improved.

As shown in FIG. 47b, it is preferable that the thickness R2 of the protruding part 1700 is thicker than that R1 of the side wall 910 so that the protruding part can be inserted into a groove (which will be described in more detail later) more effectively and structural stability can be improved.

In this case, since the thickness R2 of the protruding part 1700 can be made to be thick enough, rigidity of the protruding part 1700 can be improved, and at the same time, a possibility of malfunction that the protruding part 1700 is not inserted into the groove (not shown) can be reduced.

Figure 48:
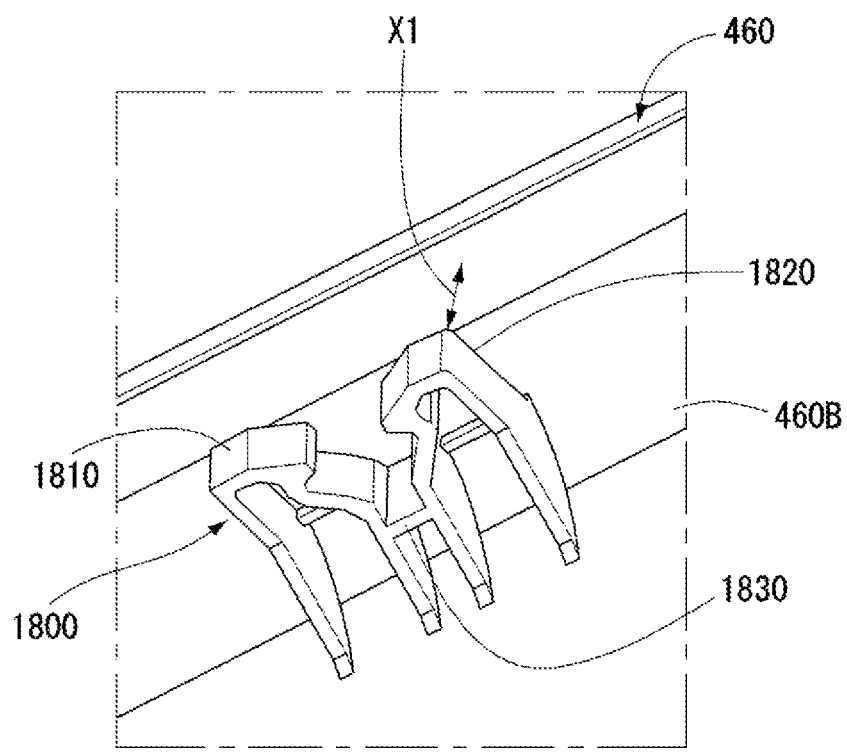

With reference to FIG. 48, the rear cabinet 460 can include at least one groove 1800 into which the protruding part 1700 is inserted.

The groove 1800 can include a first latch 1810 and a second latch 1820 protruding in a vertical direction (third direction (DR3)) from the body 460B of the rear cabinet 1700.

It is preferable that the first 1810 and the second latch 1820 have elasticity so that they can be spread out in a side direction.

The first latch 1810 or the second latch 1820 can be separated from the body 460B of the rear cabinet 1700 by a predetermined distance X1 in a horizontal direction (first direction (DR1) and/or second direction (DR2)). In other words, a space with a predetermined width X1 can be prepared between the first latch 1810 or the second latch 1820 and the body 460B of the rear cabinet 1700 in the horizontal direction (first direction (DR1) and/or second direction (DR2)).

The groove 1800 can further include a connecting part 1830 which connects the lower part of the first latch 1810 to the lower part of the second latch 1820.

Figure 49:
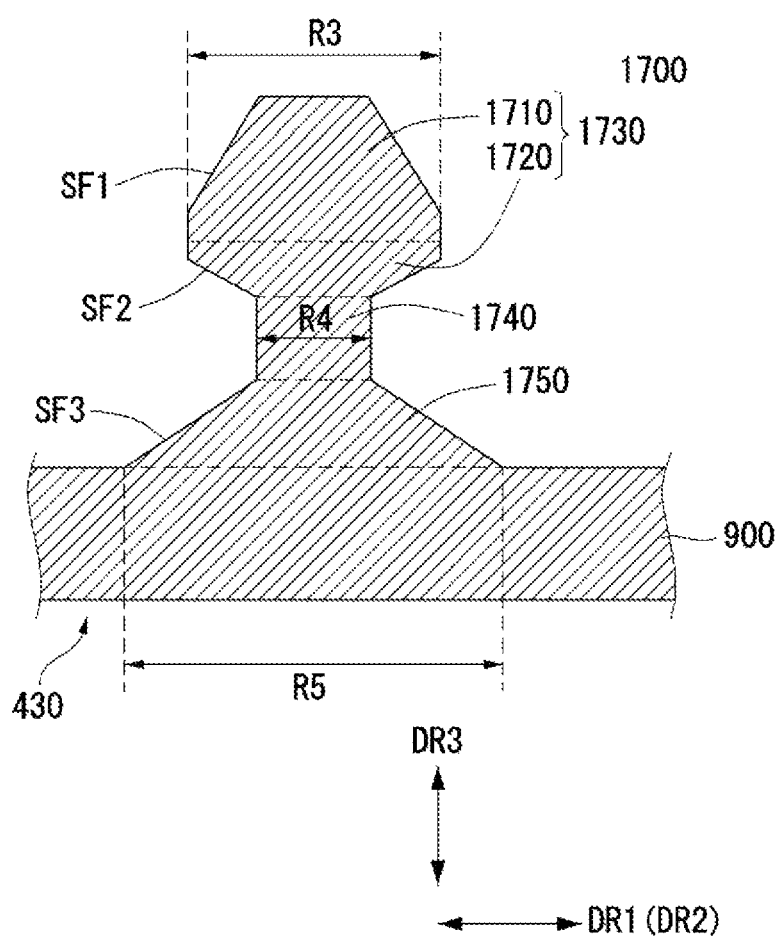

With reference to FIG. 49, the protruding part 1700 can extend from the base part 900 in the guide panel 430.

Also, the protruding part 1700 can include a head portion 1730 and a leg portion 1740 disposed between the head portion 1730 and the base part 900.

The width R4 of the leg portion 1740 can be smaller than the maximum width R3 of the head portion 1730.

A bottom portion 1750 can be disposed between the leg portion 1740 and the base part 900.

The maximum width R5 of the bottom portion 1750 can be larger than the width R4 of the leg portion 1740. The maximum width R5 of the bottom portion 1750 can be larger than the maximum width R3 of the head portion 1730.

The head portion 1730 can include a first part 1710 of which the width is reduced as the first part is getting farther from the leg portion 1740 and a second part 1720 of which the width is increased as the second part is getting farther from the leg portion 1740.

With respect to the base part 900, the slant angle of the side surface (first surface (SF1)) of the first part 1710 of the head portion 1730 can be smaller than the slant angle of the side surface (second surface (SF2)) of the second part 1720.

With respect to the base part 900, the slant angle of the side surface (third surface (SF3)) of the bottom portion 1750 can be smaller than the slant angle of the side surface (first surface (SF1)) of the first part 1710 and the slant angle of the side surface (second surface (SF2)) of the second part 1720.

Figure 50:
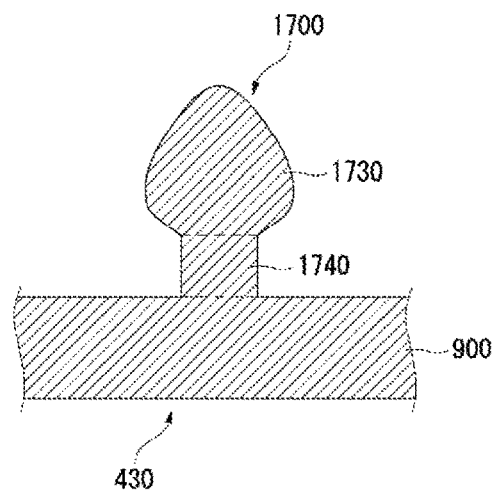

The shape of the protruding part 1700 according to the present invention may not be limited to the shape shown in FIG. 49. For example, as shown in FIG. 50, the head portion of the protruding part 1700 can assume an oval shape.

A sequence in which the protruding part 1700 is inserted into the groove 1800 can be described as follows.

Figure 51A:
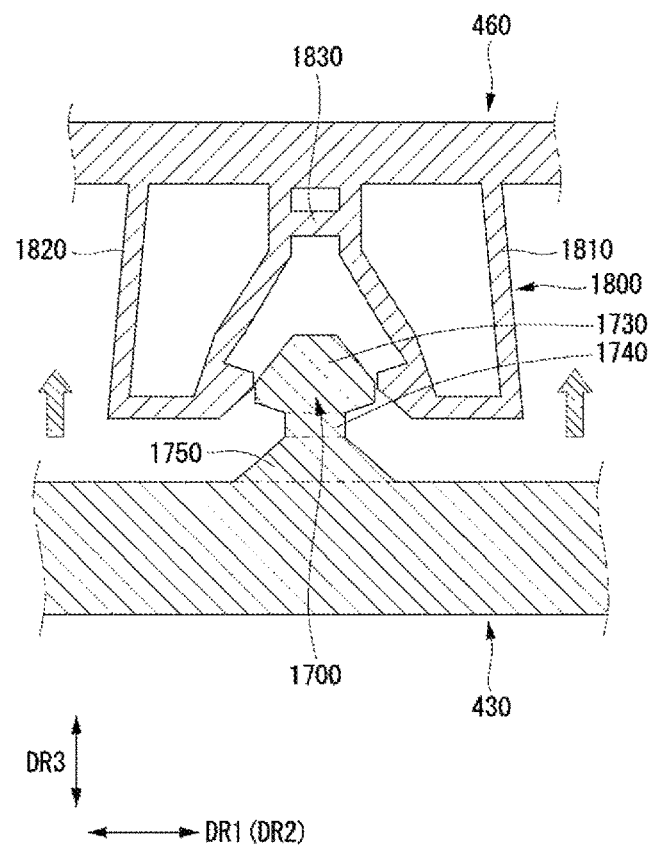

With reference to FIG. 51A, the head portion 1730 of the protruding part 1700 can enter the groove 1800 in a direction indicated by the arrow, pushing the first latch 1810 and the second latch 1820 sideways At this time, since the first 1810 and the second latch 1820 have elasticity, they can be bent sideways as they are being pushed by the head portion 1730.

At this time, as the connecting part 1830 connects the bottom portion of the first latch 1810 and the bottom portion of the second latch 1820 to each other, the first 1810 and the second latch 1820 can be prevented from being excessively spread out sideways.

Figure 51B:
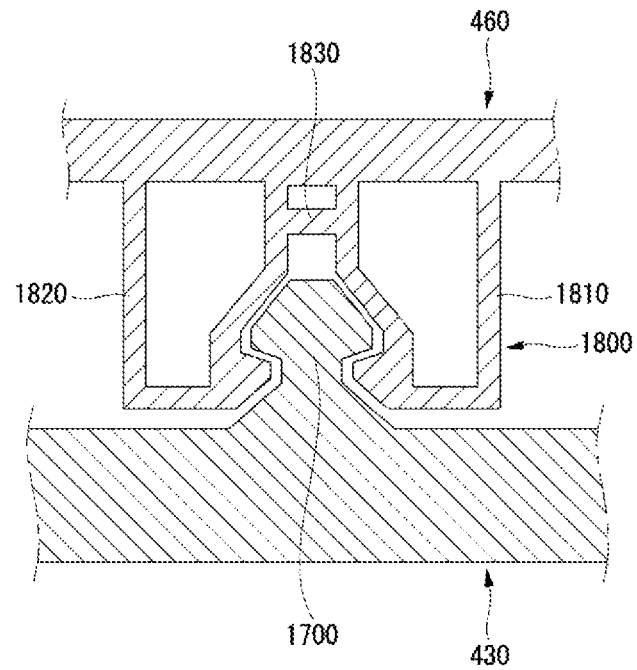

At this time, if the head portion 1730 continues to move forward in a direction indicated by the arrow, as shown in FIG. 51B, the protruding part 1800 can be inserted between the first latch 1810 and the second latch 1820.

Preferably, if the head portion 1730 of the protruding part 1700 is inserted into the groove 1800, it is possible for the first latch 1810 and the second latch 1820 to enclose the head portion 1730.

Figure 52:
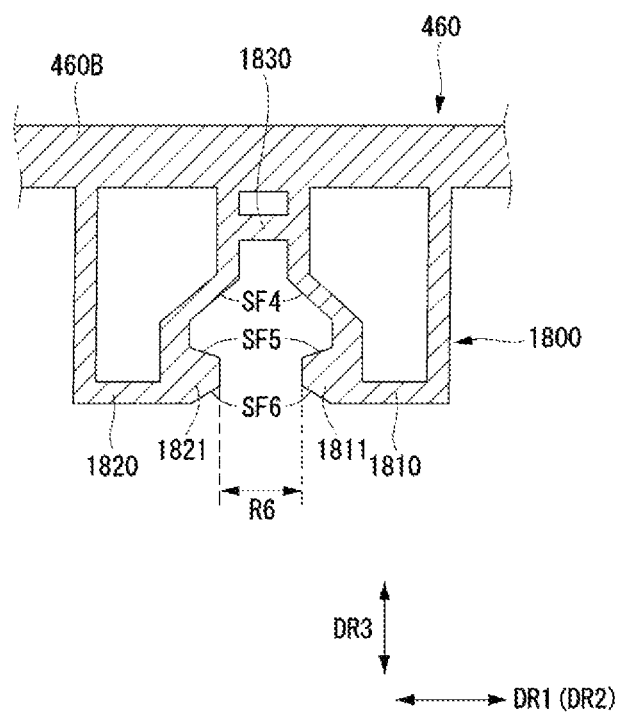

With reference to FIG. 52, the first latch 1810 can include a first protruding part 1811 protruding convexly toward the second latch 1820, and the second latch 1820 can include a second protruding part 1821 protruding convexly toward the first latch 1810.

The first protruding part 1811 and the second protruding part 1821 can enclose and support the head portion 1730.

To this end, the gap R6 with the first protruding pat 1811 of the first latch 1810 and the second protruding part 1821 of the second latch 1820 can be smaller than the maximum width R3 of the head portion 1730 of the protruding part 1700.

The first latch 1810 and the second latch 1820 can include a fourth surface (SF4) corresponding to the side surface (first surface (SF1)) of the first part 1710 of the protruding part 1710, fifth surface (SF5) corresponding to the side surface (second surface (SF2)) of the second part 1720, and sixth surface (SF6) corresponding to the side surface (third surface (SF3)) of the bottom portion 1750.

At this time, with respect to the body 460B of the rear cabinet 460, the slope of the fourth surface (SF4) can be smaller than that of the fifth surface (SF5) while the slope of the sixth surface (SF6) can be smaller than that of the fourth surface (SF4) and that of the fifth surface (SF5).

As described above, as the slope of the sixth surface (SF6) is slower than the slopes of the fourth SF4 and the fifth surface (SF5), the head portion 1730 of the protruding part 1700 can be inserted effectively into the groove by sliding along the sixth surface (SF6). Moreover, if the slope of the first surface (SF1) is slower than that of the second surface (SF2) in the protruding part 1700, the first part 1710 of the head portion 1730 of the protruding part 1700 can be inserted more effectively into the groove by sliding along the surface.

Also, if the slope of the second surface (SF2) of the second part 1720 of the head portion 1730 is steeper than the slope of the first surface (SF1), the protruding part 1700 can be effectively kept being inserted into the groove 1800, and by applying an appropriate force, the protruding part 1700 can be separated from the groove.

Accordingly, an assembly process and a disassembly process of a display device according to the present invention can be made much simpler. Also, even if the number of coupling members such as screws is reduced, structural stability of the display device can be prevented from being degraded.

Figure 53:
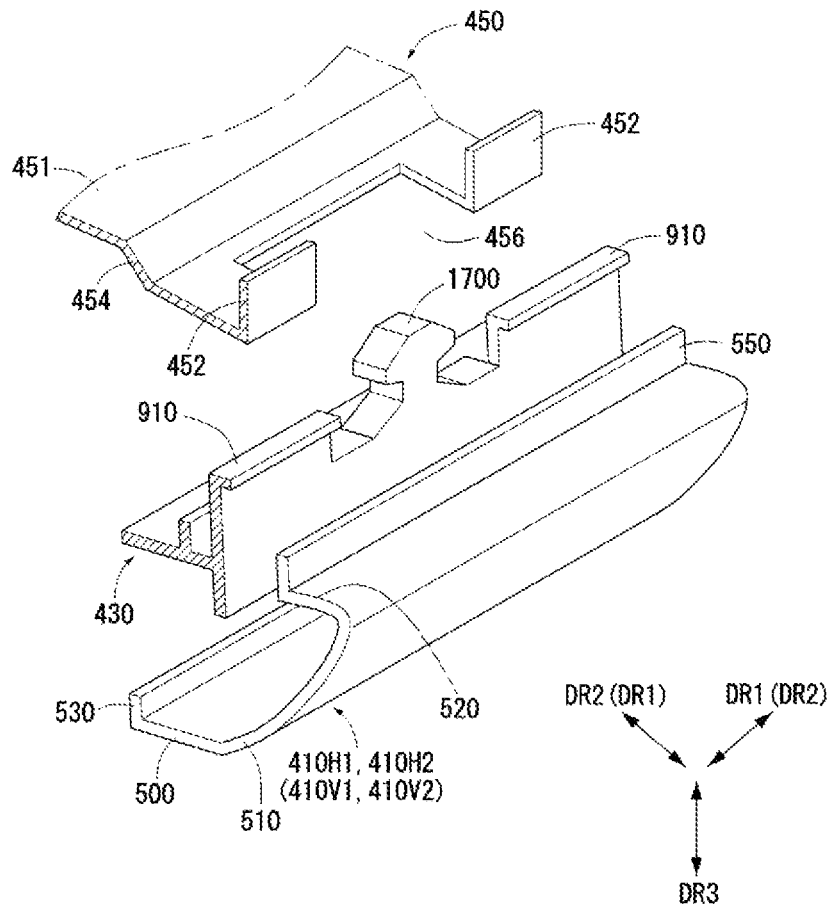

With reference to FIG. 53, the back cover 450 can include a protruding pat 1700 and/or an opening 456 corresponding to a groove 1800.

More specifically, the end part of the back cover 450 can include a plurality of up parts 452 protruding in a vertical direction (third direction (DR3)), and the opening can be disposed between the up parts 452.

Also, the sixth part 550 of the top case 410H1, 410H2, 410V1, 410V2, namely the side part 550 can cover at least part of the guide panel 430. To put differently, the sixth part 550 of the top case 410H1, 410H2, 410V1, 410V2 can occlude at least part of the side wall 910 of the guide panel 430 and/or external surface of the protruding part 1700.

Figure 54:
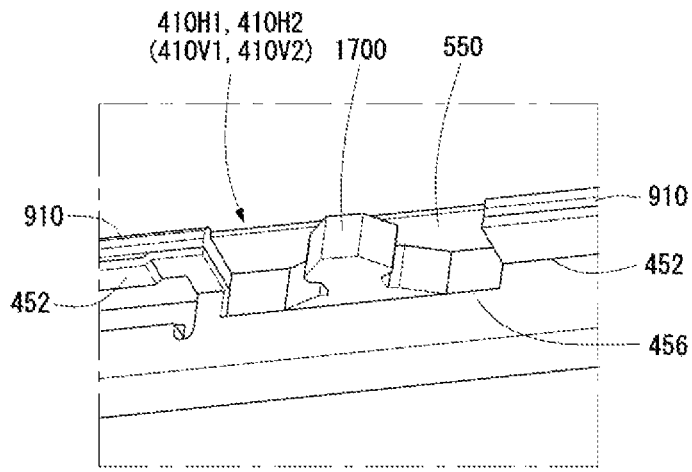

As shown in FIG. 54, in a state where the top case 410H1, 410H2, 410V1, 410V2 and the back cover 450 are installed, the protruding part 1700 can pass through the opening 456 of the back cover 450.

In the descriptions above, it is assumed that the protruding part 1700 passes through the opening 456 of the back cover 450, but the present invention is not limited to the assumption. For example, the grove 1800 can pass through the opening 456, or both of the groove 1800 and the protruding part 1700 can pass through the opening 456.

Figure 55:
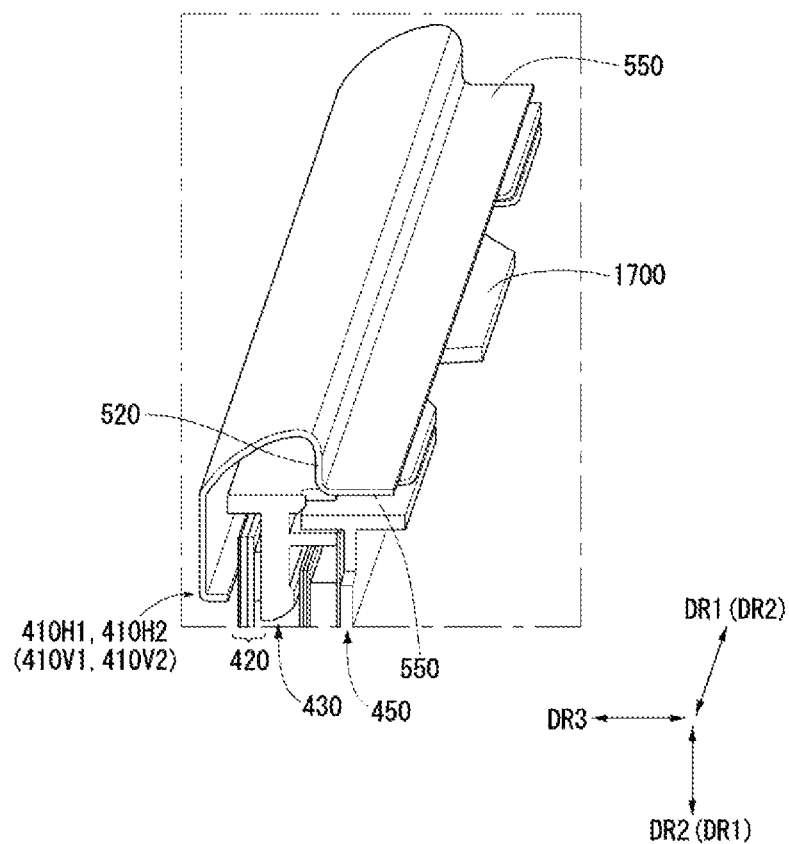

With reference to FIG. 55, while the top case 410H1, 410H2, 410V1, 410V2 and the back cover 450 are installed, the protruding part 1700 can include part stretching out further than the sixth part 550 of the top case 410H1, 410H2, 410V1, 410V2. In this case, the protruding part 1700 and the groove 1800 can be coupled together in a more effective manner.

Figure 56:
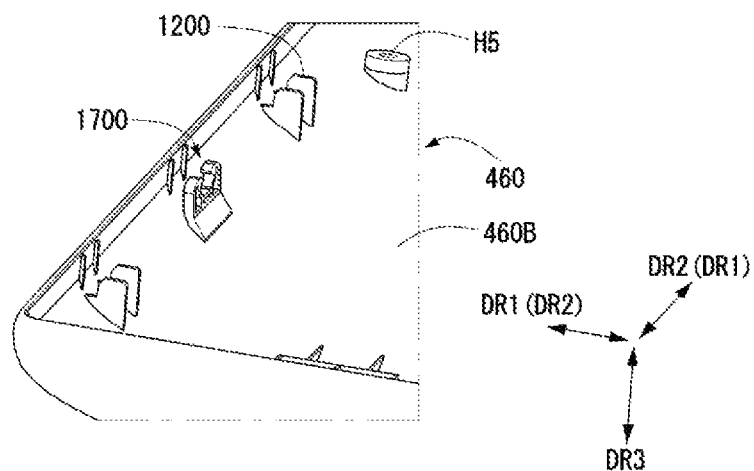

With reference to FIG. 56, in the boundary of the back cabinet 460, a plurality of protruding parts 1200 can be disposed, and at least one groove can be disposed between the protruding parts 1200 of the rear cabinet 460.

Figure 57:
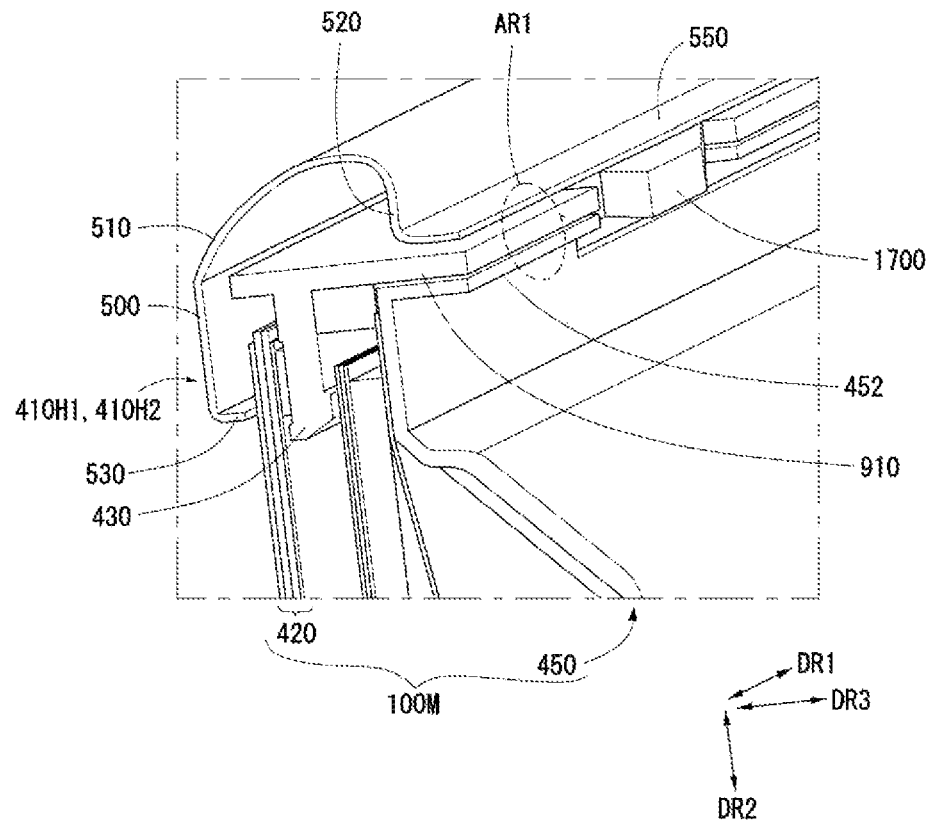

With reference to FIG. 57, a display device according to the present invention can include a part in which a sixth part 550 of the top case 410H1, 410H2, 410V1, 410V2, side wall 910 of the guide panel 430, and up part 452 of the back cover 450 are disposed closely to each other.

Figure 58:
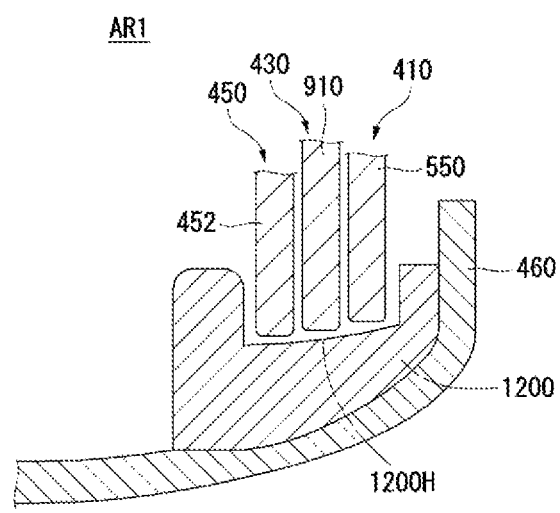

Also, as shown in FIG. 58, the sixth part 550, side wall 910, and the end part of the up part 452 can be inserted into the groove 1200H formed in the protruding part 1200 formed in the rear cabinet 460. In this case, structural stability of the display device can be improved.

Figure 59:
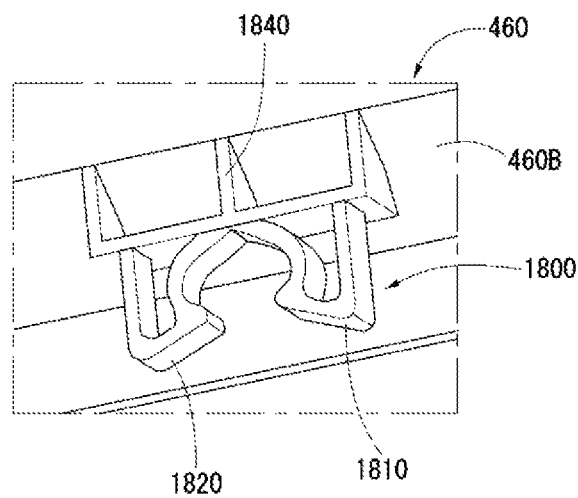

The shape of the groove 1800 can be modified in various ways. For example, as shown in FIG. 59, the groove 1800 can include a supporting part 1840 formed in the body 460B of the rear cabinet 460, and the first latch 1810 and the second latch 1820 can be formed in the supporting part 1840.

FIGS. 60 to 77 illustrate a display module and a display device according to the present invention.

Figure 60:
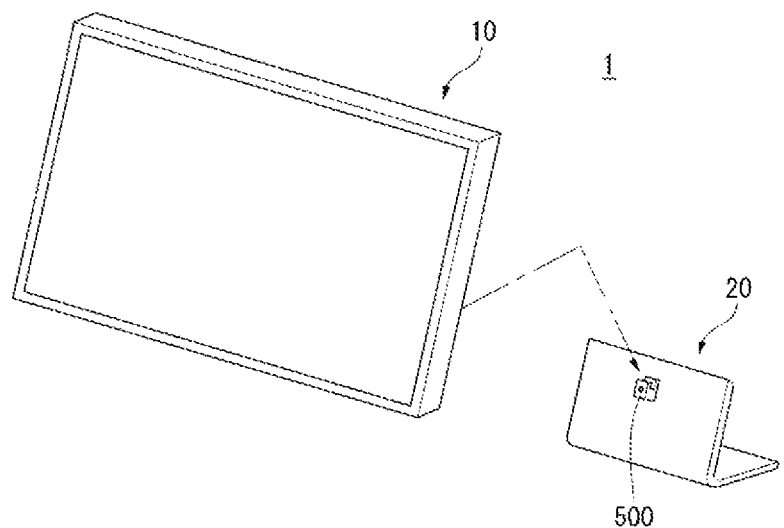
FIGS. 60 to 77 illustrate a display module and a display device according to the present invention.

With reference to FIG. 60, a display device 1 according to the present invention can include a display module 10 including a display panel and a base supporter 20 supporting the display module 10.

Though not shown in the figure, the base supporter 20 can include a base part 500 being inserted into the display module 10 and supporting the display module 10.

At this time, it is assumed that the base part 500 is installed in the base supporter 20, but the present invention is not limited to the assumption. For example, the base part 500 can also be installed at a predetermined wall.

Figure 61:
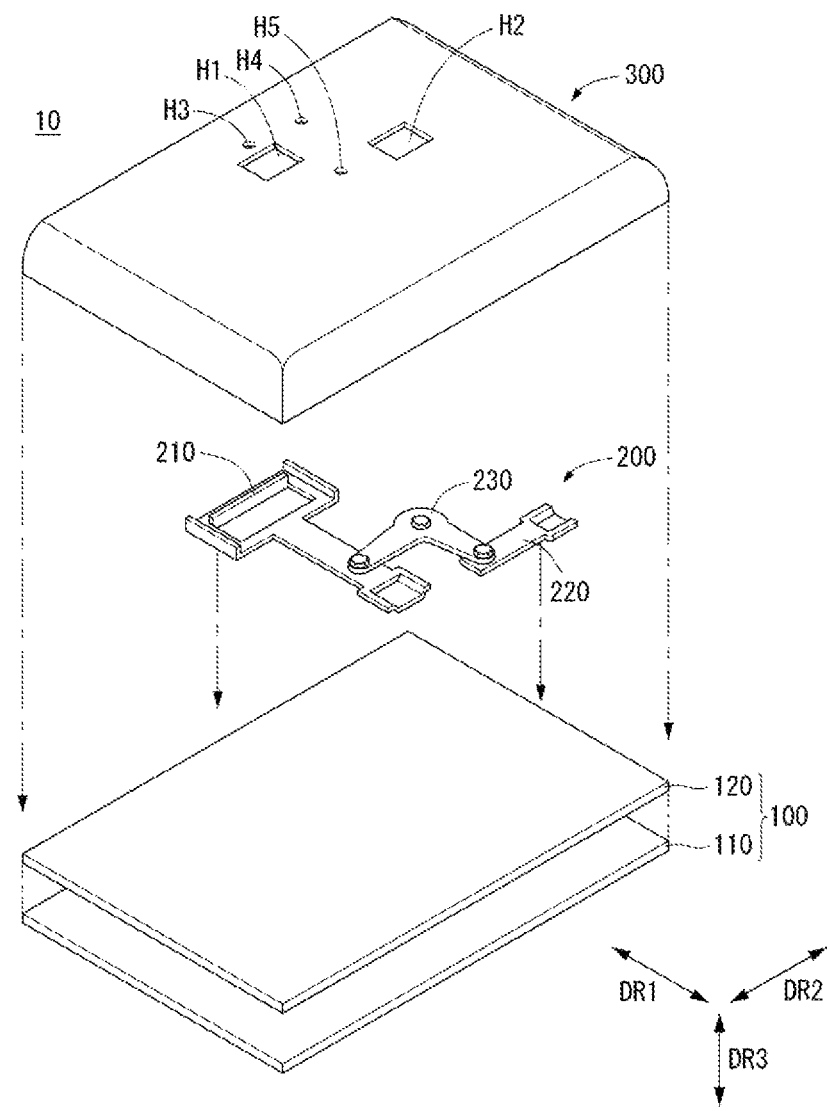

With reference to FIG. 61, the display module 20 can include a display panel 110, display part 100 including a frame 120 disposed in the back of the display panel 110, and supporting part 200 disposed in the back of the display part 100.

The display module 20 can include a back cover 300 disposed in the back of the supporting part 200. The back cover 300 can include a plurality of holes H1, H2, H3, H4, H5.

The supporting part 200 can support so that the display module 10 can be supported by the base part 500 of the base supporter 20.

Figure 62:
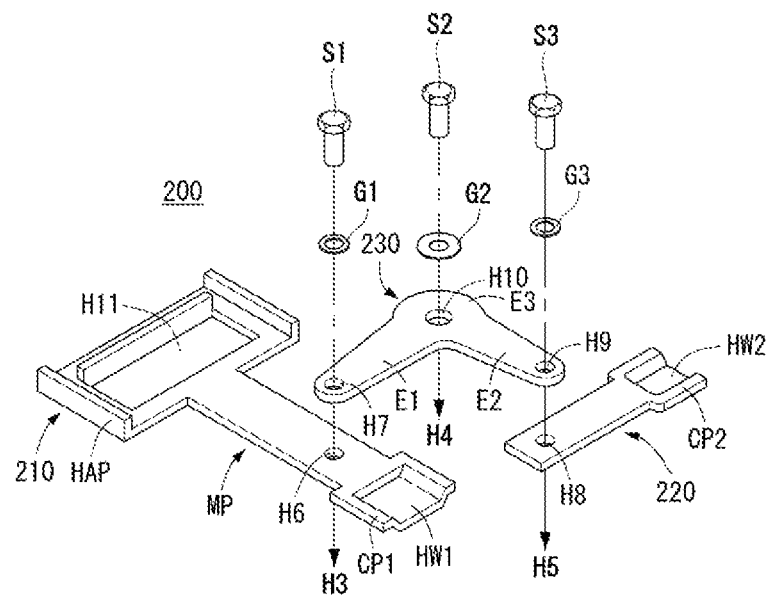

With reference to FIG. 62, the supporting part 200 can include a first part 210, second part 220, and third part 230 connecting the first part 210 and the second part 220.

The first part 210 can generate a motion in a first direction (DR1) parallel to the short side of the display part 100.

The second part 220 can generate a motion in a second direction (DR2) parallel to the long side of the display part 100.

The third part 230 can connect the first part 210 and the second part 220 so that the second part 220 can move in conjunction with the motion of the first part 210.

The first part 210 can include a handle part (HAP), first connecting part (CP1), and middle part (MP) disposed between the handle part (HAP) and the first connecting part (CP1).

The handle part (HAP) can include an eleventh hole (H11) so that the user can hold on to the handle part (HAP). In other words, the handle part (HAP) can be disposed in the end part of one side of the first part 210.

The middle part (MP) can include a sixth hole H6 for connecting to the third part 230.

The first connecting part CP1 can be supported by the base part 500. To this end, the first connecting part CP1 can include a first depression part HW1 depressed by a predetermined depth.

The second part 220 can include a body part (BP) and a second connecting part (CP2) disposed at the end part of one side of the body part (BP).

The body part (BP) can include an eighth hole H8 for connecting to a third part 230.

The second connecting part (CP2) can be supported by the base part 500. To this end, the second connecting part (CP2) can include a second depression part (HW2) depressed by a predetermined depth.

The third part 230 can include a first end part (E1), a second end part (E2) corresponding to the first end part (E1), and a middle part (E3) being disposed between the first end part (E1) and the second end part (E2) and connecting to the first end part (E1) and the second end part (E2).

A seventh hole (H7) corresponding to the sixth hole (H6) can be formed in the first end part (E1). Also, the seventh hole (H7) and the sixth hole (H6) can correspond to the third hole (H3) formed in the back cover 300.

A ninth hole (H9) corresponding to the eighth hole (H8) can be formed in the second end part E2. Also, the ninth hole (H9) and the eighth hole (H8) can correspond to the fifth hole (H5) formed in the back cover 300.

A tenth hole (H10) can be formed in the middle part (E3). The tenth hole (H10) can correspond to the fourth hole (H4) formed in the back cover 300.

The first end part (E1) of the third part 230 can be connected so that it can move in conjunction with the first part 210. To this end, a first connecting member (S1) such as a rivet can be coupled to the third hold (H3) by penetrating through the seventh hole (H7) and the sixth hole (H6). Also, to implement a more smooth motion for the first part 210 and the third part 230, a first damping part (G1) can be disposed between the first connecting member (S1) and the third part 230.

The second end part (E2) of the third part 230 can be connected so that it can move in conjunction with the second part 220. To this end, a third connecting member (S3) such as a rivet can be coupled to the fifth hole (H5) by penetrating through the ninth hole (H9) and the eighth hole (H8). Also, to implement a more smooth motion for the second part 220 and the third part 230, a third damping part (G3) can be disposed between the third connecting member (S3) and the third part 230.

The middle part (E3) can be connected so that it can be connected to at least one of the frame 120 and the back cover 300 to generate a rotational motion. To this end, a second connecting member (S2) such as a rivet can be couple to the fourth hole (H4) formed in the back cover 300 by penetrating through the tenth hole (H10). Also, to implement a more smooth rotation, a second damping part (G2) can be disposed between the second connecting part (S2) and the third part 230.

At this time, it is assumed that the supporting part 200 is connected to the back cover 300, but the present invention is not limited to the assumption. For example, the supporting part 200 can be connected to the frame 120. In this case, at least one of the third hole (H3), fourth hole (H4), and fifth hole (H5) can be formed in the frame 120 rather than the back cover 300.

Figure 63:
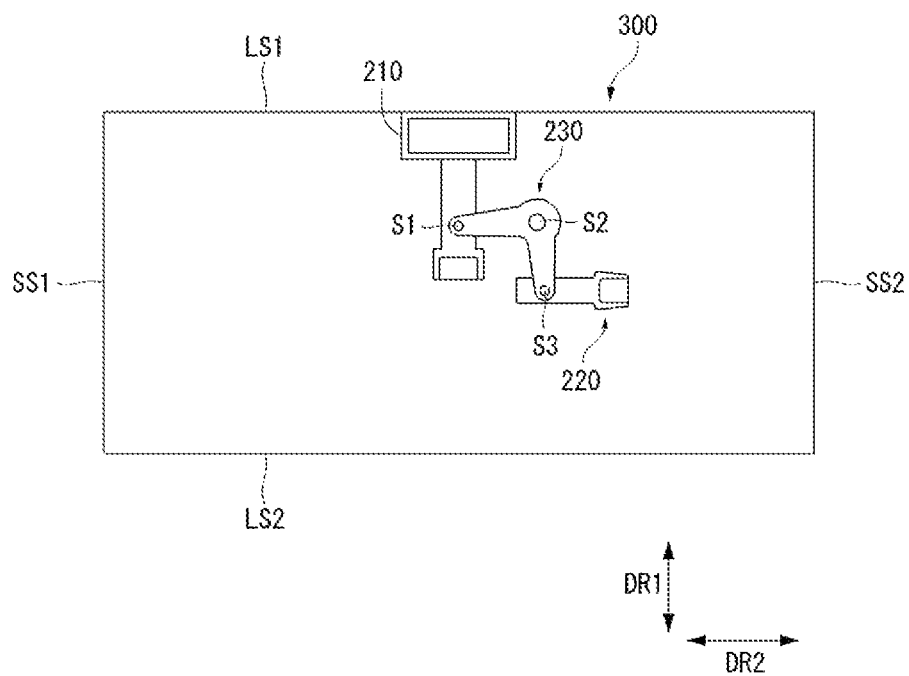
Figure 64:
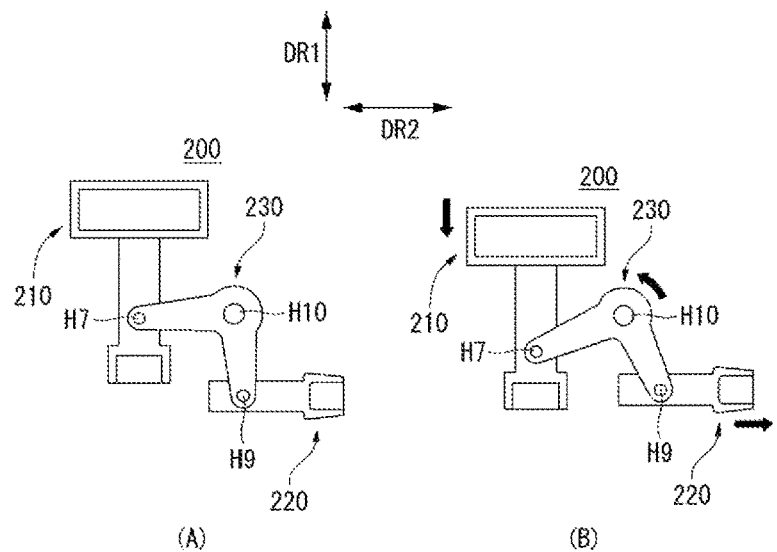

In case the supporting part 200 is connected to the back cover 300, as shown in FIG. 63, the first part 210 of the supporting part 200 can be disposed to be parallel to the first short side (SS1) and the second short side (SS2) of the back cover 300, and the second part 220 of the supporting part 200 can be disposed to be parallel to the long side (LS1) and the second long side (LS2) of the back cover 300.

To put differently, the first part 210 of the supporting part 200 can be disposed to be parallel to the first direction (DR1), and the second part 220 of the supporting part 200 can be disposed to be parallel to the second direction (DR2).

In case the first part 210 of the supporting part 200 moves in the first direction (DR1) while being in a state shown in FIG. 64(A), the third part 230 can rotate around the middle part (E3) as shown in FIG. 64(B). More specifically, the third part 230 can rotate around the tenth hole (H10) of the middle part (E3) in accordance with the movement of the first part 210 in the first direction (DR1).

Also, the second part 220 can move in the second direction (DR2) in accordance with the rotation of the middle part (E3).

In other words, the third part 230 can rotate in accordance with the movement of the first part 210 of the supporting part 200 in the first direction (DR1), and the second part 220 can move in the second direction (DR2) in accordance with the rotation of the third part 230.

Figure 65:
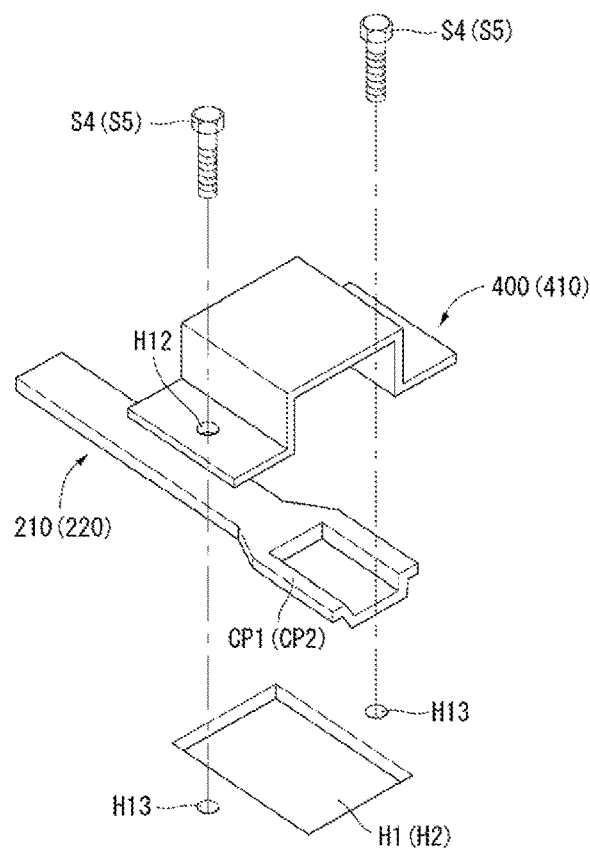
Figure 67:
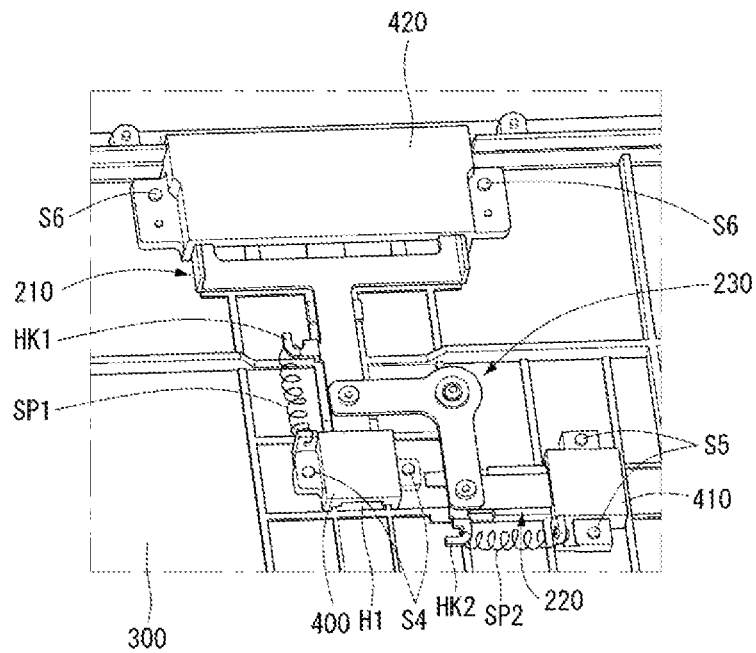

With reference to FIGS. 65 and 67, the display module 10 according to the present invention can further include a cover 400 (410).

The first cover 400 can cover the end part of the first part 210, namely the first connecting part (CP1). The first cover 400 can cover at least part of the first part 210 so that the first part 210 can move in the first direction (DR1).

The first cover 400 can cover at least part of the first hold (H1) formed in the back cover 300.

Also, the second cover 410 can cover the end part of the second part 220, namely the second connecting part (CP2). The second cover 410 can cover at least part of the second part 220 so that the second part 220 can move in the second direction (DR2).

The second cover 410 can cover at least part of the second hole (H2) formed in the back cover 300.

To this end, a twelfth hole (H12) is formed in the first cover 400, and a thirteenth hole (H13) corresponding to the twelfth hole (H12) can be formed in the back cover 300.

A first coupling member (S4, S5) such as a screw can connect the first cover 400 to the back cover 300 by penetrating through the twelfth hole (H12) and the thirteenth hole (H13).

The end part of the first part 210, namely at least part of the first connecting part (CP1) can be exposed through the first hole (H1) formed in the back cover 300.

Also, the end part of the second part 220, namely at least part of the second connecting part (CP2) can be exposed through the second hole (H2) formed in the back cover 300.

Figure 66:
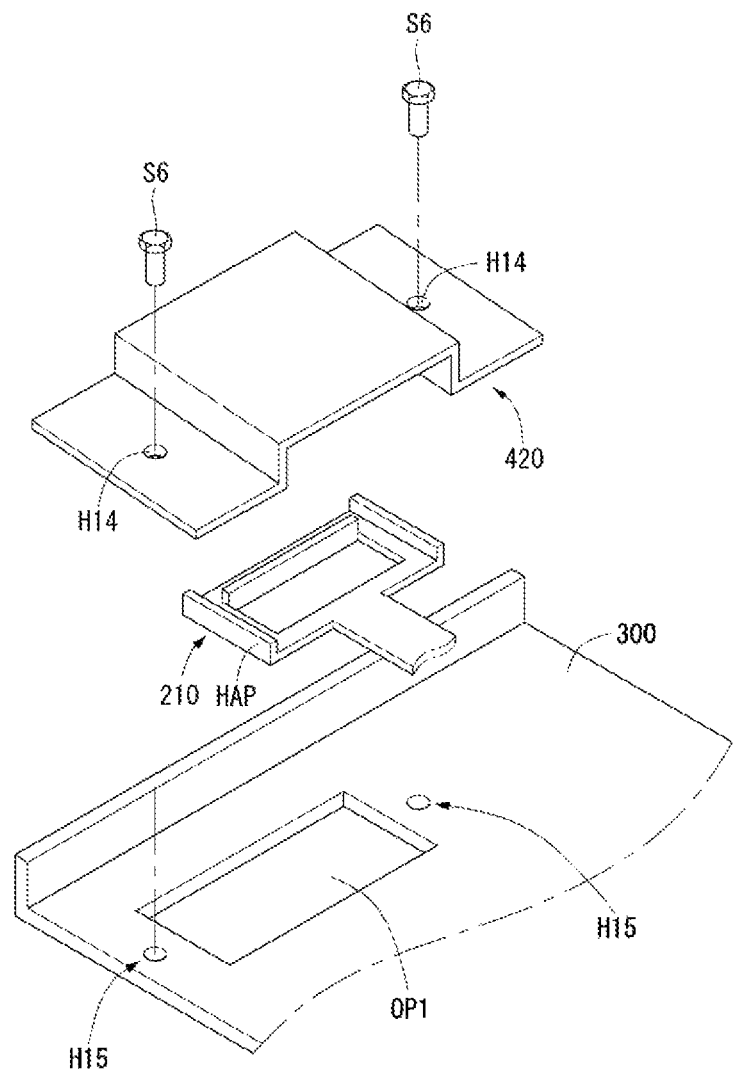

With reference to FIG. 66, a display module 10 according to the present invention can further include a handle cover 420 which covers at least part of the handle part (HAP) of the first part 210.

The handle cover 420 can be connected to the back cover 300. To this end, a fourteenth hole (H14) can be formed in the handle cover 420, and a fifteenth hole (H15) corresponding to the fourteenth hole (H14) can be formed in the back cover 300.

A second coupling member (S6) such as a screw can connect the handle cover 420 to the back cover 300 by penetrating through the fourteenth hole (H14) and the fifteenth hole (H15).

An opening (OP1) can be formed in the back cover 300 to correspond to the handle part (HAP) of the first part 210. At least part of the handle part (HAP) can be exposed through the opening (OP1).

With reference to FIG. 67, a display module 10 according to the present invention can further include a first spring part (SP1) and a second spring part (SP2).

The end part of one side of the first spring part (SP1) can be connected to the first part 210, and the other end of the first spring part (SP1) can be connected to the first cover 400. The first part 210 can include a first hook (HK1) to be hanged on the first spring part (SP1). In the present invention, the first hook (HK1) can be connected to various parts of the first spring part (SP1). For example, the other end of the first spring part (SP1) can be connected to at least one of the frame 120, back cover 300, and first cover 400.

The end part of one side of the second spring part (SP2) can be connected to the second part 220, and the other end of the second spring part (SP2) can be connected to the second cover 410. The second part 220 can include a second hook (HK2) to be hanged on the second spring part (SP2). In the present invention, the second hook (HK2) can be connected to various parts of the second spring part (SP2). For example, the other end of the second spring part (SP2) can be connected to at least one of the frame 120, back cover 300, and second cover 410.

Figure 68:
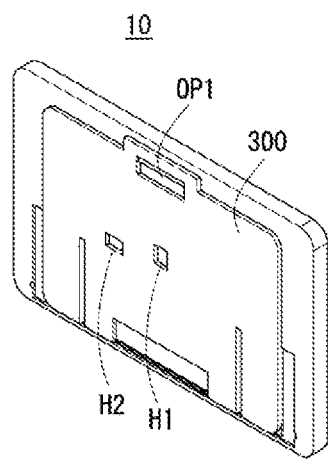

FIG. 68 illustrates the rear surface of the display module 10 according to the present invention.

Figure 69:
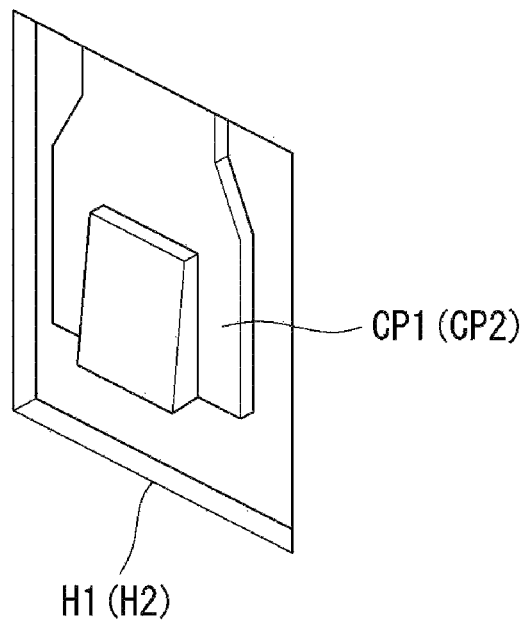

With reference to FIGS. 68 and 69, at least part of the first connecting part (CP1) of the first part 210 of the supporting part 200 can be exposed through the first hole (H1), and at least part of the second connecting part (CP2) of the second part 220 of the supporting part 200 can be exposed through the second hole (H2).

Figure 70:
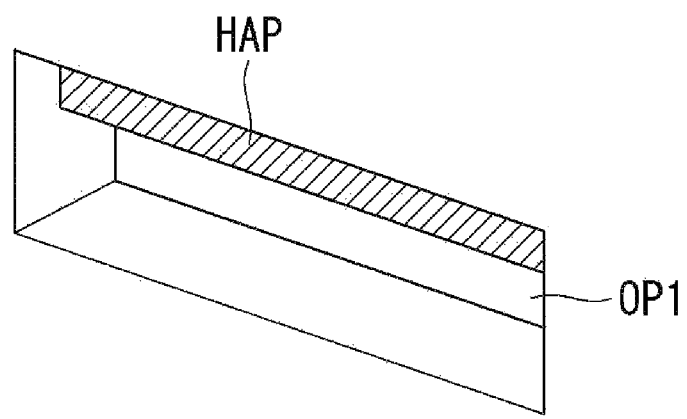

Also, with reference to FIGS. 68 and 70, at least part of the handle part (HAP) of the first part 210 of the supporting part 200 can be exposed through the opening (OP1).

In what follows, descried will be a method for supporting a display module 10 according to the present invention by using a base supporter 20.

Figure 71:
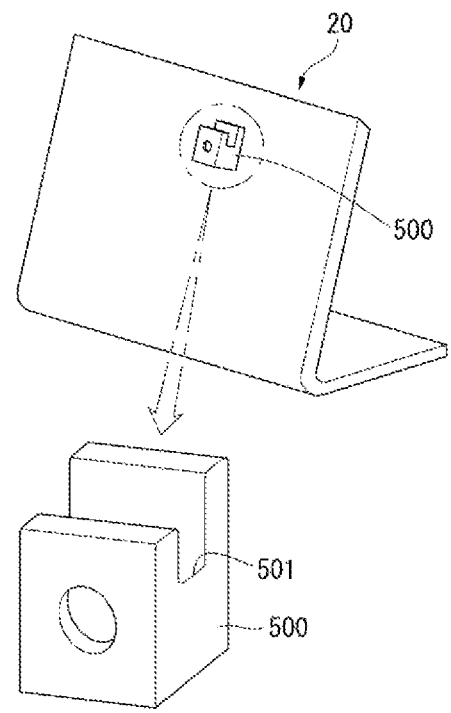

With reference to FIG. 71, the base supporter 20 can include a base part 500.

The base part 500 can include an insertion groove 501 into which the first connecting part (CP1) or the second connecting part (CP2) is inserted.

As shown in FIG. 71(A), the base part 500, being inserted into the first hole (H1) of the display module 10, can support the display module 10, or as shown in FIG. 72(B), the base part 500, being inserted into the second hole (H2), can support the display module 10.

When in an orientation as shown in FIG. 72(A), the display module 10 can display an image or a photo in a horizontal direction as shown in FIG. 77(A).

On the other hand, when in an orientation as shown in FIG. 72(B), the display module 10 can display an image or a photo in a vertical direction as shown in FIG. 77(B).

As described above, the display device 1 according to the present invention is equipped with a pivot function.

To put differently, as shown in FIG. 72(A), when the base part 500 is inserted into the first hole (H1) and is connected to the first connecting part (CP1), a first image is displayed on the screen of the display module 10; as shown in FIG. 72(B), when the base part 500 is inserted into the second hole (H2) and is connected to the second connecting part (CP2), a second image a pivoted image from the first image can be displayed on the screen of the display module 10.

In what follows, a method for the base supporter 20 to support the display module 10 will be described below.

Figure 72:
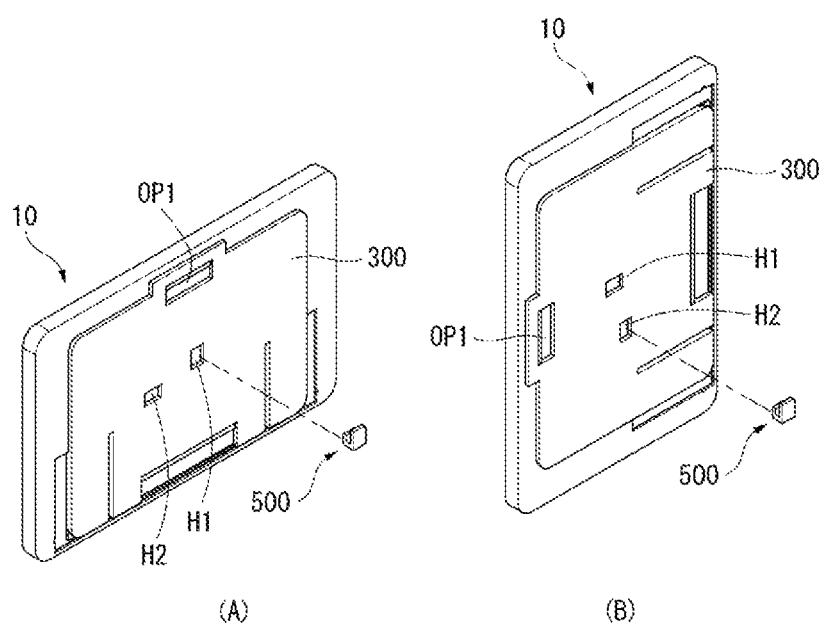

First, as shown in FIG. 72, the user can grab the handle (HAP) exposed through the opening (OP1) formed in the back cover 300 by the hand 600.

Figure 74:
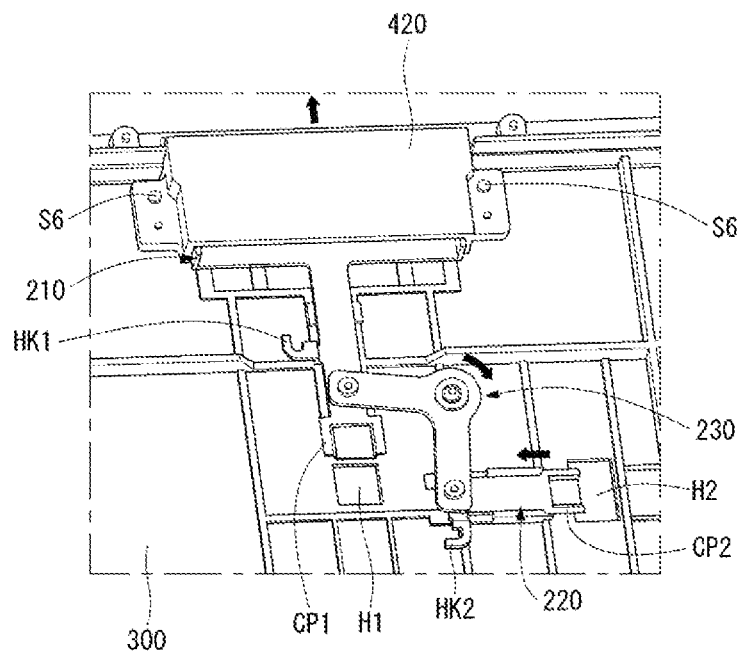

While grabbing the handle (HAP), if the user exerts a force to the handle (HAP), as shown in FIG. 74, the first part 210 of the supporting part 200 can move in a direction indicated by the arrow (which is the direction that the user applies a force).

Also, in accordance with the movement of the first part 210, the third part 230 can rotate, and the second part 220 can move in a direction indicated by the arrow in accordance with the rotation of the third part 230.

Then according to the movement of the first part 210, most of the first hole (H1) can be exposed. Also, according to the movement of the second part 220, most of the second hole (H2) can be exposed.

In this case, though not shown in the figure, the first spring part (SP1) and the second spring part (SP2) can be stretched out respectively.

Figure 75:
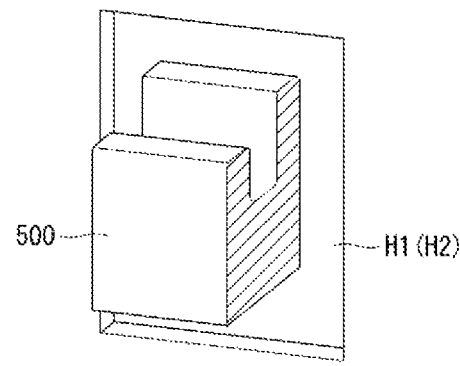

Afterwards, as shown in FIG. 75, the base part 500 of the base supporter 20 can be inserted into the first hole (H1) or the second hole (H2).

Figure 76:
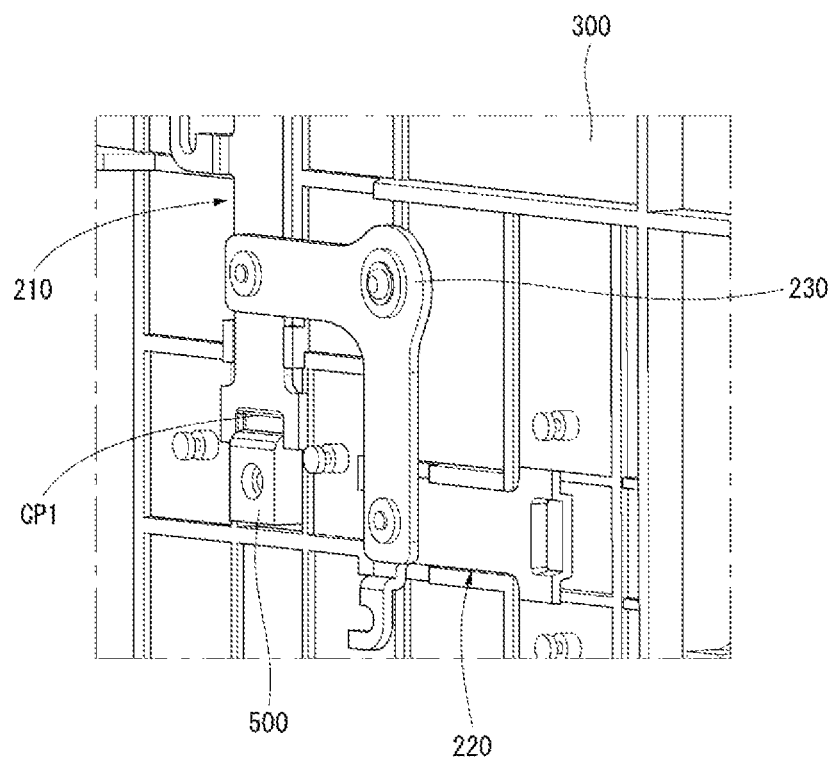
Figure 77:
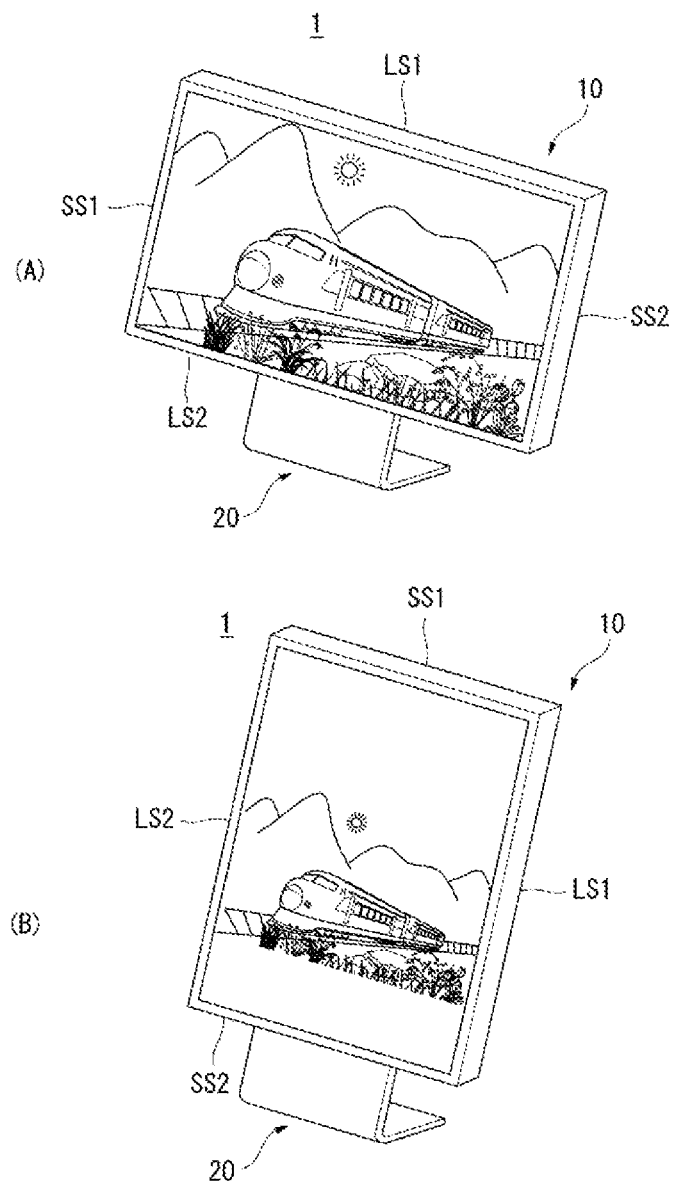

Afterwards, if the user lets go of the handle (HAP) or releases the force, due to the contraction force of the first spring part (SP1) or the second spring part (SP2), as shown in FIG. 76, the first connecting part (CP1) (or the second connecting part (CP2)) of the first part 210 (or the second part 220) can be inserted and connected to the insertion groove 501 of the base part 500 inserted into the first hole (H1) (or the second hole (H2)).

Figure 73:
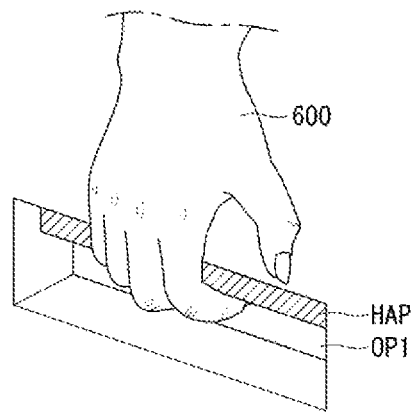

As described above, while the display module 10 is supported by the base supporter 20, as shown in FIG. 73, if the user grabs the handle part (HAP), connection between the display module 10 and the supporting part 20 can be released.

Since release of connection between the display module 10 and the base supporter 20 can be sufficiently inferred from the descriptions of FIGS. 73 and 74, further descriptions thereof will be omitted.

As described in detail above, by using one handle (HAP), the user can place the display module 10 at the base supporter 20 in a horizontal direction as shown in FIG. 72(A), or the user can place the display module 10 at the base supporter 20 in a vertical direction as shown in FIG. 72(B).

Therefore, it is possible to place the display module 10 at the base supporter 20 with an arbitrary orientation more easily.

Figure 78:
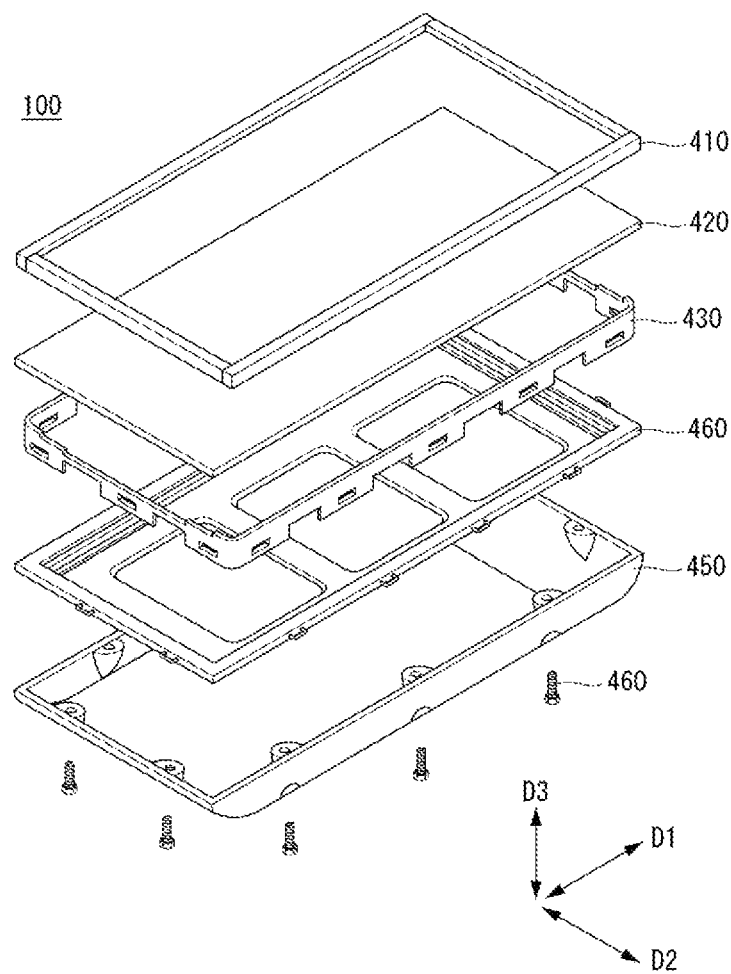
FIGS. 78 to 79 illustrate the structure of a display device related to the present invention.
Figure 79:
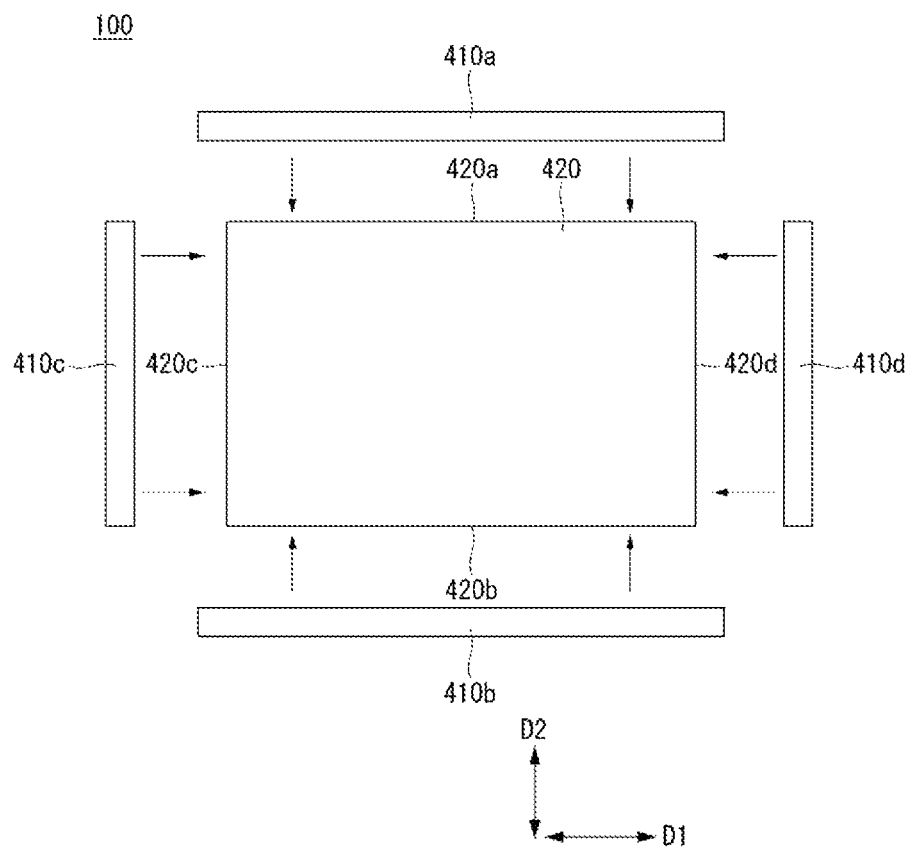

FIGS. 78 to 79 illustrate the structure of a display device related to the present invention.

With reference to FIG. 78, a display device according to the present invention can comprise a display panel 420, top case 410, guide panel 430, module cover 440, and back cover 450.

The display panel 420, being installed on the front surface of the display device 100, can display an image. The display panel 420 can display an image by dividing an image into a plurality of pixels and controlling each pixel to emit light according to a proper color, brightness, and saturation level of the pixel. The display panel 110 can be divided into an active area in which an image is displayed and an inactive area in which an image is not displayed. The display panel 420 can include a front substrate and a rear substrate facing each other having a liquid crystal layer between them.

The front substrate can include a plurality of pixels comprising red (R), green (G), and blue (B) subpixels. In case light is incident on the front substrate, an image corresponding to the red, green, or blue color can be generated.

The rear substrate can include switching components. The rear substrate can switch between pixel electrodes. For example, a pixel electrode can change molecular arrangement of the liquid crystal layer according to an external voltage applied thereto.

The top case 410 can cover the inactive area of the display panel 420. In other words, the top case 410 can cover the front surface's boundary and the side surface of the display panel 420. The top case 410 can be of a rectangular frame shape with an empty central part. Since the central part of the top case 410 is empty, an image of the display panel 420 can be displayed to the outside.

The top case 410 can be divided into a plurality of parts. A detailed structure of the top case 410 will be described later.

In the back of the display panel 420, the guide panel 430 can be disposed. The guide panel 430 can be disposed between the module cover 440 and the top case 410.

The guide panel 430 can guide the display panel 420, light guide panel (not shown) and/or optical sheet to the positions at which they can be settled. A detailed structure of the guide panel will be described later.

The module cover 440 can be disposed in the rear surface of the display panel 420 and the guide panel 430. Though not shown in the figure, various components such as PCS and light source can be disposed in the module cover 440. The PCB can supply a driving voltage and signal to the light source by converting power supplied from the outside. The module cover 440 can be combined with the display panel 420 having the guide panel 430 being positioned between them.

Though not shown, the guide panel 430 and the module cover 440 can include an optical sheet, light guide panel, diffusion panel, reflection sheet, and at least one light emitting diode.

A back cover 450 can be disposed in the rear surface of the module cover 440. The back cover 450, being disposed in the rear surface of the display panel 420, can protect various components between the display panel 420 and the back cover 450.

The coupling member 460 can couple the module cover 440 and the back cover 45 together.

With reference to FIG. 79, the top case 410 can include a horizontal top case 410a, 410b and a vertical top case 410c, 410d. The horizontal top case 410a, 410b can cover the front surface's boundary and side surface of the display panel 420 in the long side 420a, 420b area of the display panel 420. The vertical top case 410c, 410d can cover the front surface's boundary and side surface of the display panel 420 in the short side 420c, 420d area of the display panel 420.

The horizontal top case 410a, 410b can include a first horizontal top case 410a corresponding to a first long side 420a of the display panel 420 and a second horizontal top case 410b corresponding to a second long side 420b of the display panel 420.

The vertical top case 410c, 410d can include a first vertical top case 410c corresponding to a first short side 420c of the display panel 420 and a second vertical top case 410d corresponding to a second short side 420d of the display panel 420.

The horizontal top case 410a, 410b and the vertical top case 410c, 410d can come into contact with each other at the corner of the display panel 420. The first horizontal top case 410a and the first vertical top case 410c can be connected to each other at the corner formed by the first long side 420a and the first short side 420c of the display panel 420. The first horizontal top case 410a and the second vertical top case 410d can be connected to each other at the corner formed by the first long side 410a and the second short side 420d. The second horizontal top case 410b and the first vertical top case 410c can be connected to each other at the corner formed by the second long side 420b and the first short side 420c of the display panel 420. The second horizontal top case 410b and the second vertical top case 410d can be connected to each other at the corner formed by the second long side 420b and the second short side 420d of the display panel 420.

The first and the second horizontal top case 410a, 410b can be longer than the first and the second long side 420a, 420b. Accordingly, both ends of the first and the second horizontal top case 410a, 410b can be stretched out in a direction along the long side.

The first and the second vertical top case 410c, 410d can be shorter than the first and the second short side 420c, 420d. Accordingly, both ends of the first and the second vertical top case 410c, 410d can be combined easily with the first and the second horizontal top case 410c, 410d.

The first and the second horizontal top case 410a, 410b can be made of a metallic material. Accordingly, the first and the second horizontal top case 410a, 410b can be manufactured by using a press forming method. On the other hand, the first and the second vertical top case 410c, 410d can be made of a resin material. Accordingly, the first and the second vertical top case 410c, 410d can be manufactured by employing a molding process. Accordingly, thickness of the first and the second vertical top case 410c, 410d can be thicker than that of the first and the second horizontal top case 410a, 410b.

FIGS. 80 to 91 illustrate a display device according to the present invention in detail.

Figure 80:
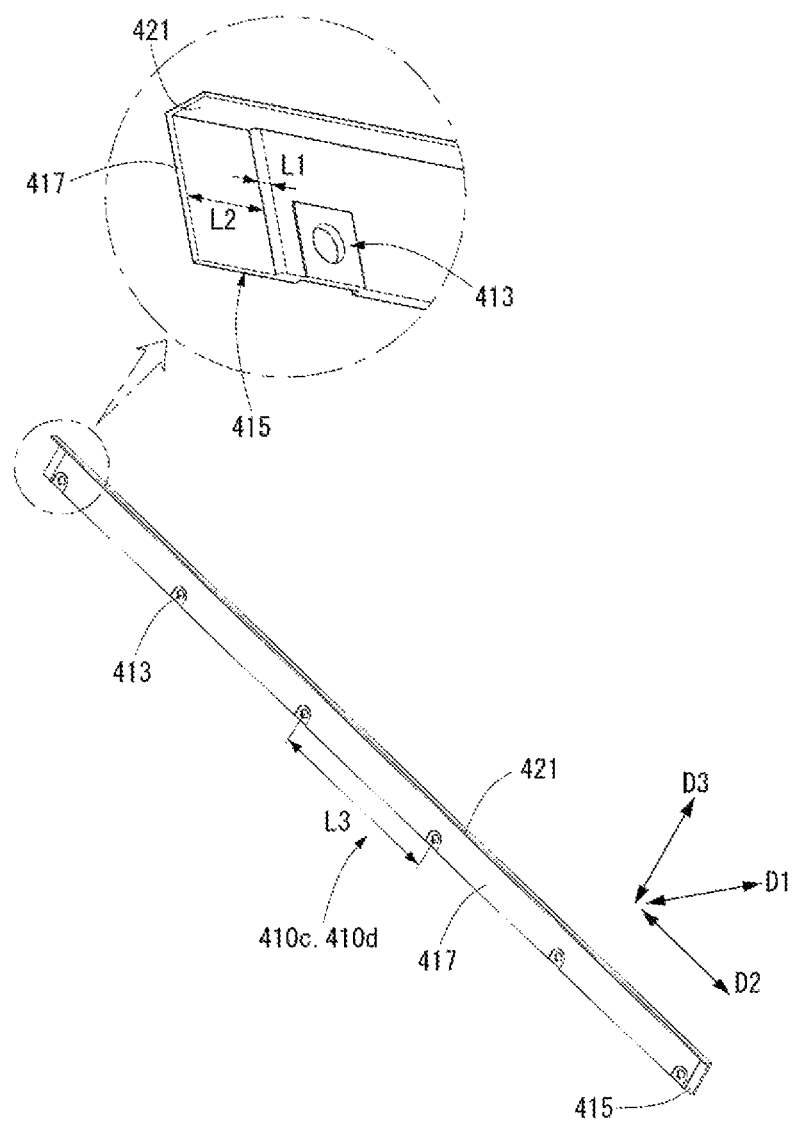
FIGS. 80 to 91 illustrate a display device according to the present invention in detail.

With reference to FIG. 80, the first and the second vertical top case 410c, 410d can include a first part 417 and a second part 421.

The first part 417 can be extended in the third direction D3. The first part 417 can cover the side surface of the display panel.

The first part 417 can include a depression part 415 being depressed in the first direction (D1) by a first length (L1). The depression part 415 can be formed at both ends of the first part 417 in the second direction (D2) with a second length (L2). In the area in which the depression part 415 is disposed, thickness of the first part 417 can be thin.

The first part 417 can include a plurality of first holes 413. A plurality of first holes 413 can be arranges in a circular shape. A plurality of first holes 413 can be separated from each other by a third length (L3). A plurality of first holes 413 can be used to couple the first and the second vertical top case 410c, 410d, guide panel 430, and module cover 440. However, the present invention is not limited to the arrangement described above, and the first and the second vertical top case 410c, 410d, guide panel 430, and module cover 440 may be coupled together by using a latch.

The second part 421 can be extended from one end of the first part 417 in the first direction (D1). The second part 421 can cover the boundary of the front surface of the display panel. The thickness of the second part 421 can differ from that of the first part 417. For example, the thickness of the second part 421 can be smaller than that of the first part 417.

Figure 81:
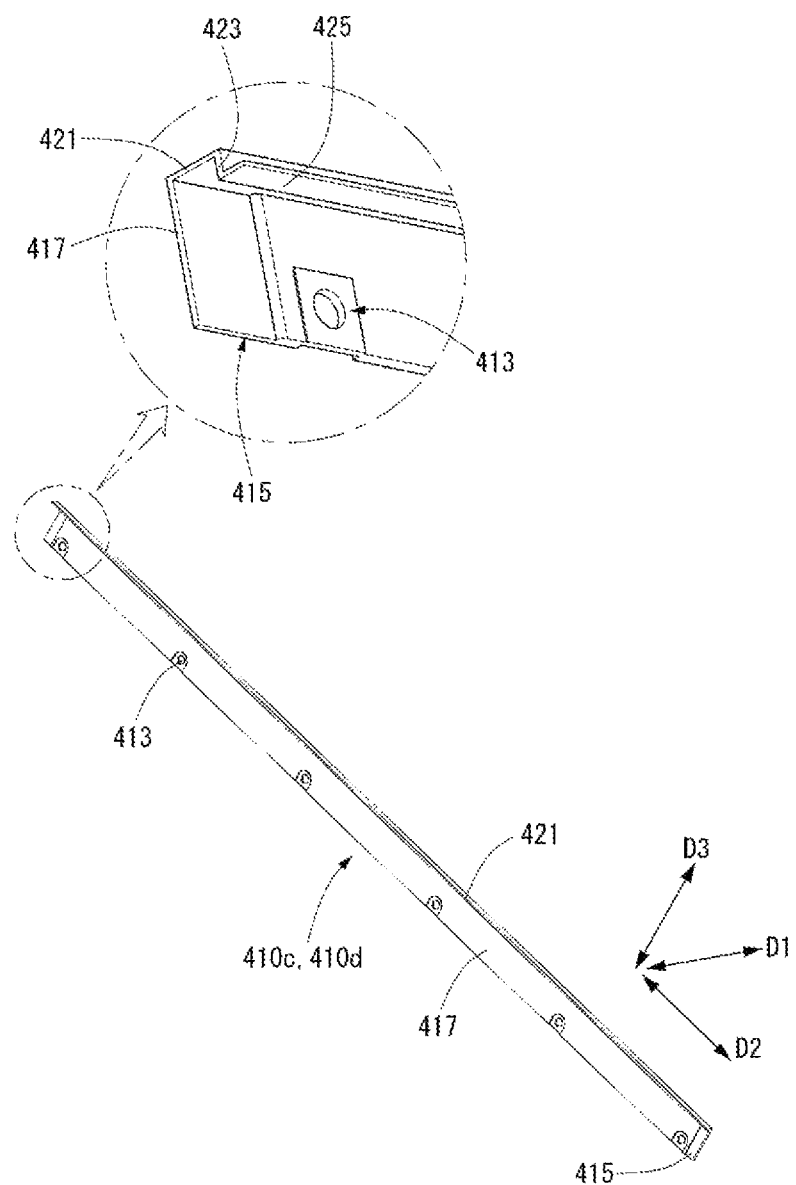

With reference to FIG. 81, the first and the second vertical top case 410c, 410d can further include a third part 423 being extended in the third direction (D3) from one end of the second part 421 and the fourth part 425 being extended in the first direction (D1) from one end of the third part 423.

The third part 423 and the fourth part 425 can shield the boundary of the upper surface of the display panel more effectively. Also, the third part 423 and the fourth part 425 can be made to couple the first and the second vertical top case 410c, 410d and the display panel more firmly. Also, the third part 423 and the fourth part 425 can additionally protect the boundary of the front surface of the display panel from an external impact.

Figure 82:
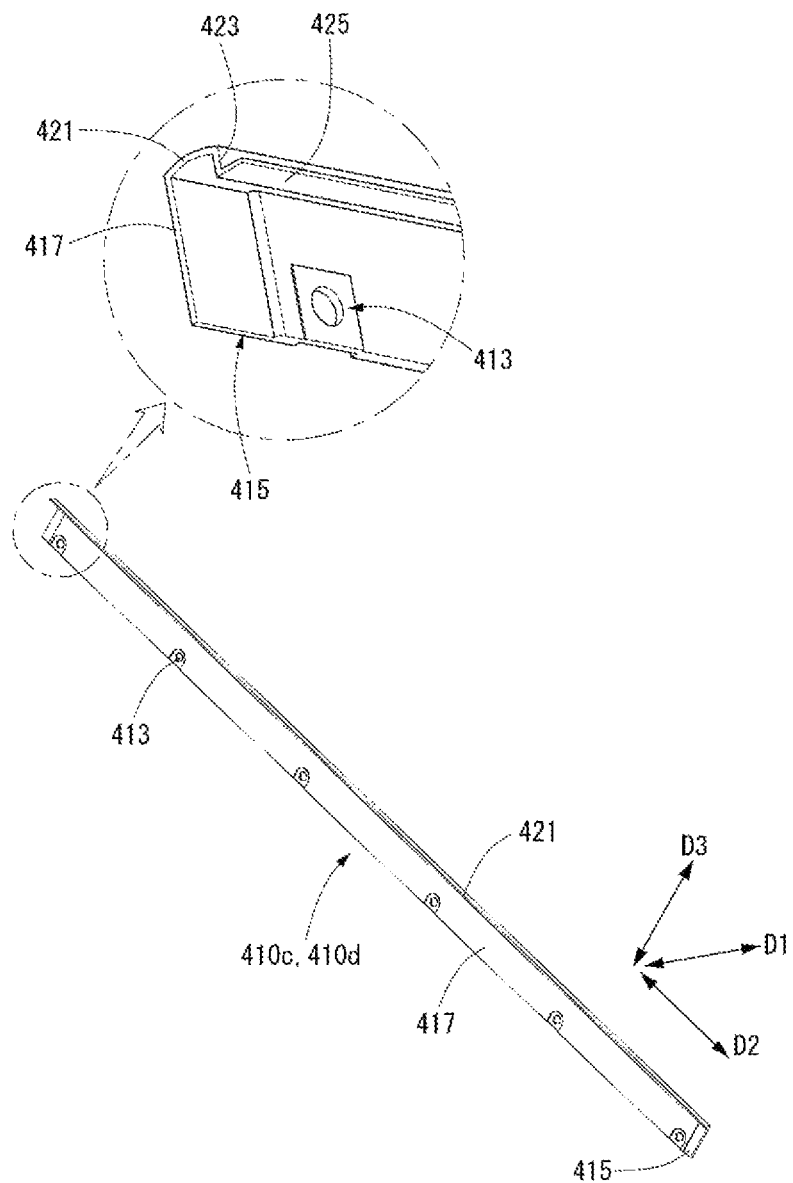

With reference to FIG. 82, the second part 421 of the first and the second vertical top case 410c, 410d can be curved in the third direction (D3).

If the second part 421 is curved, users may feel that the boundary of the front surface of the display device is three-dimensional. Accordingly, the user can feel that the external appearance of the display device has been more improved.

Also, the curved part of the second part 421 can be separated from the display panel. Accordingly, the second part 421 can mitigate an external impact delivered to the display panel.

Figure 83:
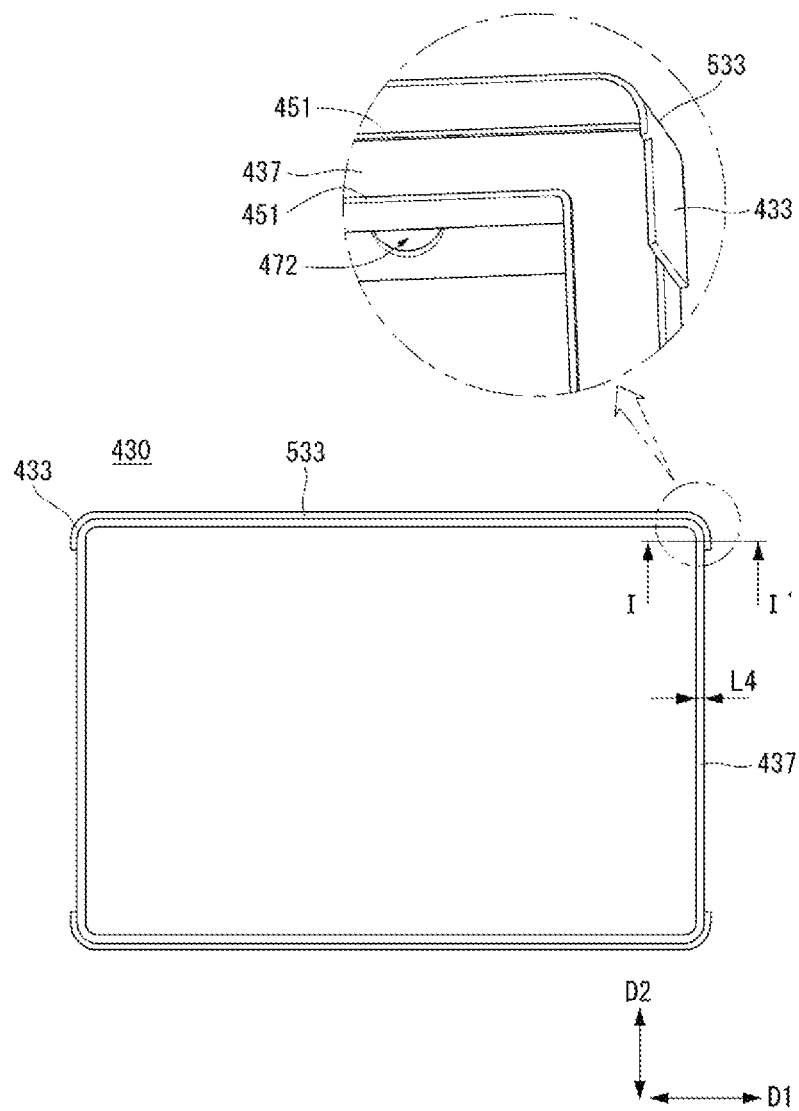

With reference to FIG. 83, the guide panel 430 can include an installation part 437, first rib 533, and second rib 433.

The installation part 437 can be of a rectangular frame shape with an empty central part. The installation part 437 can be a part into which the display panel is secured. Though not shown, an adhesive layer can be disposed in the upper part of the installation part 437 to fix the display panel.

Both ends of the installation part 437 can include at least one first protruding part 451 being extended in the thickness direction of the guide panel 430. The first protruding part 451 can perform the function of guiding the adhesive layer so that it can be disposed on the installation part 437.

In case the length of the installation part 437 is too short, the display panel can be damaged or break away from the guide panel even if a slight external force is applied to the central part of the installation part 437. Therefore, the installation part 437 can be longer than a fourth length (L4).

The first rib 533 can support so that the display panel may not break away from the guide panel 430. The first rib 533 can support so that the long side of the display panel does not break away from the guide panel 430.

The first rib 533 can extend in a thickness direction of the guide panel 430. The first rib 533 can come into contact with the horizontal top case. The first rib 533 can be disposed across the whole boundary of the long side of the guide panel 430. However, the present invention is not limited to the particular structure above, and the first rib 533 may be disposed across one part of the boundary of the long side of the guide panel 430. Both ends of the first rib 533 can be formed being curved in the second direction (D2).

The second rib 433 can be extended from the first rib 533 in the second direction (D2). The second rib 433 can guide the short side of the display panel. The second rib 433 can be disposed across at least one part of the boundary of the short side of the guide panel 430. For example, the second rib 433 can be disposed only at the both ends of the short side of the guide panel 430 in the second direction (D2).

The second rib 433 can prevent the display panel from breaking away in the first direction (D1). If the length of the second rib 433 in the second direction (D2) is too short, the display panel may easily break away by an external force in the second direction (D2). Accordingly, the second rib 433 can be made not too short in the second direction (D2).

The first rib 533 and the second rib 433 can differ from each other in their heights.

The guide panel 430 can further include a second hole 472 in its lower side. The second hole 472 can couple the guide panel 430, top case, and module cover together. However, the present invention is not limited to the particular structure, and the second hole 472 can couple the guide panel 430, top case, and module cover by using a latch.

Figure 84:
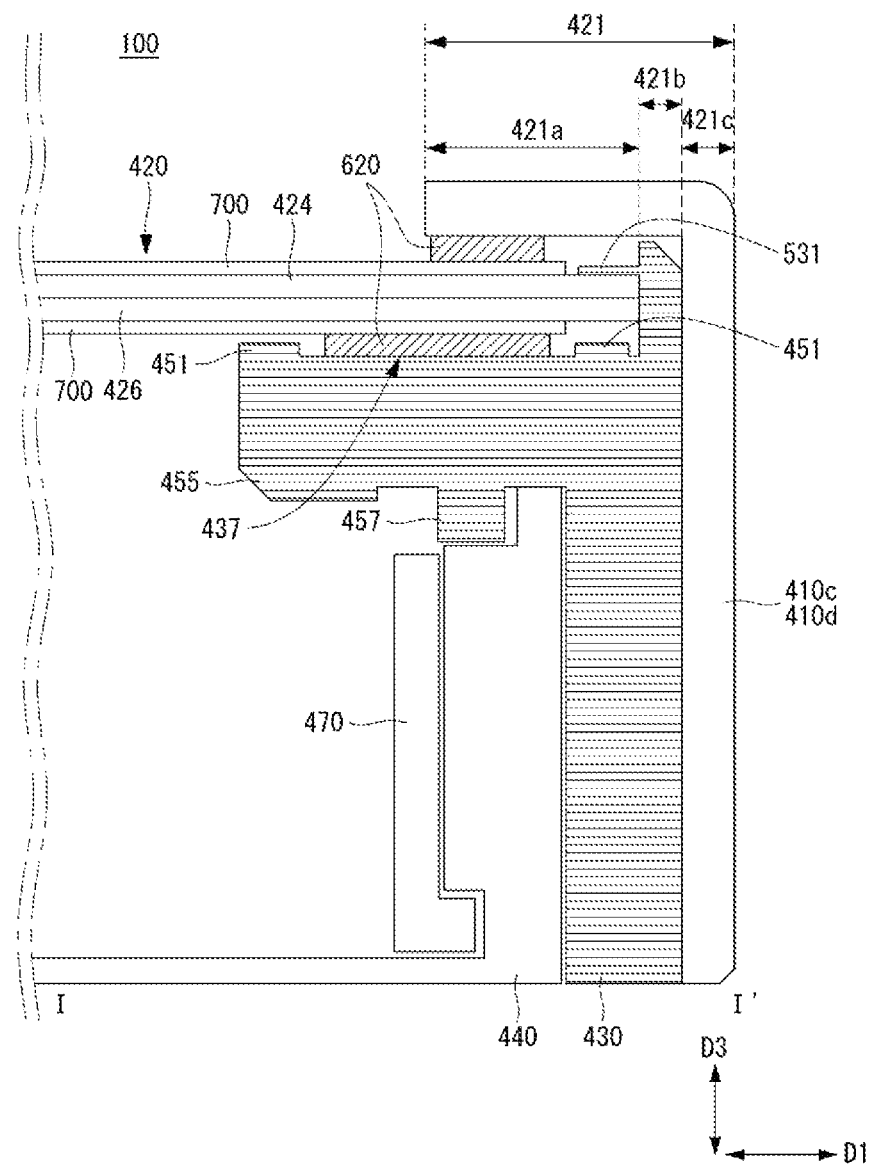

With reference to FIG. 84, the guide panel 430 can guide the display panel 420. The guide panel 430 can guide the display panel 420 to the second protruding part 531 of the second rib 433. The second protruding part 531 can be extended from the second rib 433 in the first direction (D1). The second protruding part 531 can guide the upper surface of the display panel 420. The second protruding part 531 can guide the display panel 420 so that it does not break away in the third direction (D3).

An adhesive layer 620 can be disposed between the front surface of the display panel 420 and the second part 421 of the first and the second vertical top case 410c, 410d. The display panel 420 can be secured to the guide panel 430 and the first and the second vertical top case 410c, 410d through the adhesive layer 620. The adhesive layer 620 can be disposed within the first protruding part 451. In other words, the adhesive layer 621 can be disposed in the installation part 437 within the groove formed along the guide panel 430.

The adhesive layer 620 can have not only the adhesive property but also elasticity and flexibility. Accordingly, an external force applied to the guide panel 430 is blocked by the adhesive layer 620, thereby being prevented from being applied to the display panel 420.

The adhesive layer 620 constructed upon the structure described above can be called a foam pad.

The guide panel 430 can further include the third protruding part 455 and the fourth protruding part 457 in its lower surface.

The third protruding part 455 can be stretched out from the guide panel 430 in the third direction (D3). Though not shown, the third protruding part 455 can guide an optical layer and/or light guide panel. In case the third protruding part 455 guide the optical layer and/or light guide panel, the third protruding part 455 can further include an adhesive layer.

The fourth protruding part 457 can be stretched out being separated from the third protruding part 455 by a predetermined distance in the third direction (D3) from the guide panel 430. The fourth protruding part 457 can guide the module cover 440. The fourth protruding part 457 may perform the function of supporting the guide panel 430 by using the module cover 440.

The display panel 420 can comprise a front substrate 424, rear substrate 426, and at least one polarizing panel 700.

The polarizing panel 700 can be disposed on the front surface of the front substrate 424 and on the rear surface of the rear substrate 426. The polarizing panel 700 can polarize light that passes through it. More specifically, the polarizing panel 700 disposed on the front surface of the front substrate 424 can polarize the light which passes through the display panel 420, and the polarizing panel 700 disposed on the rear surface of the rear substrate 426 can polarize the light which passes through an optical sheet (not shown in the figure).

A first layer 470 can be disposed inside the module cover 440. The first layer 470 can be a substrate onto which a plurality of light sources are mounted. An adaptor supplying power and an electrode pattern for connecting a plurality of light sources can be formed on the first layer 470.

The second part 421 of the first and the second vertical top case 410c, 410d can include the first to third area 421a to 421c. The first to third area (421a to 421c) can cover the boundary of the front surface of the display panel 420 and the guide panel 430. The first and the second vertical top case 410c, 410d can be combined with the guide panel 430 in the external side of the guide panel 430.

The first area 421a can cover the boundary of the front surface of the display panel 420. The first area 421a can protect the display panel 420 from an external impact. The first area 421a can be longer than a predetermined length to prevent the display panel 420 from being damaged. Therefore, it may not be easy to reduce the length of the first area 421a.

The second area 421b can correspond to an upper area of the second rib 433 of the guide panel 430. The second area 421b can protect the guide panel 430 from an external impact.

The third area 421c can correspond to the body area of the first and the second vertical top case 410c, 410d. Since the thickness of the third area 421c is the same as the thickness of the body area thereof, it may not be easy to reduce the length of the third area. As shown in FIGS. 80 to 82, the third area 421c at both sides in the second direction (D2) can be smaller than the third area 421c of another area.

Figure 85:
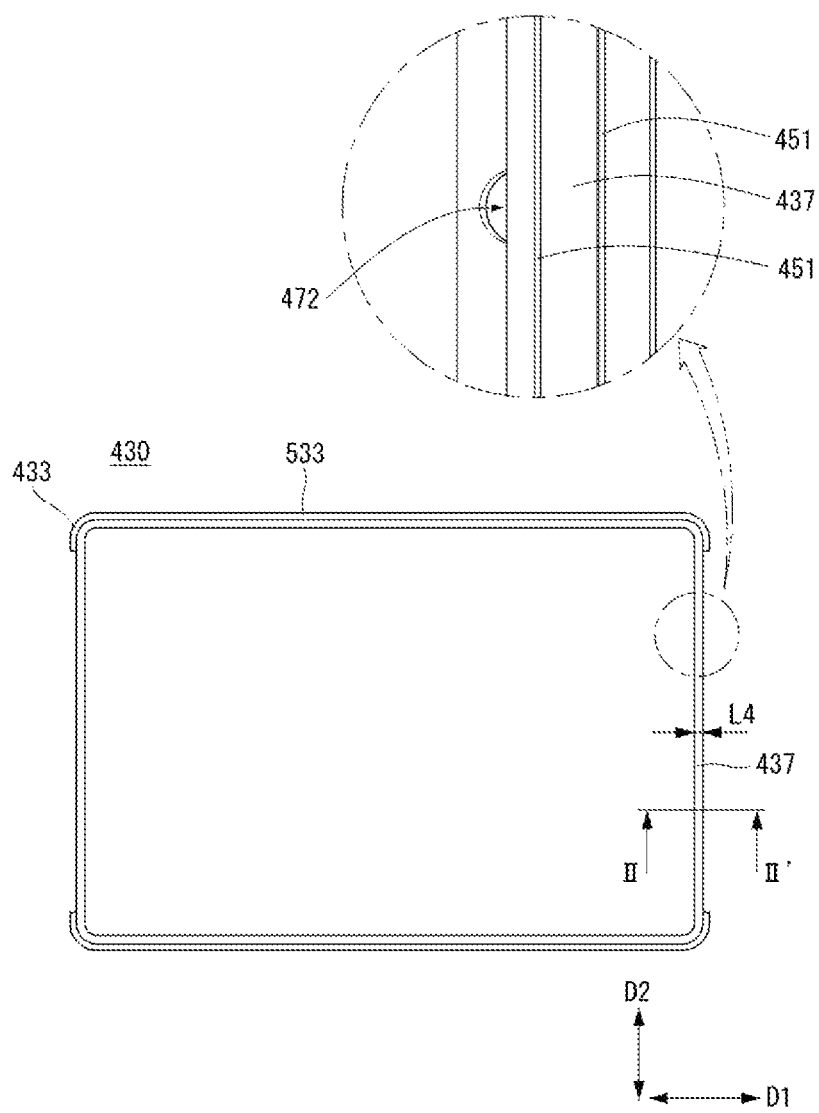

With reference to FIG. 85, the second rib 433 may not be disposed in the central part of the short side of the guide panel 430. In other words, only the first protruding part 451 and the installation part 451 can be disposed in the guide panel 430. The second rib 433 can be disposed at both ends of the short side even if the second rib 433 is not disposed in the central part of the guide panel 430. Accordingly, the display panel can be prevented from breaking away in the first direction (D1).

Since the second rib 433 is not disposed in the central part of the short side of the guide panel 430, thickness in the first direction (D1) can be thinner than the thickness at both ends of the short side in the first direction (D1). Accordingly, sum of the thickness of the second rib 433 and the thickness of the depression part of the vertical top case can be the same as the thickness of the first part which does not have a depression part.

Figure 86:
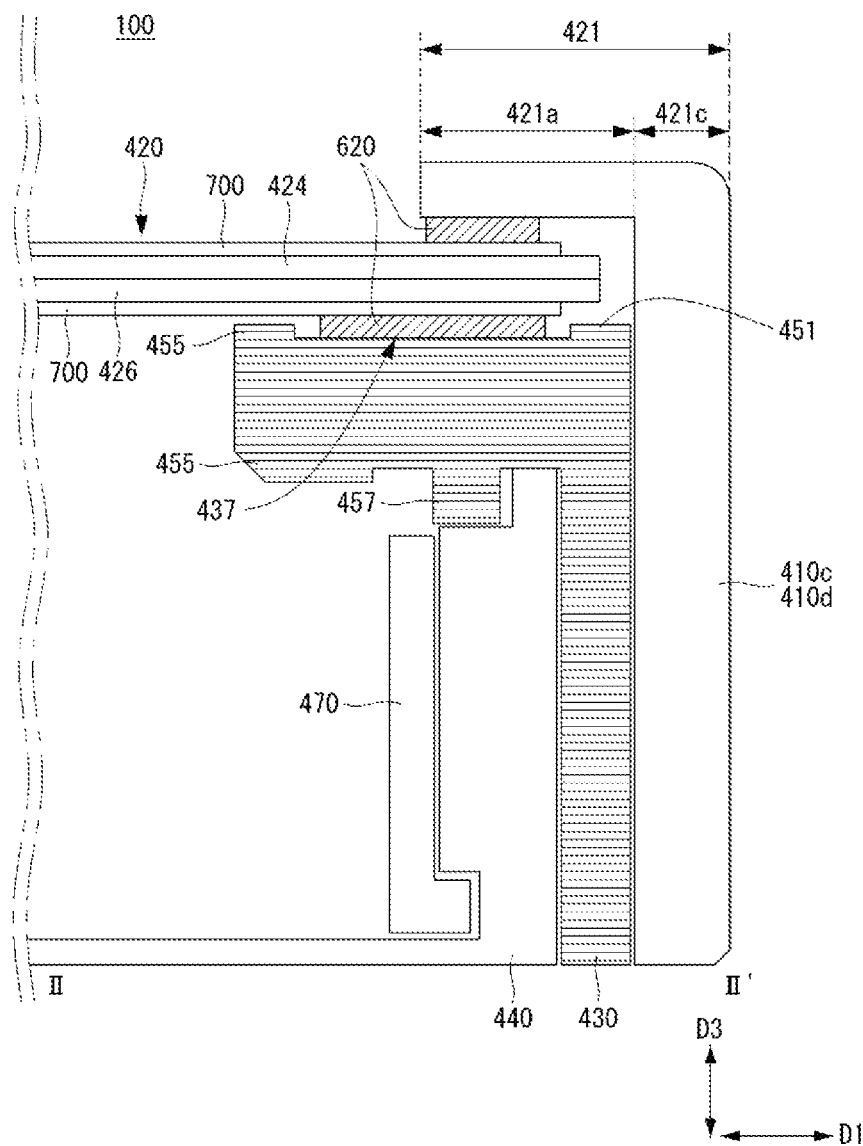

With reference to FIG. 86, the guide panel 430 may not include the second rib. Accordingly, the second part 421 of the first and the second vertical top case 410c, 410d can include only the first area 421a and the third area 421c. Since the second part 421 includes only the first area 421a and the third area 421c, length of the second part 421 can be made to be short.

Since the guide panel 430 does not include the second rib, the first protruding part 451 can come into contact with the first and the second vertical top case 410c, 410d. Since the guide panel 430 does not include the second rib, it may be difficult to guide the display panel 420. However, as shown in FIG. 83, since both ends of the short side of the guide panel 430 includes the second rib, the display panel 420 can be guided into an appropriate position.

Figure 87:
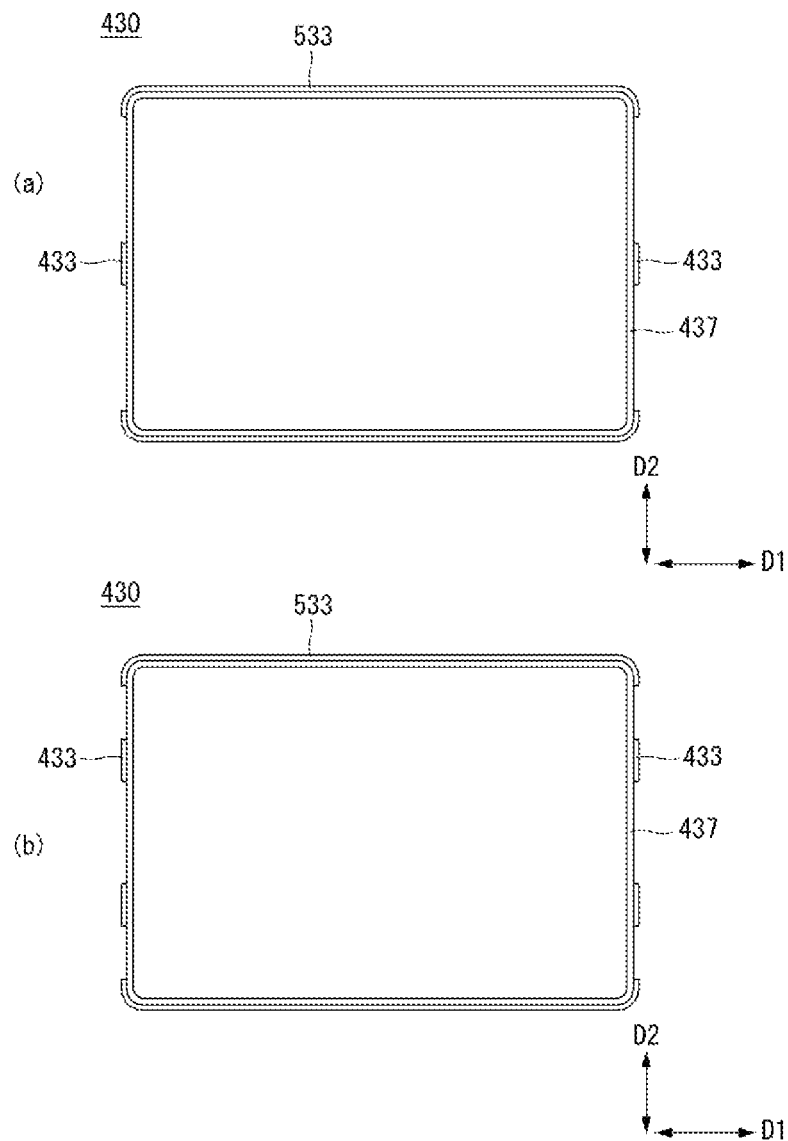

With reference to FIG. 87, the second rib 433 may not be disposed only at both ends of the short side of the guide panel 430. As shown in FIG. 87(a), the second ribs 433 can be disposed at both ends and in the central part of the short side of the guide panel 430. Also, as shown in FIG. 87(b), the second ribs 433 can be disposed being separated from each other with predetermined intervals from one end of the short side of the guide panel 430 to the other end thereof. However, the present invention is not limited to the particular structure above, and the second rib 433 can be disposed anywhere on the short side.

In the display device 100 according to the present invention, the second rib 433 can be disposed at different parts of the short side of the guide panel 430 rather than both ends thereof. Accordingly, it can be easier to guide the display panel to the guide panel 430. At the same time, it can be harder for the display panel to break away from the guide panel 430.

Figure 88:
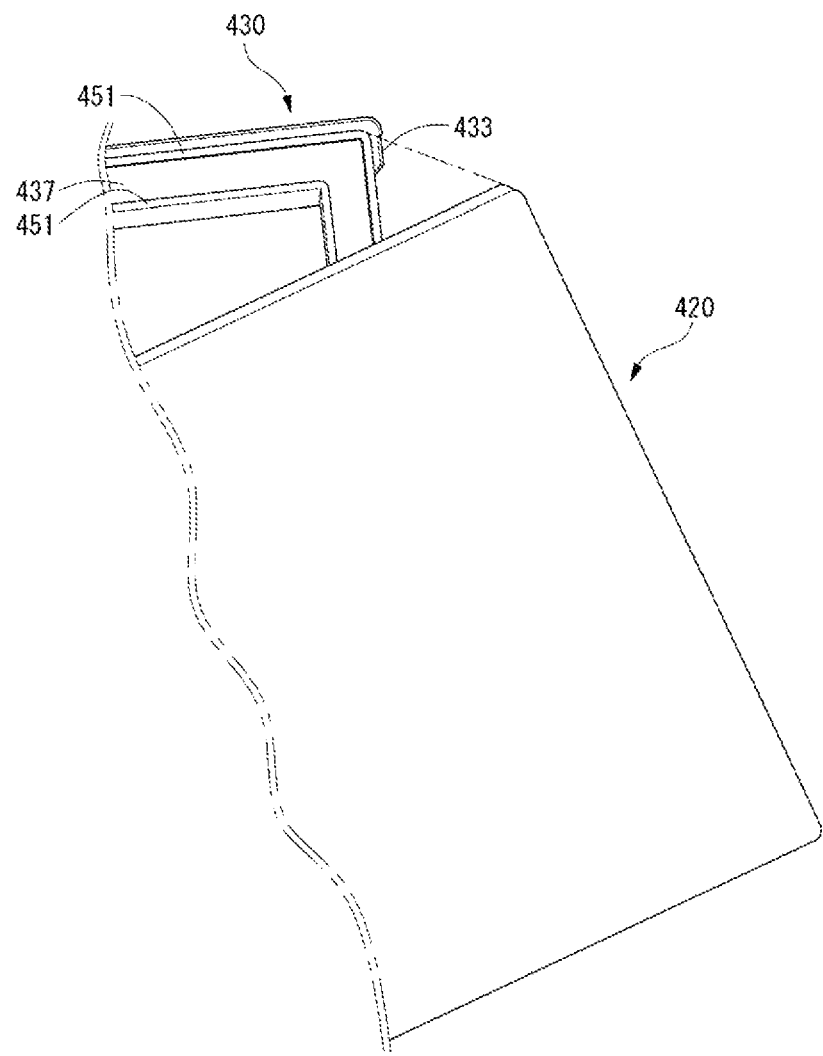
Figure 89:
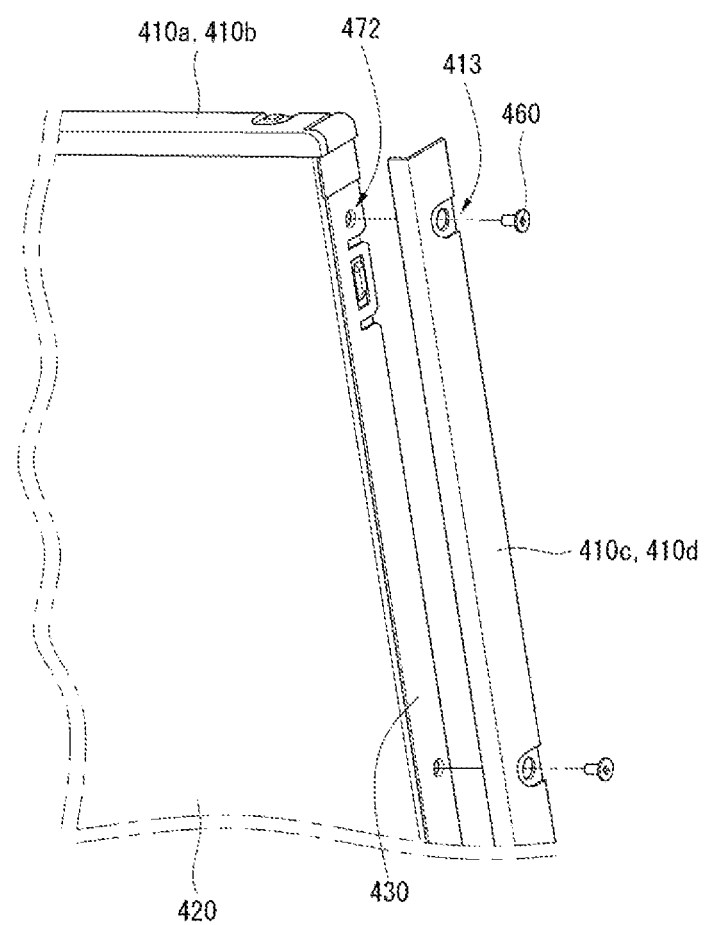

With reference to FIGS. 88 and 89, first of all, a display panel 420 can be installed on the guide panel 430. The display panel 420 can be installed being guided by the second rib 433 of the guide panel 430. The display panel 420 may not come into contact with the first protruding part 451 and the installation part 437 because of the adhesive layer (not shown in the figure).

The display panel 420 can be installed inside the guide panel 430. Accordingly, the widths of the long side and the short side of the display panel 420 can be narrower than those of the guide panel 430.

Next, after the long side of the guide panel 430 is combined with the first and the second horizontal top case 410a, 410b, the first and the second vertical top case 410c, 410d can be attached to the short side of the guide panel 430. The first and the second vertical top case 410c, 410d can be coupled to the first hole 413 and the second hole 472 by the coupling member 460. In other words, the first and the second vertical top case 410c, 410d can be coupled to the guide panel 430 by the coupling member 460.

In a display device according to the present invention, the guide panel 430 and the first and the second vertical top case 410c, 410d can be coupled together by one coupling member. Accordingly, the guide panel 430 and the first and the second vertical top case 410c, 410d can be combined to each other easily.

Figure 90:
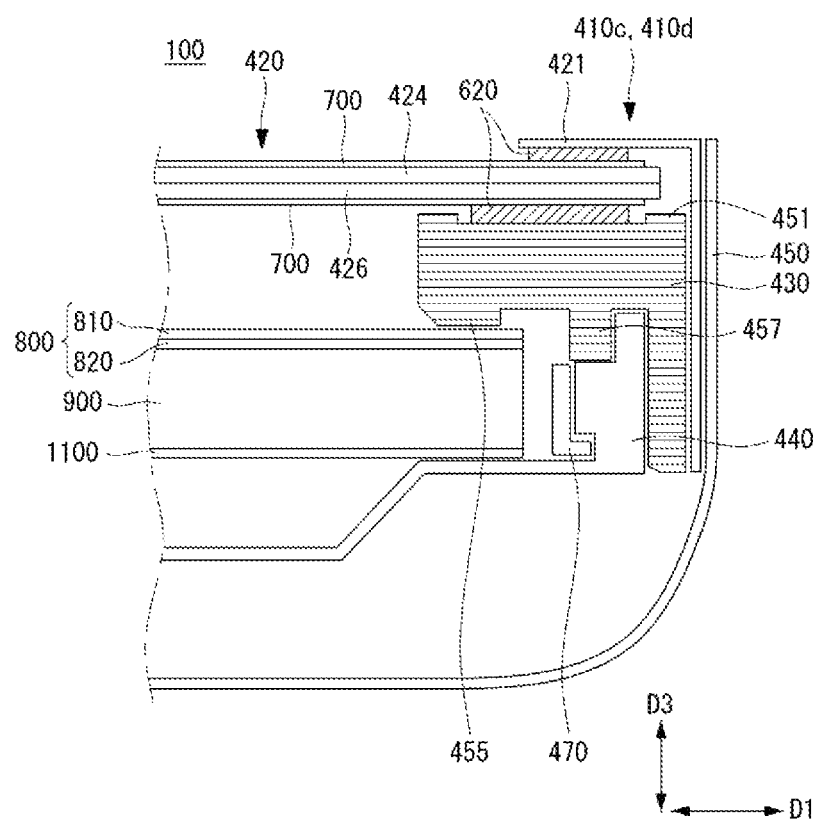

With reference to FIG. 90, the display device 100 according to the present invention can further include a back cover 450 on the rear surface of the module cover 440. More specifically, both ends of the back cover 450 in the first direction (D1) can be coupled to the first and the second vertical top case 410c, 410d. In other words, the back cover 450 can be combined with the side area of the first and the second vertical top case 410c, 410d.

The height of both ends of the back cover 450 can be the same as the height of the second part 421 of the first and the second vertical top case 410c, 410d.

The display device 100 according to the present invention can be an edge-type display device. In other words, light sources (not shown) can be disposed in the first layer 470 inside the display device 100.

An optical sheet 800, light guide panel 900, and reflection sheet 1100, being guided by the third protruding part 455, can be installed on the module cover 440.

The reflection sheet 1100 can be supported by the module cover 440. The reflection sheet 1100 can reflect light incoming from the light guide panel 900. Also, the reflection sheet 1100 can again reflect light totally reflected in the light guide panel 900. Accordingly, the reflection sheet 1100 can diffuse light emitted from a plurality of light sources into a wider area.

The reflection sheet 1100 can include at least one of metal or metal oxide. For example, the reflection sheet 1100 can include metal or metal oxide exhibiting a high reflection rate, such as aluminum (Al), silver (Ag), gold (Au), or titanium dioxide.

A light guide panel 900 can be disposed on the reflection sheet 1100. The light guide panel 900 can be disposed in a direction along which the light from a plurality of light sources is emitted. The light guide panel 900 can spread out incident light from a plurality of light sources into a wider area. The light guide panel 900 can reflect incident light from a plurality of light sources into the upper area.

An optical sheet 800 can be disposed on the light guide panel 900. The optical sheet 800 can be composed of a plurality of layers. For example, the optical sheet 800 can include a diffusion sheet 810 and a prism sheet 820. The optical sheet 800 may include a plurality of diffusion sheets 810 and prism sheets 820.

Figure 91:
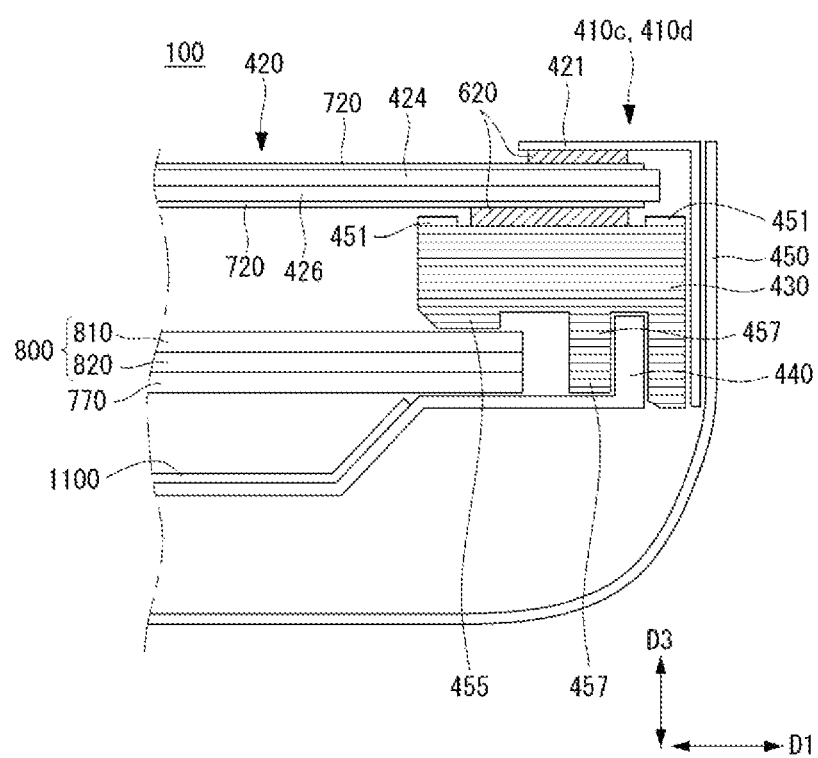

With reference to FIG. 91, a display device 100 according to the present invention can be a direct-type display device. In other words, a plurality of light sources can be disposed on the upper surface of the module cover 440.

An optical sheet 800, diffusion panel 770, and reflection sheet 1100 can be disposed on the module cover 440. The optical sheet 800 and the diffusion panel 770 can be installed by being guided by the third protruding part 455.

The reflection sheet 1100 can be disposed on the upper surface of the module cover 440. The reflection sheet 1100 can be disposed on an area excluding the area on which a plurality of light sources are formed. In other words, the reflection sheet 1100 can have a through-hole in the area in which a plurality of light sources are formed.

An air gap can be disposed on the reflection sheet 1100. The air gap performs the role of spreading out the light emitted from a plurality of light sources into a wider area. Meanwhile, resin can be evaporated on the reflection sheet 126. In this case, resin performs the role of spreading out the light emitted from the optical assembly 124.

The diffusion panel 770 can be disposed on the air gap. The reflection panel can spread out the light emitted from a plurality of light sources into the upper area. The diffusion panel 770 can come into contact with the lower part of the optical sheet 800 and can be guided by the third protruding part 455.

Figure 92:
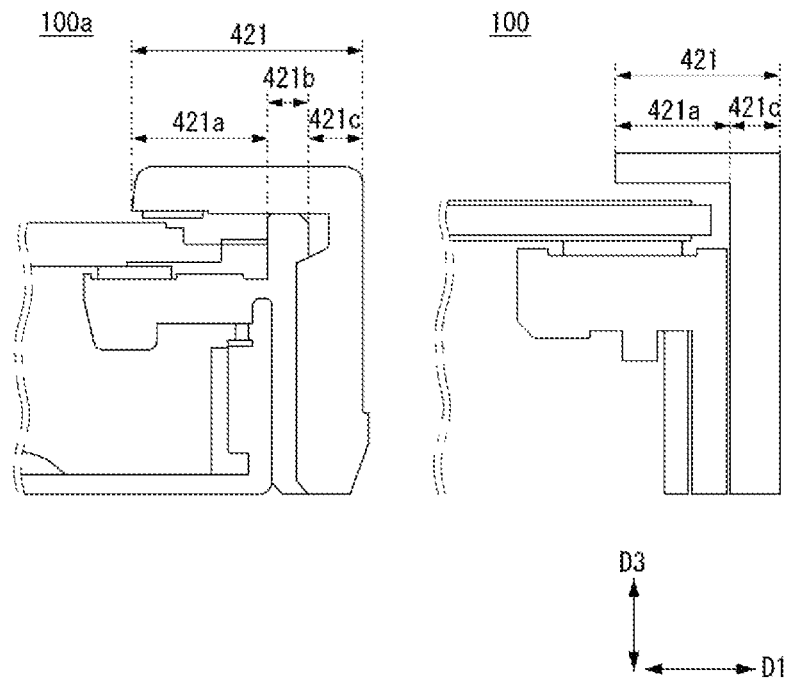
FIGS. 92 to 94 illustrate the effect of a display device according to the present invention.
Figure 93:
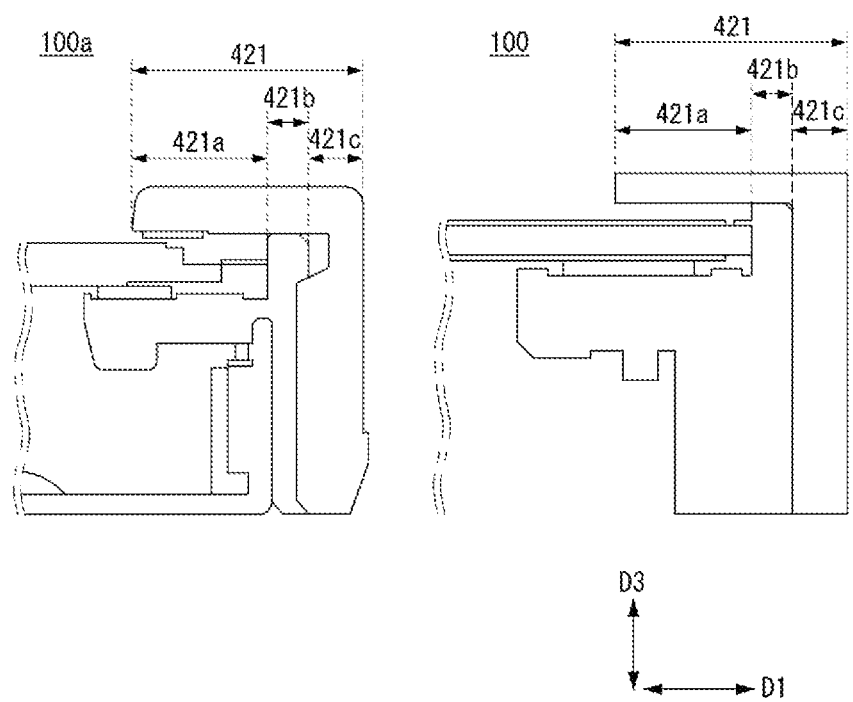
Figure 94:
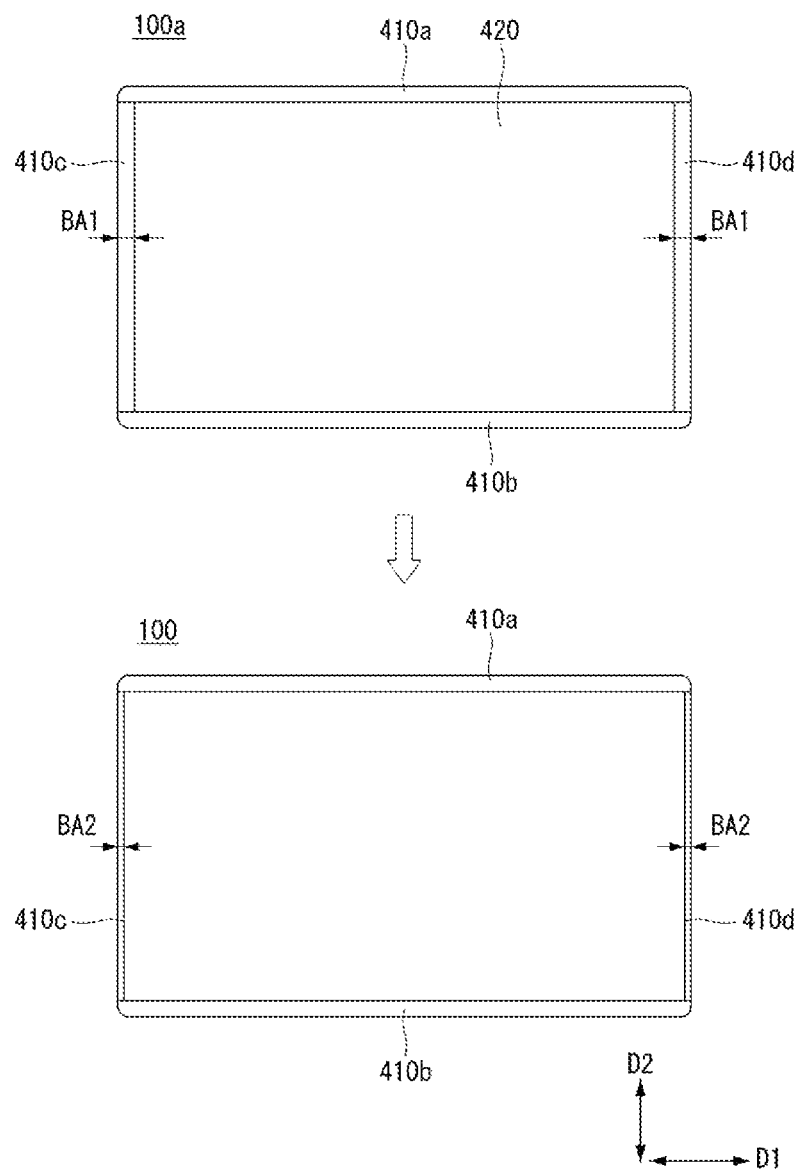

FIGS. 92 to 94 illustrate the effect of a display device according to the present invention.

With reference to FIG. 92, the second part 421 of a short side of an existing display device 100a can include a first to a third area (421a to 421c). Accordingly, the second part 421 of the existing display device 100a can occupy too much space. Therefore, users are unable to easily concentrate on an image or a photo because the second part 421 occupies large space.

Different from the above, the central part of the display device 100 according to the present invention can include a first area 421a and a third area 421c excluding the second area 421b. Accordingly, the second part 421 can occupy less space. For example, the sum of thickness of the second area 421b and the third area 421c in the central part of the display device 100 can be the same as the thickness of the third area 421c at both ends of a short side of the display device 100. Thus, the users can easily concentrate on an image or a photo because the second part 421 occupies less space.

With reference to FIG. 93, at both ends of a short side of the display device 100 according to the present invention, the second part 421 can include a first to a third area (421a to 421c).

The third area 421c of the second part 421 at both ends of a short side of the display device 100 can occupy less space. Therefore, the sum of the third area 421c and the second area 421b at both ends of a short side of the display device 100 can be the same as the size of the third area 421c of the central part of the display device 100.

As described above, the third area 421c at both ends of a short side of the display device 100 can be smaller than the third area 421c of an existing display device 100a. Accordingly, the second part 421 at both ends of a short side of the display device 100 can occupy less space than the second part 421 of the existing display device 100a. Therefore, users can easily concentrate on an image or a photo because the second part 421 occupies less space.

With reference to FIG. 94, thickness BA1 of the first and the second vertical top case 410c, 410d of the existing display device 100a can be relatively thicker than the thickness BA2 of the first and the second vertical top case 410c, 410d of the present invention.

If the width of the first and the second vertical top case 410c, 410d is large, the display area of the display panel 420 is reduced; thus, it can be relatively difficult for a user to concentrate on the screen. Also, the first and the second vertical top case 410c 410d can create a feeling of difference in external appearance against the display area of the display panel 420.

Since the width BA2 of the top case 410 according to the present invention is relatively smaller than the width BA1 of an existing top case 410, the user can easily concentrate on the screen.

As described above, it can be understood by those skilled in the art to which the present invention belongs that the technical structure of the present invention can be embodied in other specific forms without modifying the technical principles or essential characteristics of the present invention.

Therefore, the embodiments described above are only examples in all aspects and should not be regarded as being restrictive. The technical scope of the present invention is defined by the appended claims rather than the detailed descriptions above, and it should be interpreted that all the possible modifications and modified embodiments derived from implications of and technical scope defined by the appended claims and the equivalent technical principles thereof belong to the technical scope of the present invention.

The invention claimed is:

1. A display device, comprising:
    a frame;
    a guide panel disposed on the frame;
    a display panel disposed on the guide panel;
    a top case positioned on a side and a front of the display panel, the top case comprises a horizontal top case which covers a boundary of a front surface at a first side area of the display panel; and
    a back cover disposed at a rear of the frame,
    wherein the horizontal top case includes a first part facing a part of the front surface of the display panel, a second part extending from the first part and covering the side of the display panel, a third part extending from the second part toward the guide panel, and an extended part extending from the third part and facing a side of the guide panel,
    wherein the guide panel includes:
        a first protruding part protruding from the side of the guide panel, and
        a second protruding part protruding from the side of the guide panel and being apart from the first protruding part, wherein the first protruding part is closer to the third part of the horizontal top case than the second protruding part of the horizontal top case, wherein the horizontal top case includes a first opening and a second opening at the extended part, and the first protruding part is inserted into the first opening and the second protruding part is inserted into the second opening, and wherein the back cover is coupled to the first protruding part of the guide panel, and an end of the back cover is inserted between the first protruding part of the guide panel and the third part of the horizontal top case.

2. The display device of claim 1, wherein the top case further comprises a vertical top case which covers the boundary of the front surface in a second side area neighboring the first side area of the display panel, wherein the horizontal top case and the vertical top case are connected to each other at the corner of the display panel, and materials of which the horizontal top case and the vertical top case are made are different from each other.

3. The display device of claim 2, wherein the horizontal top case includes a metallic material while the vertical top case includes a plastic material.

4. The display device of claim 1, further comprising an optical layer between the display panel and the back cover.

5. The display device of claim 1, wherein the guide panel is contacted with the extended part of the horizontal top case.

6. The display device of claim 1, wherein the horizontal top case further comprises a fourth part extended from the first part of the horizontal top case toward a portion of the front surface of the display panel.

7. The display device of claim 1, wherein the back cover comprises a hook on an end part of the back cover and corresponding to the second protruding part.

8. The display device of claim 1, wherein the guide panel comprises a first guide panel in a horizontal direction and a second guide panel in a vertical direction, wherein the first and second protruding parts are positioned on the first guide panel.

9. The display device of claim 8, wherein the second guide panel comprises a third protruding part having a different shape with the first and second protruding parts.

10. The display device of claim 9, wherein the back cover comprises a groove corresponding to the third protruding part, the third protruding part inserted in the groove.

* * * * *